(12) United States Patent
Tsunekawa et al.

(10) Patent No.: US 8,068,700 B2
(45) Date of Patent: Nov. 29, 2011

(54) IMAGE PROCESSING APPARATUS, IMAGE PROCESSING METHOD, AND ELECTRONIC APPLIANCE

(75) Inventors: Norikazu Tsunekawa, Amagasaki (JP);
Seiji Okada, Hirakata (JP); Akihiro Naenaka, Kadoma (JP)

(73) Assignee: SANYO Electric Co., Ltd., Moriguchi (JP)

( * ) Notice: Subject to any disclaimer, the term of this patent is extended or adjusted under 35 U.S.C. 154(b) by 855 days.

(21) Appl. No.: 12/127,318

(22) Filed: May 27, 2008

(65) Prior Publication Data

US 2008/0298639 A1 Dec. 4, 2008

(30) Foreign Application Priority Data

May 28, 2007 (JP) ................................. 2007-140724
Jun. 22, 2007 (JP) ................................. 2007-164559

(51) Int. Cl.
*G06K 9/32* (2006.01)
(52) U.S. Cl. ....................... 382/299; 382/284
(58) Field of Classification Search .................. 382/284, 382/298–301
See application file for complete search history.

(56) References Cited

U.S. PATENT DOCUMENTS

| | | | | |
|---|---|---|---|---|
| 7,738,731 B2* | 6/2010 | Aiso | ............................. | 382/284 |
| 7,778,493 B2* | 8/2010 | Ho et al. | ....................... | 382/299 |
| 2002/0093518 A1* | 7/2002 | Nakano | ........................ | 345/643 |
| 2005/0008254 A1* | 1/2005 | Ouchi et al. | .................. | 382/284 |
| 2005/0111754 A1* | 5/2005 | Cakir et al. | .................... | 382/284 |
| 2005/0157949 A1* | 7/2005 | Aiso et al. | ...................... | 382/299 |
| 2005/0201637 A1* | 9/2005 | Schuler et al. | ................ | 382/284 |
| 2007/0098301 A1* | 5/2007 | Rengakuji et al. | ............ | 382/300 |

FOREIGN PATENT DOCUMENTS

| | | |
|---|---|---|
| JP | 2006-033062 | 2/2006 |
| JP | 2006-041603 | 2/2006 |

* cited by examiner

*Primary Examiner* — Jingge Wu
(74) *Attorney, Agent, or Firm* — NDQ&M Watchstone LLP

(57) ABSTRACT

In an image processing apparatus, the amount of motion between a low-resolution image as a datum image and each of N low-resolution images is detected and, based on the detected amounts of motion, the datum image, and M consulted images (N>M≧1) selected out of the N low-resolution images, a high-resolution image is generated. An image evaluator, which selects the consulted images, takes each of the N low-resolution images as an evaluated image and arranges, based on the amounts of motion, the datum image and the evaluated images in a common coordinate system. Based on a pixel position on the datum image in the common coordinate system, a datum position in the common coordinate system is set. For each evaluated image, the distance from the datum position to a pixel position on that evaluated image is evaluated so that evaluated images corresponding to relatively small distances are selected as consulted images, while evaluated images corresponding to relatively great distances are excluded from the M consulted images.

17 Claims, 40 Drawing Sheets

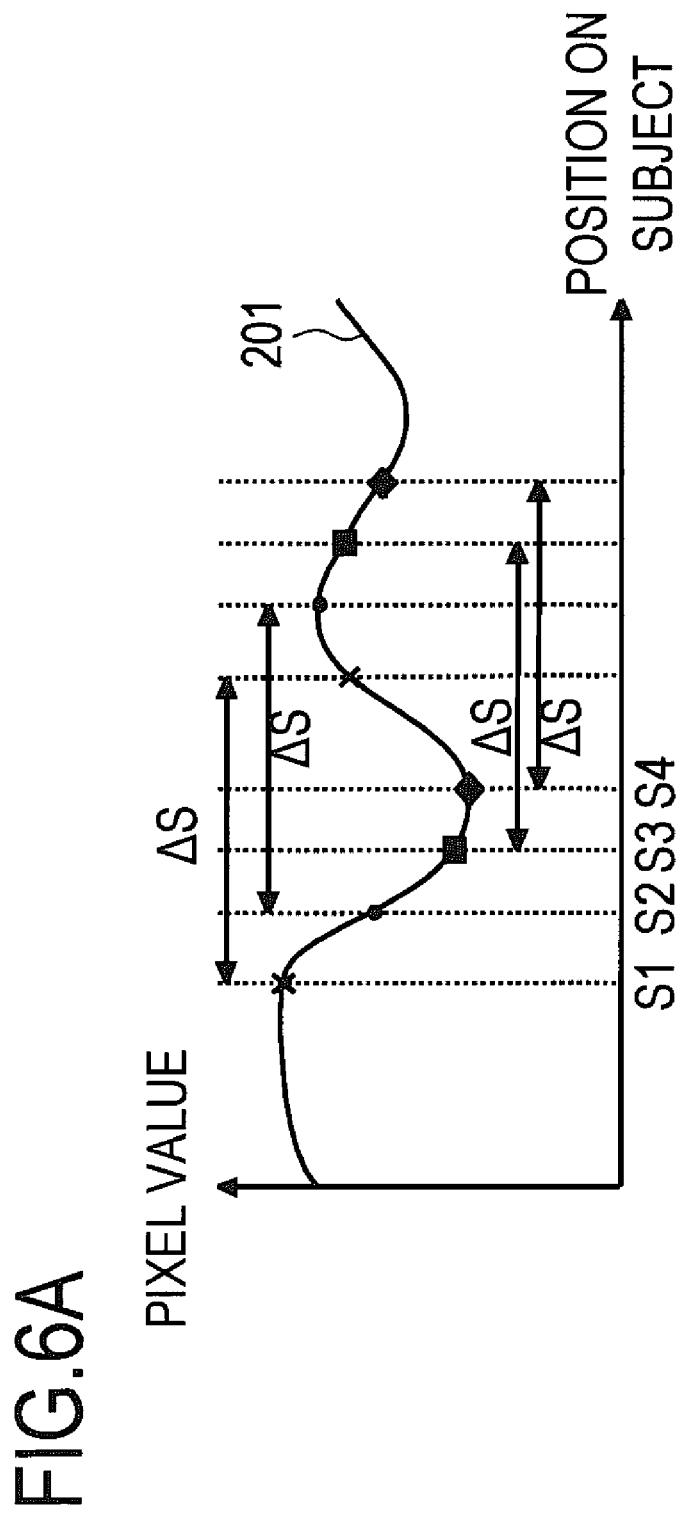

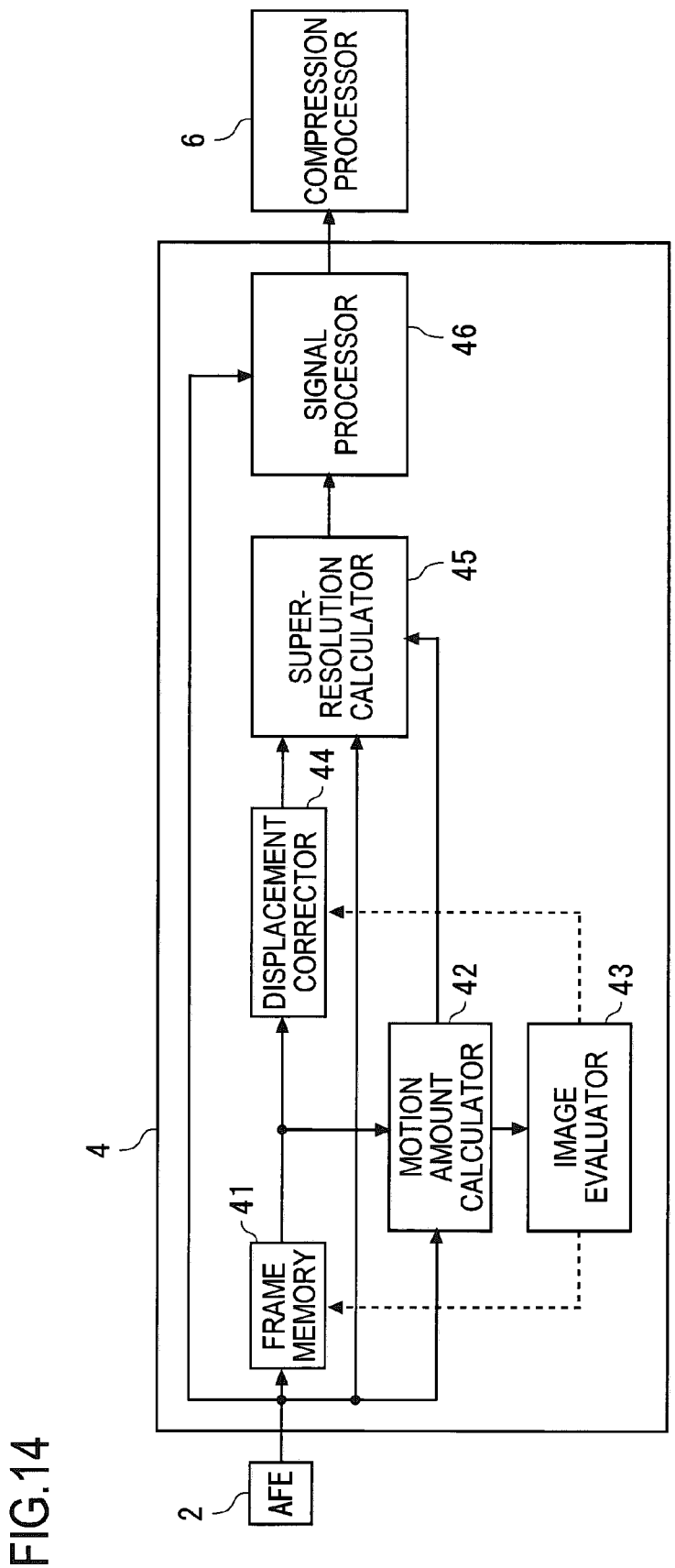

| x[p-1,q-1] | x[p,q-1] | x[p+1,q-1] |
|---|---|---|
| x[p-1,q] | x[p,q] | x[p+1,q] |
| x[p-1,q+1] | x[p,q-1] | x[p+1,q+1] |

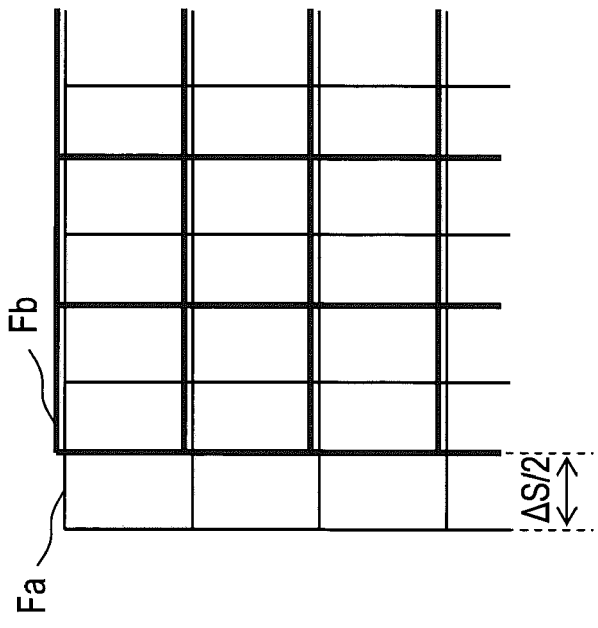

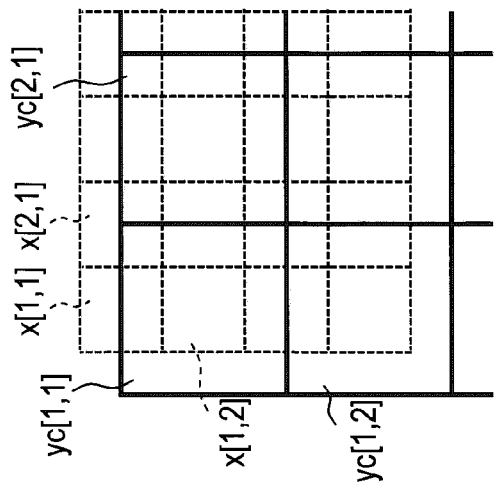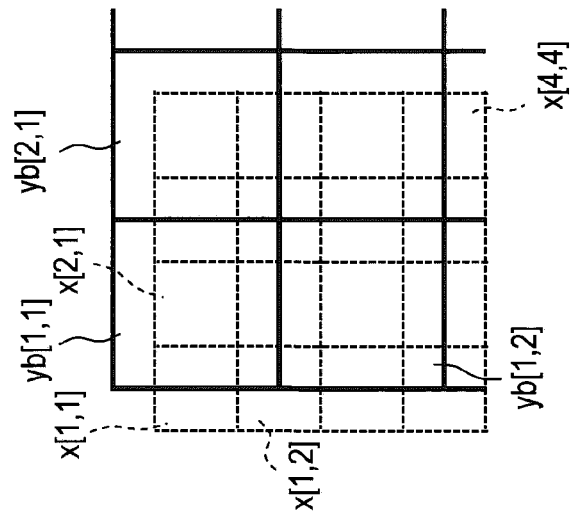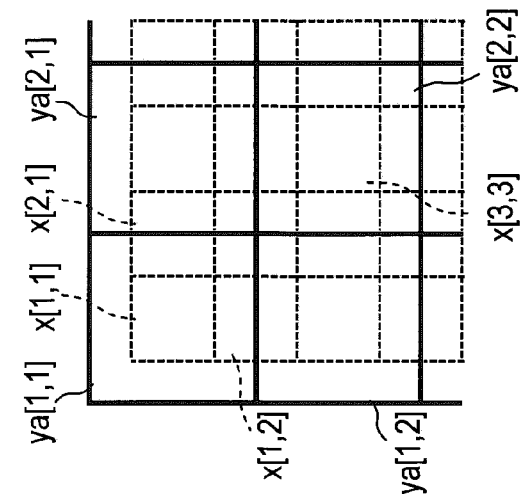

FIG.23A

| x[p-2,q-2] | x[p-2,q-1] | x[p-2,q] | x[p-2,q+1] | x[p-2,q+2] |
| --- | --- | --- | --- | --- |
| x[p-1,q-2] | x[p-1,q-1] | x[p-1,q] | x[p-1,q+1] | x[p-1,q+2] |
| x[p,q-2] | x[p,q-1] | x[p,q] | x[p,q+1] | x[p,q+2] |
| x[p+1,q-2] | x[p+1,q-1] | x[p+1,q] | x[p+1,q+1] | x[p+1,q+2] |
| x[p+2,q-2] | x[p+2,q-1] | x[p+2,q] | x[p+2,q+1] | x[p+2,q+2] |

| x[p-2,q-2] | x[p-2,q-1] | x[p-2,q] | x[p-2,q+1] | x[p-2,q+2] |
| --- | --- | --- | --- | --- |
| x[p-1,q-2] | x[p-1,q-1] | x[p-1,q] | x[p-1,q+1] | x[p-1,q+2] |
| x[p,q-2] | x[p,q-1] | x[p,q] | x[p,q+1] | x[p,q+2] |
| x[p+1,q-2] | x[p+1,q-1] | x[p+1,q] | x[p+1,q+1] | x[p+1,q+2] |
| x[p+2,q-2] | x[p+2,q-1] | x[p+2,q] | x[p+2,q+1] | x[p+2,q+2] |

IR
280

IMAGE PROCESSING APPARATUS, IMAGE PROCESSING METHOD, AND ELECTRONIC APPLIANCE

This nonprovisional application claims priority under 35 U.S.C. §119(a) on Patent Application No. 2007-140724 filed in Japan on May 28, 2007 and Patent Application No. 2007-164559 filed in Japan on Jun. 22, 2007, the entire contents of both of which are hereby incorporated by reference.

BACKGROUND OF THE INVENTION

1. Field of the Invention

The present invention relates to an image processing apparatus, and more particularly to an image processing apparatus that generates a high-resolution image from a plurality of low-resolution images. The present invention also relates to an image processing method and an electronic appliance.

2. Description of Related Art

Recent years have seen advancements in various digital technologies, accompanied by the wide spread of image sensing apparatuses that acquire digital images through shooting using a solid-state image sensing device such as a CCD (charge-coupled device) or CMOS (complimentary metal oxide semiconductor) image sensor and display apparatuses that display such digital images. The image sensing apparatuses include, for example, digital still cameras and digital video cameras; the display apparatuses include, for example, liquid crystal displays and plasma televisions. In these image sensing apparatuses and display apparatuses, there have been proposed image processing technologies for converting a plurality of digital images shot at different times into an image of higher resolution.

One type of conventionally proposed processing for such high-resolution conversion is "super-resolution processing", relying on estimating a single high-resolution image from a plurality of low-resolution images displaced from one another. And one conventionally proposed method for achieving super-resolution processing is the "reconstruction-based" method. In the reconstruction-based method, after a high-resolution image is estimated, this high-resolution image is degraded back to estimate the original low-resolution images from which the high-resolution image was constructed; then, based on the result of comparison between the estimated low-resolution images and the original low-resolution images, the high-resolution image is brought closer and closer to the ideal.

More specifically, in the reconstruction-based method, first, an initial high-resolution image is estimated from a plurality of low-resolution images (Step 31A); next, this high-resolution image is degraded back to estimate the original low-resolution images from which the high-resolution image was constructed (Step 32A); then the estimated low-resolution images are compared with the original low-resolution images (Step 33A) and, based on the result of the comparison, a new high-resolution image is estimated such as to make smaller the difference in pixel value at each corresponding pixel position between the two images compared (Step 34A). As the processing from Steps 32A through 34A is executed repeatedly such as to make the difference converge, the high-resolution image is brought closer and closer to the ideal.

Examples of conventionally proposed methods for achieving the reconstruction-based method include the ML (maximum-likelihood) method, the MAP (maximum a posterior) method, the POCS (projection onto convex set) method, the IBP (iterative back projection) method, etc. In the ML method, the squared errors between the pixel values of the low-resolution images estimated back from the high-resolution image and the pixel values of the actual low-resolution images are taken as an evaluation function, and a high-resolution image is generated such as to minimize the evaluation function. That is, super-resolution processing employing the ML method is based on the principle of maximum likelihood estimation.

In the MAP method, the squared errors between the pixel values of the low-resolution images estimated back from the high-resolution image and the pixel values of the actual low-resolution images are, after the probability information of the high-resolution image is added to them, taken as an evaluation function, and a high-resolution image is generated such as to minimize the evaluation function. That is, in the MAP method, an optimal high-resolution image is generated by estimating, based on "a priori" knowledge, a high-resolution image that maximizes the probability of occurrence in the "a posteriori" probability distribution.

In the POCS method, simultaneous equations are created with respect to the pixel values of the high-resolution image and the pixel values of the low-resolution images; as these simultaneous equations are solved one after another, the optimal pixel values of the high-resolution image are acquired and thereby a new high-resolution image is generated. In the IBP method, a high-resolution image is generated from a plurality of low-resolution images that are shot at different shooting positions but that overlap with one another over certain pixel positions on the subject.

In this way, to acquire a high-resolution image by super-resolution processing as described above, a series of low-resolution images is used. The series consists of a plurality of chronologically ordered low-resolution images. The super-resolution processing is performed by a super-resolution processor, which can select, out of a given series of low-resolution images, a plurality of low-resolution images that it will actually use in super-resolution processing. If the selected low-resolution images are fit for the estimation of a high-resolution image, it is possible to generate a satisfactory high-resolution image. The selection processing here is therefore important.

SUMMARY OF THE INVENTION

According to one aspect of the invention, an image processing apparatus is provided with: an image input portion that receives (N+1) low-resolution images (where N is an integer of 2 or more); a motion amount detector that takes one of the (N+1) low-resolution images as a datum image and detects the amount of motion between the low-resolution image taken as the datum image and each of the other N low-resolution images; an image evaluator that selects, based on the detected amounts of motion, M (where M is an integer of 1 or more fulfilling N>M) out of the N low-resolution images each as a consulted image; and a resolution enhancer that produces, based on the detected amounts of motion, the datum image, and the M consulted images, a high-resolution image having higher resolution than the low-resolution images. Here, the image evaluator takes each of the N low-resolution images as an evaluated image. When an image coordinate system common to the datum image and the evaluated images is called the common coordinate system and, based on the detected amounts of motion, the datum image and the evaluated images are arranged in the common coordinate system, the image evaluator sets, based on a pixel position on the datum image in the common coordinate system, a datum position in the common coordinate system, then evaluates, for each evaluated image, the distance between the datum position and a pixel position on that evaluated image, and then selects, as the consulted images, evaluated images corresponding to relatively small distances while excluding, from the M consulted images, evaluated images corresponding to relatively great distances.

For example, the image evaluator may set the datum position at the center position of four pixels on the datum image. For example, the four pixels may be formed by two pairs of two pixels, the two pixels of each pair being adjacent to each other in a vertical direction on the datum image, the two pairs being adjacent to each other in a horizontal direction.

Instead, the high-resolution image may be generated by adding an interpolated pixel to the pixels of the datum image, and the image evaluator may set the datum position at the position of the interpolated pixel.

For another example, when the difference between the distances evaluated for a plurality of the evaluated images is less than or equal to a predetermined threshold value, the image evaluator may set a second datum position at the center position of four pixels on the datum image, then find, for each of the plurality of the evaluated images, the distance between the second datum position and a pixel position on that evaluated image as a second distance, and then perform selection operation such that, of the plurality of the evaluated images, any corresponding to a relatively small second distance is with higher preference selected as the consulted image than any corresponding to a relatively great second distance. For example, the four pixels may be formed by two pairs of two pixels, the two pixels of each pair being adjacent to each other in a vertical direction on the datum image, the two pairs being adjacent to each other in a horizontal direction.

For another example, when the difference between the distances evaluated for a plurality of the evaluated images is less than or equal to a predetermined threshold value, the image evaluator may find, for each of the plurality of the evaluated images, the distance in the vertical direction between the datum position and a pixel position on that evaluated image, and then perform selection operation such that, of the plurality of the evaluated images, any corresponding to a relatively small distance in the vertical direction is with higher preference selected as the consulted image than any corresponding to a relatively great distance in the vertical direction.

For another example, the (N+1) low-resolution images may be acquired at different times, and the motion amount detector may detect, as an adjacent frame motion amount, the amount of motion between every two temporally adjacent low-resolution images among the (N+1) low-resolution images. When the difference between the distances evaluated for a plurality of the evaluated images is less than or equal to a predetermined threshold value, the image evaluator may perform selection operation such that, of the plurality of the evaluated images, any corresponding to a relatively small adjacent frame motion amount is with higher preference selected as the consulted image than any corresponding to a relatively great adjacent frame motion amount.

For another example, when the resolution enhancement factor by which the high-resolution image is generated from the low-resolution images is greater in a first direction than in a second direction perpendicular to the first direction, and in addition the difference between the distances evaluated for a plurality of the evaluated images is less than or equal to a predetermined threshold value, the image evaluator may find, for each of the plurality of the evaluated images, the distance in the first direction between the datum position and a pixel position on that evaluated image, and then perform selection operation such that, of the plurality of the evaluated images, any corresponding to a relatively small distance in the first direction is with higher preference selected as the consulted image than any corresponding to a relatively great distance in the first direction.

For another example, the distance evaluated for one evaluated image of interest may be the distance, on that one evaluated image of interest, between the position of the pixel closest to the datum position and the datum position.

For another example, the image processing apparatus may receive L low-resolution images (where L is an integer greater than (N+1)), and the image processing apparatus may be further provided with: a second motion amount detector that takes one of the L low-resolution images as the datum image and detects, as a second motion amount, the amount of motion between the low-resolution image as the datum image and each of the other (L−1) low-resolution images; and an image number reducer that generates, based on the second motion amounts, the (N+1) low-resolution images from the L low-resolution images, and that feeds the thus generated (N+1) low-resolution images to the image input portion.

A single common motion amount detector may be shared as both the motion amount detector and the second motion amount detector.

For example, when a plurality of the second motion amounts detected for a plurality of low-resolution images among the (L−1) low-resolution images are substantially equal, the image number reducer may generate one low-resolution image by merging together, or selecting one out of, those plurality of low-resolution images, and then generate the (N+1) low-resolution images to be fed to the image input portion by selecting that one low-resolution image as one of the (N+1) low-resolution images while excluding those plurality of low-resolution images from the (N+1) low-resolution images.

For another example, the second motion amount detector may detect, as an adjacent frame motion amount, the amount of motion between every two temporally adjacent low-resolution images among the L low-resolution images. When a plurality of the second motion amounts detected for a plurality of low-resolution images among the (L−1) low-resolution images are substantially equal, and in addition a plurality of the adjacent frame motion amounts detected for said plurality of low-resolution images are substantially equal, the image number reducer may generate one low-resolution image by merging together, or selecting one out of, those plurality of low-resolution images, and then generate the (N+1) low-resolution images to be fed to the image input portion by selecting that one low-resolution image as one of the (N+1) low-resolution images while excluding those plurality of low-resolution images from the (N+1) low-resolution images.

For another example, the second motion amounts may have a higher resolution than the pixel interval of the low-resolution images, and may each be composed of a pixel-unit motion amount component and a subpixel-unit motion amount component, and the image number reducer may generate the (N+1) low-resolution images from the L low-resolution images based on the subpixel-unit motion amount components.

For another example, the low-resolution images may each be an image composed of a plurality of types of color signal, and the image number reducer and the resolution enhancer may each perform operation thereof separately for each type of color signal.

For another example, when a plurality of the second motion amounts detected for a plurality of low-resolution images among the (L−1) low-resolution images are substantially equal, the image number reducer may generate one low-resolution image as a merged low-resolution image by merging together those plurality of low-resolution images, and then generate the (N+1) low-resolution images to be fed to the image input portion by selecting the merged low-resolution image as one of the (N+1) low-resolution images while excluding those plurality of low-resolution images from the (N+1) low-resolution images. The resolution enhancer may be provided with a weight coefficient setter that sets a weight coefficient for each of the datum image and the M consulted images, and may generate the high-resolution image according to the thus set weight coefficients. When the (M+1) weight coefficients set by the weight coefficient setter include a weight coefficient for the merged low-resolution image, the weight coefficient setter may make the weight coefficient for the merged low-resolution image different from the other weight coefficients.

According to another aspect of the invention, an electronic appliance is provided with an image processing apparatus as described above, acquires (N+1) images by input from outside, or by shooting, and feeds an image signal of the (N+1) images to the image processing apparatus. The image processing apparatus receives the (N+1) images as the (N+1) low-resolution images.

According to yet another aspect of the invention, an electronic appliance is provided with an image processing apparatus as described above, acquires L images by input from outside, or by shooting, and feeds an image signal of the L images to the image processing apparatus. The image processing apparatus receives the L images as the L low-resolution images.

According to still another aspect of the invention, an image processing method includes: an image input step of receiving (N+1) low-resolution images (where N is an integer of 2 or more); a motion amount detection step of taking one of the (N+1) low-resolution images as a datum image and detecting the amount of motion between the low-resolution image taken as the datum image and each of the other N low-resolution images; an image evaluation step of selecting, based on the detected amounts of motion, M (where M is an integer of 1 or more fulfilling N>M) out of the N low-resolution images each as a consulted image; and a resolution enhancement step of producing, based on the detected amounts of motion, the datum image, and the M consulted images, a high-resolution image having higher resolution than the low-resolution images. Here, in the image evaluation step, each of the N low-resolution images is taken as an evaluated image. When an image coordinate system common to the datum image and the evaluated images is called the common coordinate system and, based on the detected amounts of motion, the datum image and the evaluated images are arranged in the common coordinate system, in the image evaluation step, based on a pixel position on the datum image in the common coordinate system, a datum position in the common coordinate system is set, then, for each evaluated image, the distance between the datum position and a pixel position on that evaluated image is evaluated, and then an evaluated image corresponding to a relatively small distance is selected as the consulted image, while an evaluated image corresponding to a relatively great distance is excluded from the M consulted images.

BRIEF DESCRIPTION OF THE DRAWINGS

FIGS. 6A to 6E are diagrams illustrating the basic concept of selection optimization processing in a first embodiment of the invention, FIG. 6A being a diagram showing a brightness distribution on a subject, FIGS. 6B to 6E being each a diagram showing the image data of a low-resolution image obtained by the shooting of the subject;

FIG. 14 is a block diagram of part of an image sensing apparatus, including an internal block diagram of the image processor in FIG. 1, according to the first embodiment of the invention;

FIG. 18A is a diagram showing how, relative to a given low-resolution image, another low-resolution image is displaced in the horizontal direction by one pixel of a high-resolution image, and FIG. 18B is a diagram showing the two low-resolution images superposed on each other in a common coordinate system;

FIGS. 20A to 20C are diagrams showing the positional relationship between pixels on a first to a third low-resolution image, respectively, and pixels on a high-resolution image;

FIGS. 23A and 23B are each a diagram showing the 5×5-pixel rectangular region centered around a pixel of interest on a high-resolution image;

DETAILED DESCRIPTION OF PREFERRED EMBODIMENTS

Hereinafter, embodiments of the present invention will be described specifically with reference to the accompanying drawings. Among different drawings referred to in the course of description, the same parts are identified by the same reference signs, and in principle no overlapping description of the same parts will be repeated.

The following description mainly deals with image sensing apparatuses, such as digital still cameras and digital video cameras, as examples of electronic appliances provided with an image processing apparatus (corresponding to the image processor described later) that performs image processing according to the invention. As will be described later, it is also possible to build display apparatuses (such as liquid crystal displays and plasma televisions) provided with a similar image processing apparatus to perform with it digital processing of images.

First Embodiment

First, a first embodiment of the invention will be described. Configuration of Image sensing Apparatus The internal configuration of an image sensing apparatus according to a first embodiment of the invention will be described below with reference to the relevant drawings.

Figure 1:
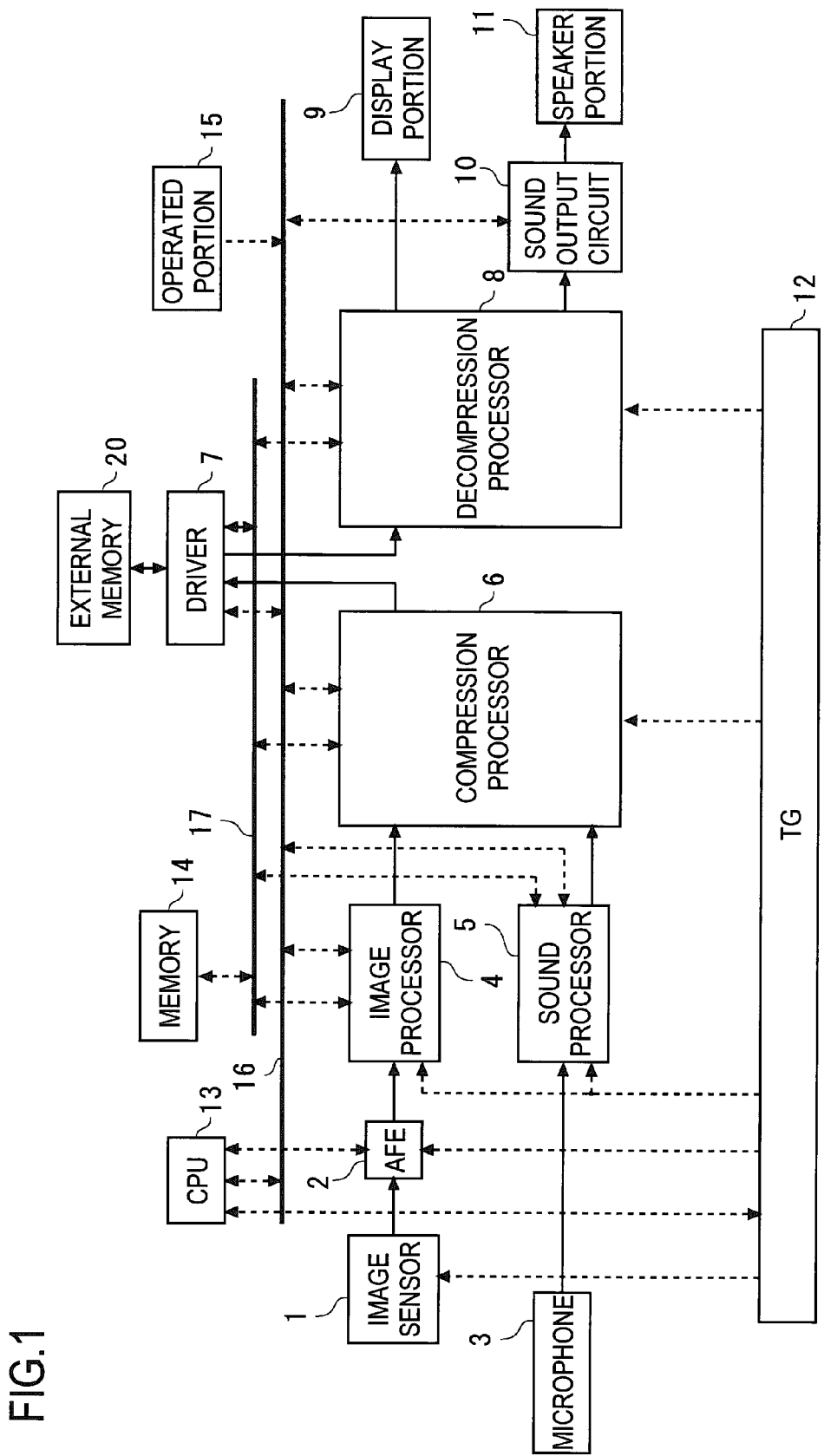
FIG. 1 is an overall block diagram of an image sensing apparatus according to the invention.

FIG. 1 is an overall block diagram showing the internal configuration of the image sensing apparatus.

The image sensing apparatus of FIG. 1 includes: an image sensor (solid-state image sensing device) 1, such as a CCD (charge-coupled device) or CMOS (complimentary metal oxide semiconductor) image sensor, that converts the light incident from a subject into an electric signal; an AFE (analog front end) 2 that converts the analog image signal output from the image sensor 1 into a digital image signal; a microphone 3 that converts the sound input from outside into an electric signal; an image processor 4 that performs various kinds of image processing, including super-resolution processing, on the digital image signal from the AFE 2; a sound processor 5 that converts the analog sound signal from the microphone 3 into a digital sound signal; a compression processor 6 that performs compression/encoding processing, conforming to the MPEG (Moving Picture Experts Group) compression method or the like, on the image signal from the image processor 4 and the sound signal from the sound processor 5; a driver 7 that records the compressed/encoded signal (hereinafter also called simply "compressed signal") compressed/encoded by the compression processor 6 to an external memory 20; a decompression processor 8 that decompresses and thereby decodes the compressed signal read out from the external memory 20 via the driver 7; a display portion 9 that displays an image based on the image signal obtained by the decoding by the decompression processor 8; a sound output circuit 10 that converts the sound signal from the decompression processor 8 into an analog sound signal; a speaker portion 11 that reproduces and outputs sound based on the sound signal from the sound output circuit 10; a timing generator (TG) 12 that outputs timing control signals for synchronizing the operation timing of different blocks within the image sensing apparatus; a CPU (central processing unit) 13 that controls the overall operation of the image sensing apparatus; a memory 14 that stores programs for different operations and also temporarily store data during the execution of programs; an operated portion 15 that is operated by the user to enter commands; a bus 16 across which data is exchanged between the CPU 13 and different blocks within the image sensing apparatus; and a bus 17 across which data is exchanged between the memory 14 and different blocks within the image sensing apparatus.

In this image sensing apparatus, when a command to shoot a moving image is entered on the operated portion 15, an analog image signal obtained by the photoelectric conversion by the image sensor 1 is output to the AFE 2. Here, fed with a timing control signal from the timing generator 12, the image sensor 1 performs horizontal and vertical scanning, and outputs, as an image signal, the data of the individual pixels provided in the image sensor 1. The analog image signal is converted by the AFE 2 into a digital image signal, which is then fed to the image processor 4, which then performs various kinds of image processing on this image signal. The image processing here includes signal conversion processing for generating luminance and color-difference signals, for instance.

When an operation requesting image resolution enhancement is made on the operated portion 15, the image processor 4 executes super-resolution processing based on a image signal equivalent to a plurality of frames from the image sensor 1. Based on the image signal obtained by the super-resolution processing executed here, the image processor 4 generates luminance and color-difference signals. For the execution of the super-resolution processing, the amounts of motion between different frames are calculated and, according to the calculated amounts of motion, position adjustment is performed among the frames (the details will be described later).

Under the control of the timing generator 12, the image sensor 1 can shoot images sequentially at predetermined frame intervals, and, through such sequential shooting, a series of chronologically ordered images is acquired. Each image in such a series of images is called "frame image", or simply "frame".

The image signal having undergone the image processing (which may include super-resolution processing) by the image processor 4 is fed to the compression processor 6. Here, the analog sound signal obtained by the microphone 3 collecting sound is converted by the sound processor 5 into a digital sound signal, which is then fed to the compression processor 6. The compression processor 6 compresses/encodes the digital image and sound signals from the image processor 4 and the sound processor 5 by the MPEG compression method and then records them to the external memory 20 via the driver 7. When the compressed signal recorded in the external memory 20 is read out by the driver 7 and fed to the decompression processor 8, there it is subjected to decompression processing, and thus an image signal based on the compressed signal is obtained. This image signal is fed to the display portion 9, which thus displays the image of the subject as shot by the image sensor 1.

Discussed above is the operation for shooting a moving image, and similar to that is the operation performed when a command to shoot a still image is entered on the operated portion 15. One difference is that, when a command to shoot a still image is entered, no sound signal is acquired by the microphone 3, and a compressed signal containing an image signal alone is recorded to the external memory 20. Another difference is that, when a still image is shot, not only is the compressed signal of the still image shot in response to the command entered on the operated portion 15 recorded to the external memory 20, also a compressed signal corresponding to the image currently being shot by the image sensor 1 is temporarily recorded to the external memory 20. Feeding this compressed signal corresponding to the currently shot image via the decompression processor 8 to the display portion 9 permits the user to confirm the image currently being shot by the image sensor 1. The image signal generated by the image processor 4 may be fed intact, without undergoing compression/encoding processing and decompression processing, to the display portion 9.

According to timing control signals from the timing generator 12, the image sensor 1, the AFE 2, the image processor 4, the sound processor 5, the compression processor 6, and the decompression processor 8 operate in synchronism with the shooting of one frame after another by the image sensor 1. When a still image is shot, the timing generator 12 feeds timing control signals to the image sensor 1, the AFE 2, the image processor 4, and the compression processor 6 to synchronize their operation.

When a command to reproduce a moving image recorded in the external memory 20 is entered on the operated portion 15, the compressed signal corresponding to the moving image which is recorded in the external memory 20 is read out by the driver 7 and is fed to the decompression processor 8. The decompression processor 8 subjects the compressed signal read out to decompression/decoding by the MPEG compression method, and thus an image signal and a sound signal are acquired. The obtained image signal is fed to the display portion 9 to reproduce and display an image, and the obtained sound signal is fed via the sound output circuit 10 to the speaker portion 11 to reproduce and output sound. In this way, the moving image based on the compressed signal recorded in the external memory 20 is reproduced along with the sound. When the compressed signal only contains an image signal, an image alone is reproduced and displayed on the display portion 9.

As described above, the image processor 4 is configured to be capable of performing super-resolution processing. Through super-resolution processing, one high-resolution image is generated from a plurality of low-resolution images. The image signal of this high-resolution image can be recorded via the compression processor 6 to the external memory 20. The resolution of the high-resolution image is higher than that of the low-resolution images, the high-resolution image having larger numbers of pixels in the horizontal and vertical directions than the low-resolution images. For example, in response to a command to shoot a still image, a plurality of frames (frame images) are acquired as a plurality of low-resolution images, and are subjected to super-resolution processing to generate a high-resolution image. Alternatively, for example, a plurality of frames (frame images)

obtained as a plurality of low-resolution images when a moving image is shot are subjected to super-resolution processing.

Basic Concept of Super-Resolution Processing

Figure 2:
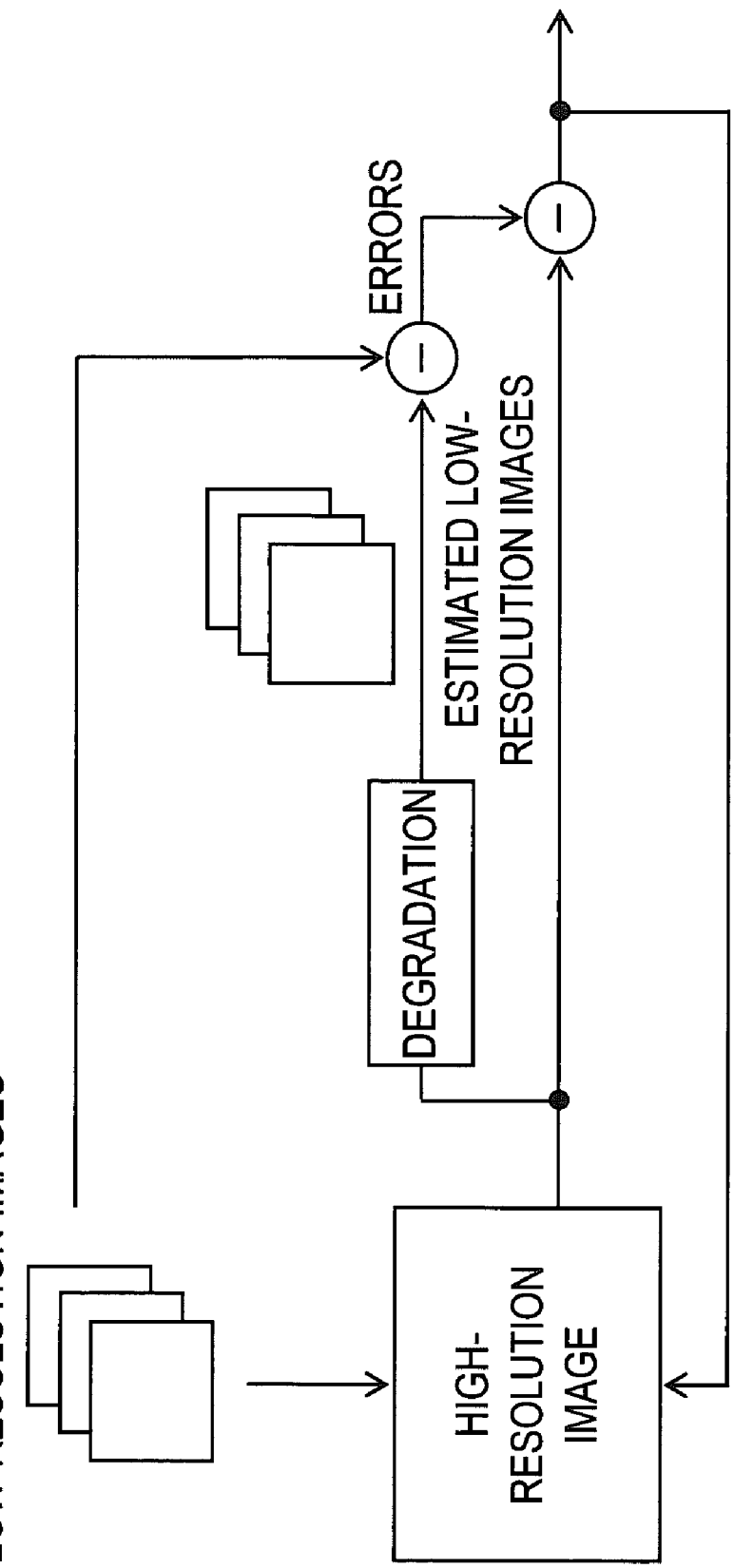
FIG. 2 is a conceptual diagram of super-resolution processing employing the MAP method as a type of reconstruction-based method.

The basic concept of super-resolution processing will now be described briefly. Taken up below as an example will be super-resolution processing employing the reconstruction-based method. FIG. 2 is a conceptual diagram of super-resolution processing employing the MAP (maximum a posterior) method as a type of reconstruction-based method. In this super-resolution processing, one high-resolution image is estimated from a plurality of low-resolution images obtained by actual shooting, and then the estimated high-resolution image is degraded back to estimate the original, plurality of, low-resolution images. The low-resolution images obtained by actual shooting is called "actual low-resolution images", and the estimated low-resolution images are called "estimated low-resolution images". Thereafter the high- and low-resolution images are estimated repeatedly, the former from the latter and then vice versa, such as to minimize the errors between the actual and estimated low-resolution images, and the ultimately acquired high-resolution image is output.

Figure 3:
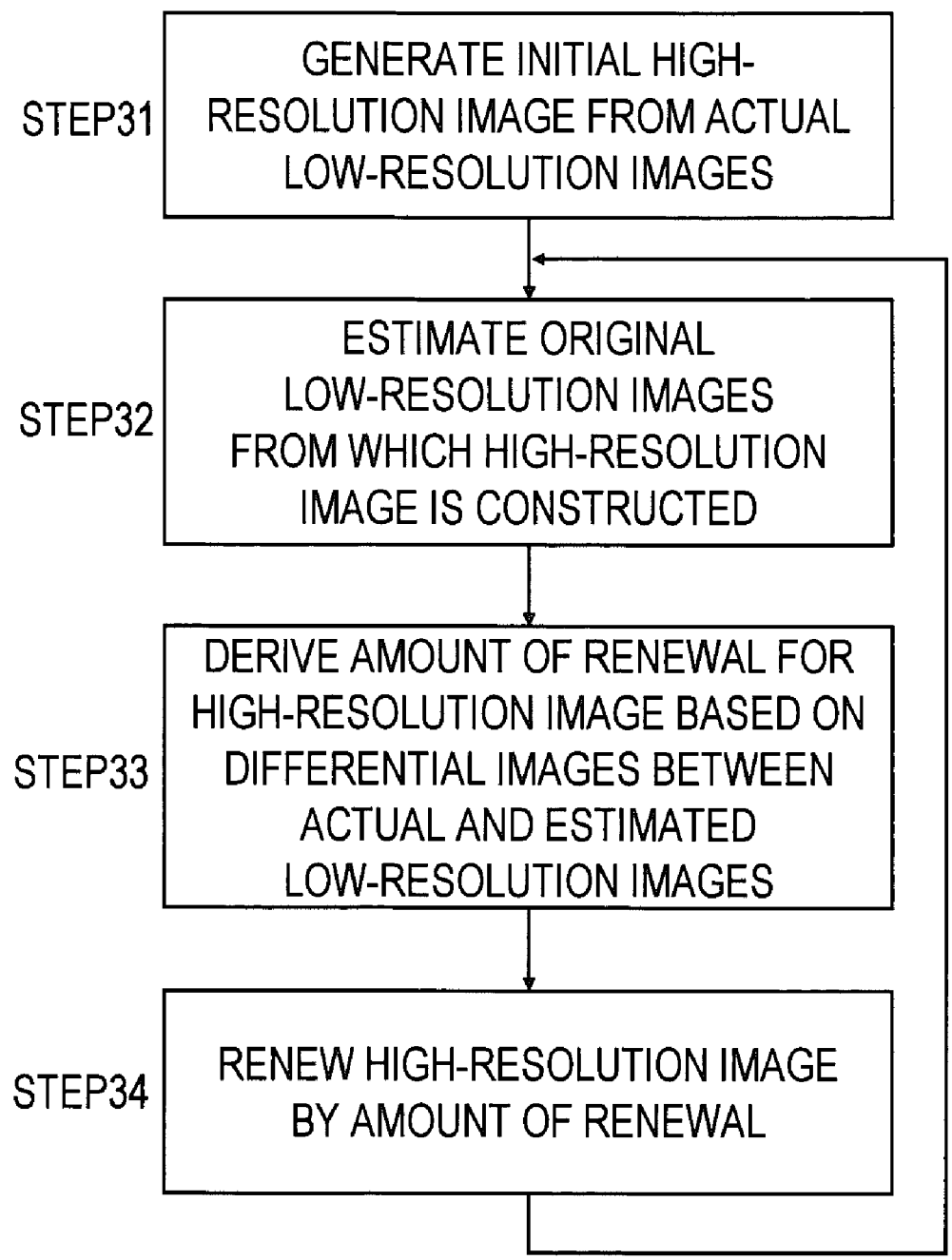
FIG. 3 is a flow chart showing the flow of super-resolution processing according to the invention.

FIG. 3 is a flowchart showing the flow of the super-resolution processing. First, in Step 31, an initial high-resolution image is generated from actual low-resolution images. Next, in Step 32, the actual low-resolution images from which the current high-resolution image is constructed are estimated. The estimated images are called, as mentioned above, "estimated low-resolution images". Next, in Step 33, based on the differential images between the actual and estimated low-resolution images, the amount of renewal with respect to the current high-resolution image is derived. This amount of renewal will be, through repeated execution of the processing from Steps 32 through 34, so derived as to minimize the errors between the actual and estimated low-resolution images. Then, in Step 34, by use of the amount of renewal, the current high-resolution image is renewed to generate a new high-resolution image. Thereafter, back in Step 32, the newly generated high-resolution image is taken as the current high-resolution image, and then the processing from Steps 32 through 34 is executed repeatedly. Basically, the greater the number of times the processing from Steps 32 through 34 is repeated, the higher the virtual resolution of the high-resolution image obtained, and thus the closer it is to the ideal.

Now, with reference to FIGS. 4A to 4D and 5A to 5D, the basic concept of super-resolution processing will be described more specifically. In the following description of the basic concept of super-resolution processing, for the sake of simplicity, it is assumed that each image is one-dimensional, and that super-resolution processing is performed based on two actual low-resolution images Fa and Fb. With respect to a pixel of interest, its "pixel value" denotes the data representing the brightness and hue of that pixel. In the following description, however, it is assumed that the pixel value of a given pixel is the brightness value representing the brightness of that pixel.

Moreover, in the following description, the data representing the pixel values of a given image is often called its "image data". Moreover, in the following description, designations are often abbreviated where the corresponding symbols accompany them, like "image Fa" standing for "actual low-resolution image Fa", both denoting the same.

Figure 4A:
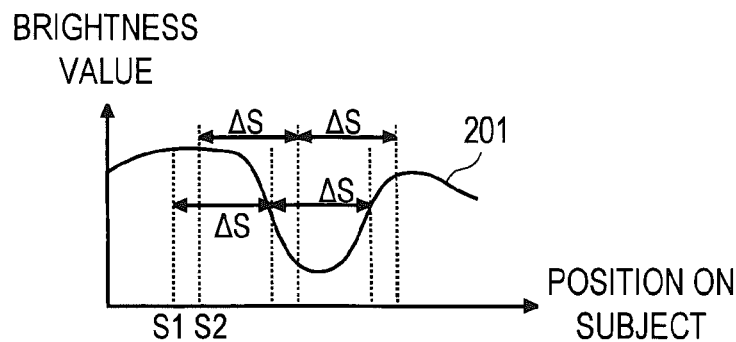
FIGS. 4A to 4D are diagrams illustrating the basic concept of super-resolution processing according to the invention, FIG. 4A being a diagram showing a brightness distribution on a subject, FIGS. 4B to 4D being diagrams showing the image data of the subject.
Figure 4B:
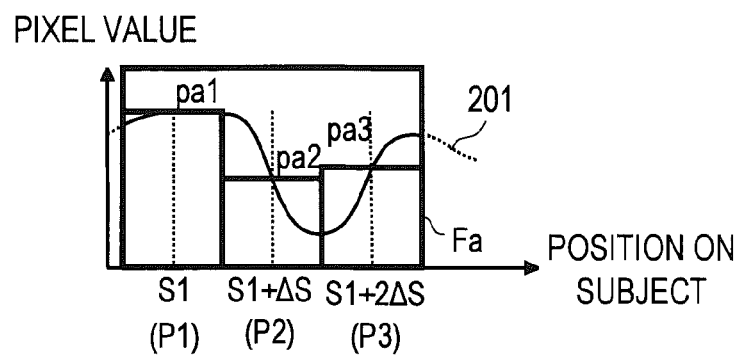
Figure 4C:
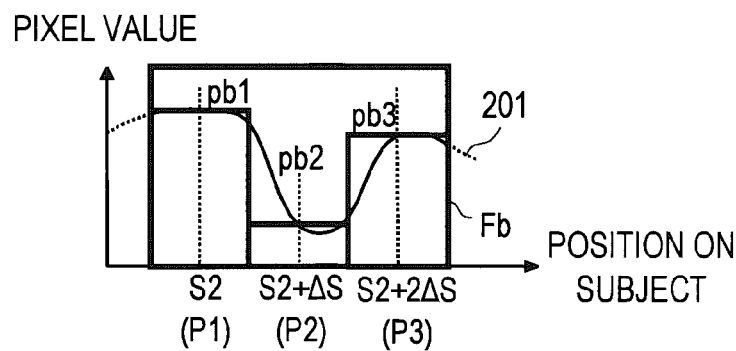
Figure 4D:
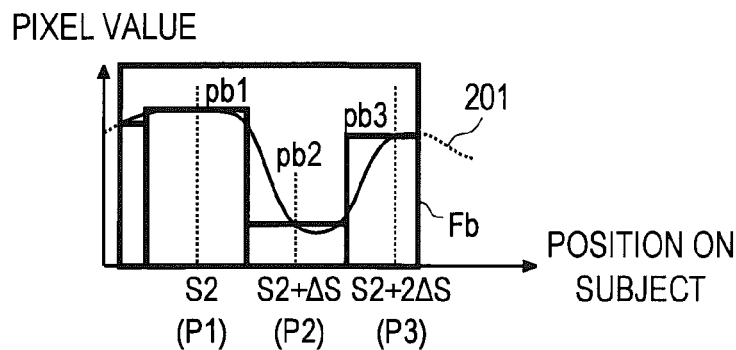

In each of FIGS. 4A to 4D, the curve 201 represents the brightness distribution on the subject of the image sensing apparatus. In each of FIGS. 4A to 4D, the horizontal axis represents the position on the subject, and the vertical axis represents the pixel value (brightness value). FIG. 4B is a conceptual diagram of the image data of an actual low-resolution image Fa obtained by the shooting of the subject at time T1, and FIG. 4C is a conceptual diagram of the image data of an actual low-resolution image Fb obtained by the shooting of the subject at time T2. FIG. 4D will be described later. FIGS. 5A to 5D are diagrams showing the flow of the operations through which a high-resolution image is found from the low-resolution images. FIGS. 5A, 5B, 5C, and 5D correspond to the processing in Step 31, Step 32, Step 33, and Step 34 in FIG. 3 respectively.

Suppose that, at time T1, the brightness of the subject is sampled at sampling points S1, (S1+ΔS), and (S1+2ΔS) (see FIG. 4B). Here, ΔS represents the interval between adjacent pixels on the low-resolution image. On one hand, the actual low-resolution images Fa and Fb each have pixels P1 to P3. Thus, the pixel values pa1, pa2, and pa3 at pixels P1, P2, and P3 on the actual low-resolution image Fa are the brightness values of the subject at sampling points S1, (S1+ΔS), and (S1+2ΔS). On the other hand, suppose that, at time T2, the brightness of the subject is sampled at sampling points S2, (S2+ΔS), and (S2+2ΔS) (see FIG. 4C). Thus, the pixel values pb1, pb2, and pb3 at pixels P1, P2, and P3 on the actual low-resolution image Fb are the brightness values of the subject at sampling points S2, (S2+ΔS), and (S2+2ΔS).

Times T1 and T2 are different and, assume, hand shake or the like has caused a displacement between sampling points S1 and S2. Then the actual low-resolution image Fb shown in FIG. 4C can be regarded as an image containing a displacement corresponding to the amount of motion (S1-S2) relative to the actual low-resolution image Fa shown in FIG. 4B as a datum. When the displacement of the actual low-resolution image Fb shown in FIG. 4C is corrected such as to cancel the amount of motion (S1-S2), then the actual low-resolution image Fb is expressed as shown in FIG. 4D.

Figure 5A:
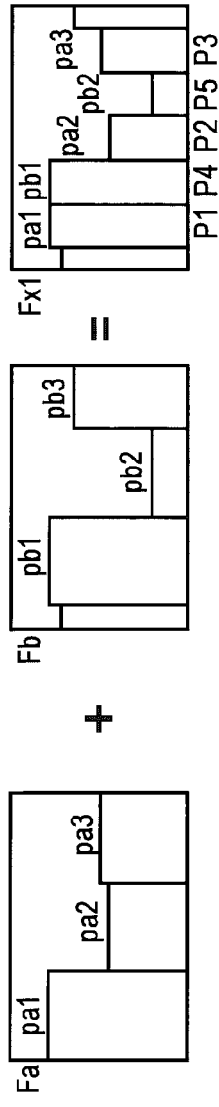
FIGS. 5A to 5D are diagrams illustrating the basic concept of super-resolution processing according to the invention.

By combining together the actual low-resolution images Fa and Fb after displacement correction, i.e. those shown in FIGS. 4B and 4D, a high-resolution image Fx1 is estimated. How this estimation is done is shown in FIG. 5A. The estimation here corresponds to the processing in Step 31 in FIG. 3. For the sake of simplicity, discussed below will be a case where the resolution is made twice as high by super-resolution processing. Specifically, it is assumed that, in addition to pixels P1 to P3, the high-resolution image Fx1 further has pixel P4, located halfway between pixels P1 and P2, and pixel P5, located halfway between pixels P2 and P3.

A high-resolution image is generated with one of a plurality of actual low-resolution images taken as a datum. The actual low-resolution image taken as the datum is called "datum frame". Of the plurality of actual low-resolution images for generating the high-resolution image, those other than the datum frame are called "consulted frames".

Suppose now that the actual low-resolution image Fa is the datum frame (in which case, the actual low-resolution image Fb is a consulted frame). Then the pixel values at pixels P1, P2, and P3 on the high-resolution image Fx1 are equal to the pixel values pa1, pa2, and pa3 on the actual low-resolution image Fa. The pixel value at pixel P4 is, for example, made equal to the pixel value of the nearest to it of the pixels (P1, P2, and P3) on the actual low-resolution images Fa and Fb after displacement correction. The pixel position of a pixel of interest denotes the center position of that pixel. Here it is assumed that the pixel position of pixel P1 on the actual low-resolution image Fb after displacement correction is the closest to the pixel position of pixel P4. Then the pixel value of pixel P4 is made equal to pb1. It is also assumed that the pixel value of pixel P5 is determined likewise and is made equal to pb2. In this way, it is possible to estimate as the high-resolution image Fx1 one having the pixel values pa1, pa2, pa3, pb1, and pb2 at pixels P1 to P5 respectively.

Figure 5B:
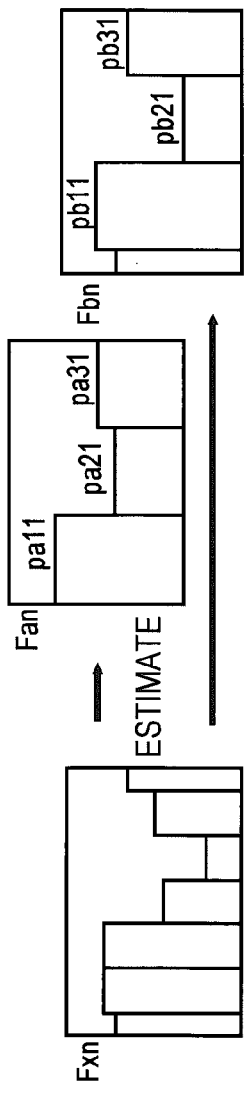

Thereafter, the high-resolution image Fx1 is treated with a conversion formula including as parameters the amount of down sampling, the amount of blur attributable to resolution reduction, and the amount of displacement (corresponding to the amount of motion) to generate estimated low-resolution images Fa1 and Fb1 as an estimated version of the actual low-resolution images Fa and Fb as shown in FIG. 5B. As will be described later, the processing including the estimation of the actual low-resolution images and the estimation of the high-resolution image based on them is executed repeatedly. The estimated version of the actual low-resolution images Fa and Fb obtained at the n-th execution of the processing is represented by Fan and Fbn respectively, and the high-resolution image obtained at the n-th execution of the processing is represented by Fxn (where n is a natural number). FIG. 5B shows the estimated low-resolution images obtained at the n-th execution of the processing, i.e. the estimated low-resolution images Fan and Fbn generated based on the high-resolution image Fxn. The processing of generating the estimated low-resolution images Fan and Fbn based on the high-resolution image Fxn corresponds to the processing in Step 32 in FIG. 3.

At the first execution of Step 32, based on the high-resolution image Fx1, the pixel values at sampling points S1, (S1+ΔS), and (S1+2ΔS) are estimated, and an estimated low-resolution image Fa1 is generated that has the estimated pixel values pa11, pa21, and pa31 at pixels P1, P2, and P3 respectively. Likewise, based on the high-resolution image Fx1, the pixel values at sampling points S2, (S2+ΔS), and (S2+2ΔS) are estimated, and an estimated low-resolution image Fb1 is generated that has the estimated pixel values pb1, pb21, and pb31 at pixels P1, P2, and P3 respectively.

Figure 5C:
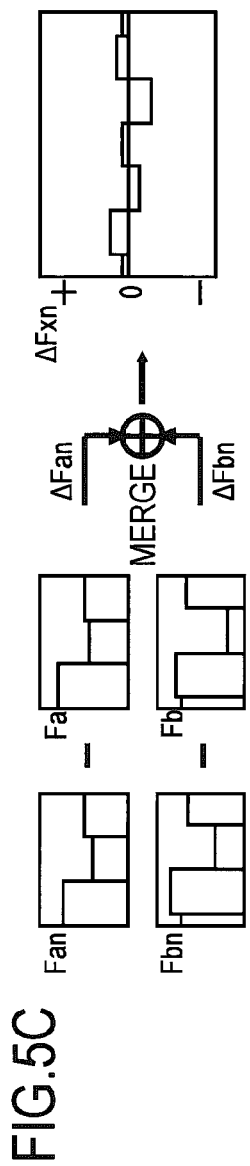

Then, as shown in FIG. 5C, the differences between the estimated low-resolution image Fa1 and the actual low-resolution image Fa, and the differences between the estimated low-resolution image Fb1 and the actual low-resolution image Fb, are found, and the former and latter differences are merged together to generate a differential image ΔFx1 with respect to the high-resolution image Fx1. The differential image with respect to the high-resolution image Fxn is represented by ΔFxn (where n is a natural number). FIG. 5C shows the differential image ΔFxn, i.e. the differential image ΔFxn obtained by merging together the differential images ΔFan and ΔFbn between the estimated low-resolution images Fan and Fbn and the actual low-resolution images Fa and Fb. To estimate an ideal high-resolution image, the high-resolution image Fxn is renewed by use of the differential image ΔFxn (the details will be described later), the differential image ΔFxn representing the contents of renewal (the amount of renewal). The processing for calculating the differential image ΔFxn to derive the contents of renewal (the amount of renewal) corresponds to the processing in Step 33 in FIG. 3.

The differences in pixel value (pa11−pa1), (pa21−pa2), and (pa31−pa3) at pixels P1, P2, and P3 between the estimated low-resolution image Fa1 and the actual low-resolution image Fa are the pixel values of the differential image ΔFa1, and the differences in pixel value (pb11−pb1), (pb21−pb2), and (pb31−pb3) at pixels P1, P2, and P3 between the estimated low-resolution image Fb1 and the actual low-resolution image Fb are the pixel values of the differential image ΔFb1.

Then the pixel values of the differential images ΔFa1 and ΔFb1 are merged together to calculate the differences at pixels P1 to P5 respectively, and thereby the differential image ΔFx1 with respect to the high-resolution image Fx1 is generated. When the pixel values of the differential images ΔFa1 and ΔFb1 are merged together to generate the differential image ΔFx1, in a case where the MAP method or the ML (maximum-likelihood) method is used, squared errors are used as an evaluation function. Specifically, the evaluation function for the MAP or ML method has the value obtained by adding up, between frames, the squares of the pixel values of the differential images ΔFa1 and ΔFb1. Accordingly, the gradient of the evaluation function, determined by differentiating it, corresponds to values twice as great as the pixel values of the differential images ΔFa1 and ΔFb1. Thus the differential image ΔFx1 with respect to the high-resolution image Fx1 is calculated by use of values twice as great as the pixel values of the differential images ΔFa1 and ΔFb1.

Figure 5D:
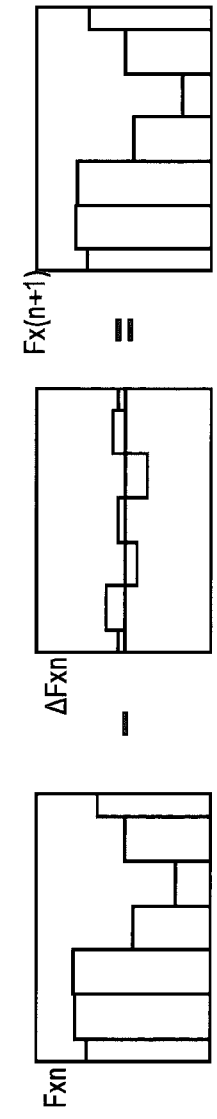

After the generation of the differential image ΔFx1, as shown in FIG. 5D, the pixel values (differences) at pixels P1 to P5 on the differential image ΔFx1 are subtracted from the pixel values at pixels P1 to P5 on the high-resolution image Fx1 (in other words, the high-resolution image Fx1 is renewed by use of the differential image ΔFx1). Through this subtraction, a high-resolution image Fx2 is reconstructed. As compared with the high-resolution image Fx1, the high-resolution image Fx2 has pixel values closer to the brightness distribution on the subject shown in FIG. 4A. FIG. 5D shows the high-resolution image Fx(n+1) acquired at the n-th execution of the processing, i.e. the high-resolution image Fx(n+1) obtained by subtracting the differential image ΔFxn from the high-resolution image Fxn. The processing of renewing the high-resolution image Fxn based on the differential image ΔFxn as the amount of renewal to generate a new high-resolution image Fx(n+1) corresponds to the processing in Step 34 in FIG. 3.

Then, as the processing from Steps 32 through 34 is executed repeatedly, the pixel values of the differential image ΔFxn obtained in Step 33 decrease, and the pixel values of the high-resolution image Fxn converge to pixel values largely agreeing with the brightness distribution of the subject shown in FIG. 4A. At the n-th execution of Steps 32 and 34, by use of the high-resolution image Fxn obtained at the previous (i.e. (n−1)-th) execution of Step 34, estimated low-resolution images Fan and Fbn and a high-resolution image Fx(n+1) are generated. Then, when the pixel values of the differential image ΔFxn have become less than a predetermined value, or when the pixel values of the differential image ΔFxn have completely converged, the high-resolution image Fxn obtained at the previous (i.e., (n−1)-th) execution of Step 34 is taken as the ultimately obtained high-resolution image, and the super-resolution processing is ended.

As a method for achieving super-resolution processing that proceeds basically through the flow of operations described above, the image processor 4 employs the ML (maximum-likelihood) method, the MAP (maximum a posterior) method, the POCS (projection onto convex set) method, the IBP (iterative back projection) method, or the like. For example, in a case where the MAP method is used, the differential image ΔFxn (the amount of renewal), acquired in Step 33, with respect to the high-resolution image Fxn is constructed by a gradient image having, as its pixel values, values obtained by differentiating by the gradient method the evaluation function for the MAP method. Specifically, by merging together the differential images ΔFan and ΔFbn having, as their pixel values, the squared errors at the individual pixel positions and obtained by the method of least squares, the differential image with respect to the high-resolution image Fxn is generated. Then, to this differential image, a constraining image for the high-resolution image Fxn, which is constrained by the "a posteriori" probability distribution, is added, and then the obtained image is differentiated by the gradient method; thus a gradient image corresponding to the differential image ΔFxn to be obtained in Step 33 is obtained. Then, in Step 34, the differential image ΔFxn following this gradient image is subtracted from the high-resolution image Fxn to generate a high-resolution image Fx(n+1).

When super-resolution processing is performed in this way, a plurality of actual low-resolution images to be used for the estimation of a high-resolution image are selected from a series of images output from the image sensor 1. Here, if the selected actual low-resolution images are not fit for the estimation of a high-resolution image, it is difficult to generate a high-resolution image perceivable as having high resolution. The image processor 4 has the function of selecting actual low-resolution images optimal for the generation of a satisfactory high-resolution image. In the following description, the processing for achieving this function is called "selection optimization processing". This selection optimization processing makes it possible to generate a satisfactory high-resolution image, and also speeds up the acquisition of the high-resolution image. Performing this selection corresponds to restricting the number of actual low-resolution images used for the generation of a high-resolution image. Thus, executing this selection alleviates the calculation load of the super-resolution processing in the image processor 4. The amounts of motion corresponding to the displacements between the plurality of selected actual low-resolution images are detected, and the image processor 4 corrects the displacements based on the detected amounts of motion. The displacement correction here will be described later.

In reconstruction-based super-resolution processing as exemplified by the MAP method, after an initial high-resolution image is generated, calculation processing (super-resolution calculation processing) including the calculation of the amount of renewal and the renewal of the high-resolution image by use of the amount of renewal is executed repeatedly. The repeated execution of this calculation processing, however, is not essential. The super-resolution processing in this embodiment may be any other than reconstruction-based super-resolution processing. Specifically, it is also possible to generate an initial high-resolution image from a plurality of low-resolution images selected through selection optimization processing and take that initial high-resolution image, without ever renewing it, as the ultimately obtained high-resolution image.

Selection of Actual Low-Resolution Images: Selection Optimization Processing

The basic concept of the selection optimization processing mentioned above, i.e. the basic concept of the method of selecting optimal actual low-resolution images as mentioned above, will now be described. In the following description of the basic concept of the selection method, for the sake of simplicity, it is assumed that each image is one-dimensional, and that three actual low-resolution images will be selected from four actual low-resolution images obtained by shooting at different times. Here, the three actual low-resolution images include a datum frame. Refer to FIGS. 6A to 6E. In each of FIGS. 6A to 6E, the curve 201 represents the brightness distribution on a subject. In each of FIGS. 6A to 6E, the horizontal axis represents the position on the subject, and the vertical axis represents the pixel value (brightness value). FIGS. 6B to 6E are conceptual diagrams of the image data of the actual low-resolution images Fa, Fb, Fc, and Fd obtained by the shooting of the subject at times T1, T2, T3, and T4 respectively.

Suppose that, at time T1, the brightness of the subject is sampled at sampling points S1 and (S1+ΔS); at time T2, the brightness of the subject is sampled at sampling points S2 and (S2+ΔS); at time T3, the brightness of the subject is sampled at sampling points S3 and (S3+ΔS); and at time T4, the brightness of the subject is sampled at sampling points S4 and (S4+ΔS). Here, times T1 to T4 are different, i.e. T1≠T2, T1≠T3, T1≠T4, T2≠T3, T2≠T4, and T3≠T4. Moreover, assume that hand shake or the like has caused displacements between one and the next of sampling points S1 to S4.

Figure 6B:
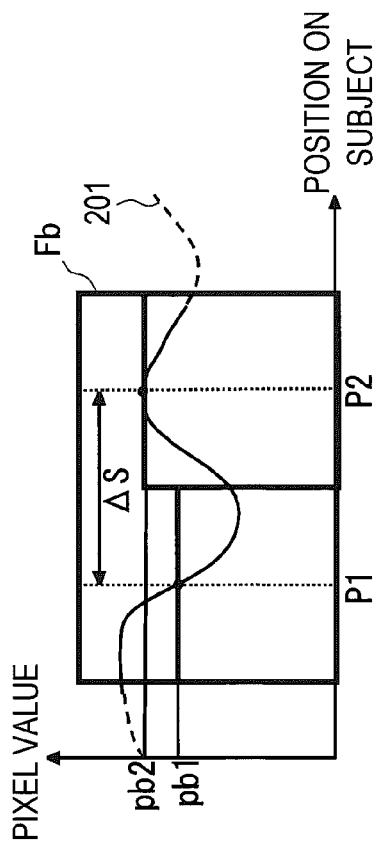
Figure 6C:
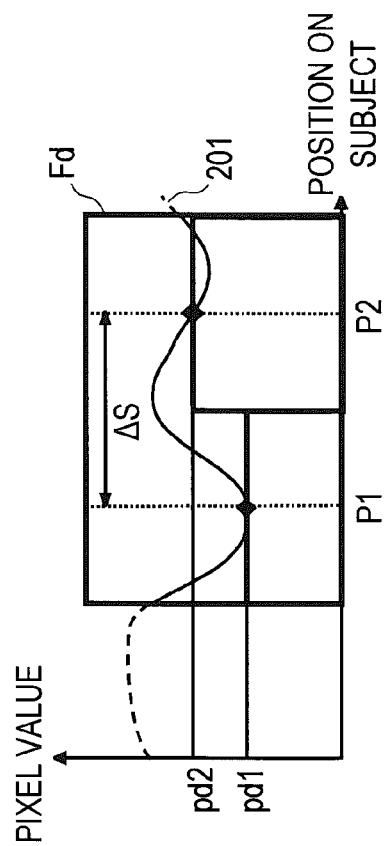
Figure 6D:
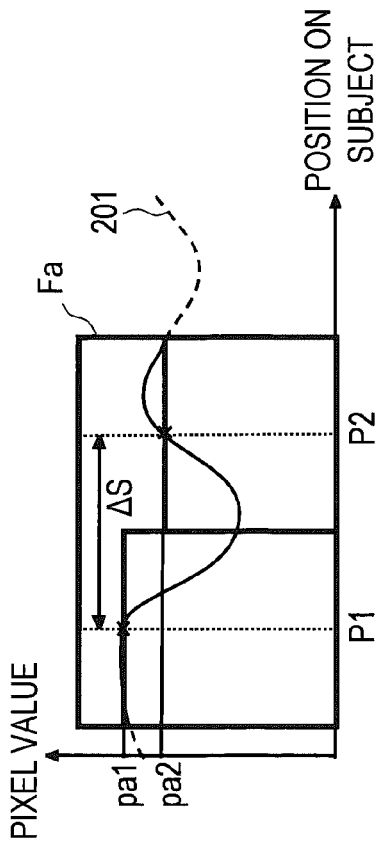
Figure 6E:
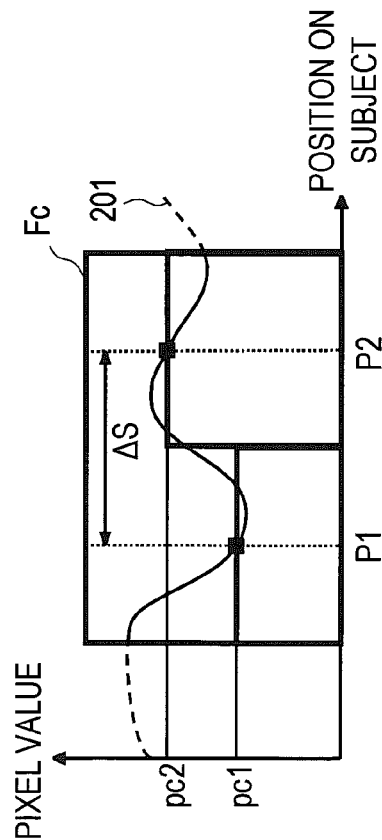

Suppose then that, as shown in FIG. 6B, the pixel values at pixels P1 and P2 on the actual low-resolution image Fa, corresponding to the first frame, are pa1 and pa2 respectively; as shown in FIG. 6C, the pixel values at pixels P1 and P2 on the actual low-resolution image Fb, corresponding to the second frame, are pb1 and pb2 respectively; as shown in FIG. 6D, the pixel values at pixels P1 and P2 on the actual low-resolution image Fc, corresponding to the third frame, are pc1 and pc2 respectively; and as shown in FIG. 6E, the pixel values at pixels P1 and P2 on the actual low-resolution image Fd, corresponding to the fourth frame, are pd1 and pd2 respectively.

The image Fa is an image having datums at pixels P1 and P2 corresponding to sampling points S1 and (S1+ΔS), the image Fb is an image having datums at pixels P1 and P2 corresponding to sampling points S2 and (S2+ΔS), the image Fc is an image having datums at pixels P1 and P2 corresponding to sampling points S3 and (S3+ΔS), and the image Fd is an image having datums at pixels P1 and P2 corresponding to sampling points S4 and (S4+ΔS). One of the actual low-resolution images Fa to Fd is taken as a datum frame and, here, it is assumed that the actual low-resolution image Fa has been taken as a datum frame. A high-resolution image is generated by enhancing the resolution of low-resolution images, and the following description deals with, separately, the processing for performing resolution enhancement by a factor of 2 and the processing for performing resolution enhancement by a factor of 3.

When the resolution enhancement factor is 2: First, a description will given of the processing performed when the resolution enhancement factor is 2. Considered in terms of one dimension, generating a high-resolution image of twice as high resolution as actual low-resolution images involves adding a new pixel position at the position halfway between every two adjacent pixels of the actual low-resolution image. Specifically, as shown in FIG. 7B, at the position halfway between pixels P1 and P2, a pixel position where a new pixel Px is to be located is added, so that a high-resolution image Fx is generated that has pixels P1, P2, and Px. Pixel Px is an interpolated pixel located halfway between pixels P1 and P2, which the actual low-resolution image have. An interpolated pixel denotes one interpolated between adjacent pixels of actual low-resolution image when a high-resolution image is generated, an example being pixel Px of the high-resolution image Fx in the example shown in FIG. 7B. Thus the high-resolution image Fx comes to have twice as many pixels as the actual low-resolution image.

When a high-resolution image Fx as shown in FIG. 7B is acquired by super-resolution processing, first, with the actual low-resolution image Fa, i.e. the datum frame, taken as a datum, based on the amounts of motion (S2−S1) between the images Fa and Fb, the amounts of motion (S3−S1) between the images Fa and Fc, and the amounts of motion (S4−S1) between the images Fa and Fd, the displacements present among the actual low-resolution images Fa to Fd are corrected. Specifically, the actual low-resolution images Fa to Fd are, for the purpose of processing, arranged in a common coordinate system, and on this common coordinate system, position adjustment is performed on the actual low-resolution images Fa to Fd. It should be noted that position adjustment means the same as displacement correction.

Figure 7A:
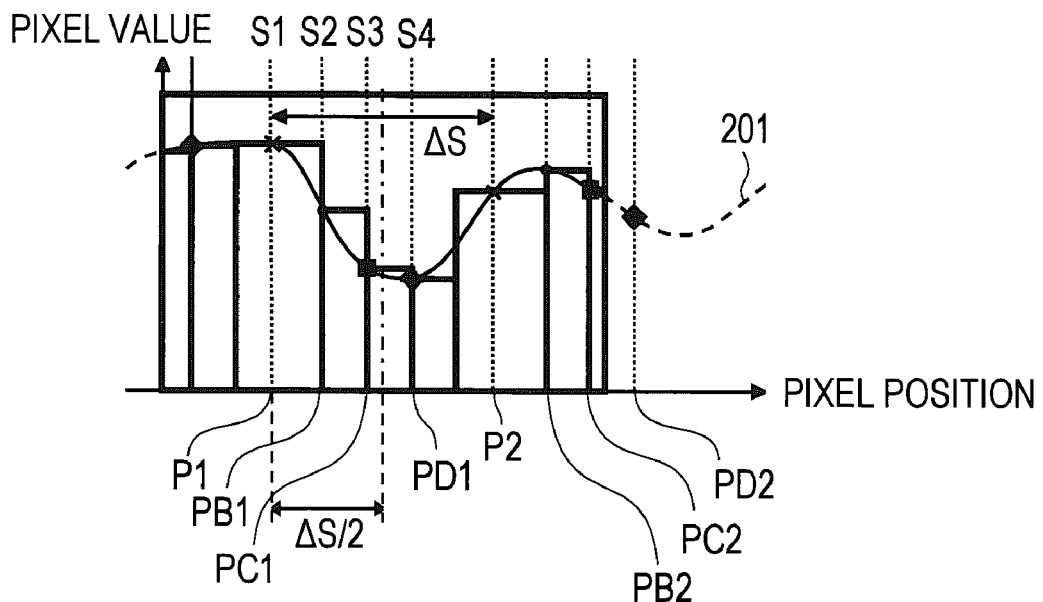
FIG. 7A is a diagram showing displacements in pixel positions among four low-resolution images.
Figure 7B:
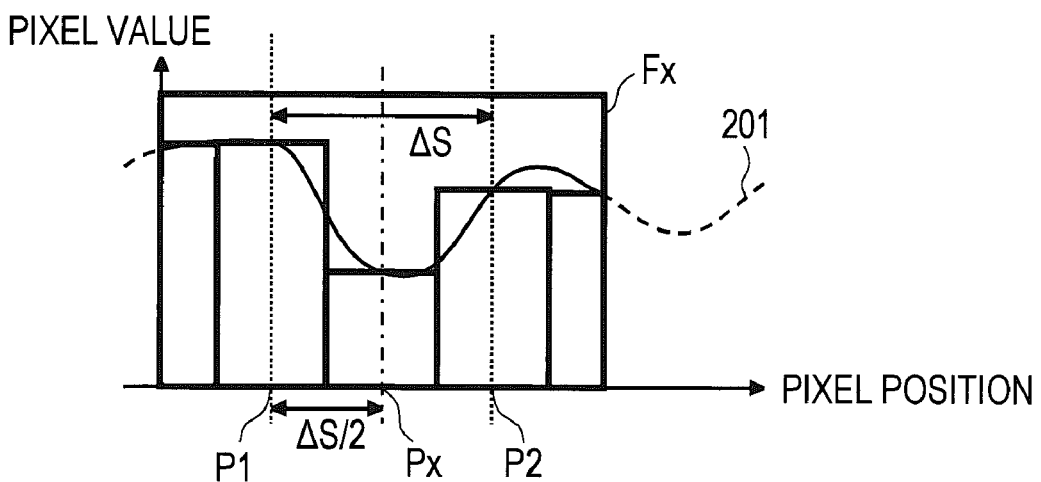
FIG. 7B is a diagram showing a high-resolution image estimated from a plurality of low-resolution images when the resolution enhancement factor is 2.

Through the position displacement correction here, as shown in FIG. 7A, the positions of pixels P1 and P2 on the actual low-resolution images Fb to Fd are displaced relative to the positions of pixels P1 and P2 on the actual low-resolution image Fa by distances corresponding to the amounts of motion (S2−S1), (S3−S1), and (S4−S1) respectively. The amount of motion (S2−S1) is the amount of motion appearing between sampling points S2 and S1; the amounts of motion (S3−S1) and (S4−S1) are explained similarly. Moreover, it is assumed that, in the common coordinate system, the positions of pixels P1 and P2 on the actual low-resolution images Fb to Fd are displaced to the right relative to the positions of pixels P1 and P2 on the actual low-resolution image Fa, and that the right side of the common coordinate system corresponds to the right side of FIGS. 6A, 7A, etc. It is also assumed that, in the common coordinate system, as a given point moves to the right, the value representing its position increases.

FIG. 7A is a diagram showing the relationship between the pixel position and the pixel value in the common coordinate system, and FIG. 7B is a conceptual diagram showing the image data of a high-resolution image Fx generated from a plurality of actual low-resolution images. In FIGS. 7A and 7B, the horizontal axis represents the pixel position in the common coordinate system, and the vertical axis represents the pixel value (brightness value).

When the actual low-resolution images Fa to Fd are combined together, the pixel values of pixels P1 and P2 in the common coordinate system are made equal to the pixel values pa1 and pa2 of pixels P1 and P2 on the actual low-resolution image Fa (see FIG. 6B). And, in the common coordinate system, the pixel values of the pixel positions PB1 and PB2 displaced to the right from pixels P1 and P2 by the amount of motion (S2−S1) are made equal to the pixel values pb1 and pb2 of pixels P1 and P2 on the actual low-resolution image Fb (see FIG. 6C). Likewise, in the common coordinate system, the pixel values of the pixel positions PC1 and PC2 displaced to the right from pixels P1 and P2 by the amount of motion (S3−S1) are made equal to the pixel values pc1 and pc2 of pixels P1 and P2 on the actual low-resolution image Fc (see FIG. 6D). Likewise, in the common coordinate system, the pixel values of the pixel positions PD1 and PD2 displaced to the right from pixels P1 and P2 by the amount of motion (S4−S1) are made equal to the pixel values pd1 and pd2 of pixels P1 and P2 on the actual low-resolution image Fd (see FIG. 6E).

The displacement correction described above is followed by selection of actual low-resolution images optimal for super-resolution processing. Specifically, out of the three actual low-resolution images Fb to Fd excluding the actual low-resolution image Fa as the datum frame, two actual low-resolution images are selected. This selection is performed based on the relationship between the positions of pixels P1 and P2 on the actual low-resolution image Fa and the positions of pixels P1 and P2 on the actual low-resolution images Fb to Fd after displacement correction. Specifically, selected are those actual low-resolution images which, in the common coordinate system, have their pixels at positions closer to the positions (corresponding to the pixel position of pixel Px in FIG. 7B) halfway between adjacent pixels of the actual low-resolution image Fa.

For example, if, as in the example shown in FIG. 7A, the inequality "$|\Delta S/2-|S2-S1||>|\Delta S/2-|S4-S1||>|\Delta S/2-|S3-S1||$" holds, then, in the common coordinate system, relative to the positions halfway between adjacent pixels of the actual low-resolution image Fa, the pixels of the actual low-resolution image Fc are located closest, and the pixels of the actual low-resolution image Fb are located farthest. In the example shown in FIG. 7A, it is assumed that the inequality "$0<(S2-S1)<(S3-S1)<\Delta S/2<(S4-S1)$" holds.

Accordingly, in this case, with respect to the actual low-resolution images Fb to Fd, it is judged that the images Fc, Fd, and Fb are in this order decreasingly fit for super-resolution processing, with a result that a total of three actual low-resolution images including the actual low-resolution image Fa as the datum frame, namely Fa, Fc, and Fd are selected. Since the actual low-resolution image Fa is the datum frame, the images Fc and Fd are selected as consulted frames. After this selection, based on the low-resolution images Fa, Fc, and Fd, the super-resolution processing described above is performed, and thereby a high-resolution image Fx corresponding to FIG. 7B is obtained. The image coordinate system of the high-resolution image is the same as the common coordinate system.

For the sake of simplicity, the above description deals with a method in which the selection of actual low-resolution images is performed based on the pixel position relationship among the image Fa to Fd after displacement correction. It is however also possible to perform the selection of actual low-resolution images based directly on the amounts of motion among different actual low-resolution images. Specifically, it is possible to calculate, based on the amounts of motion between the images Fa and Fb, between the images Fa and Fc, and between the images Fa and Fd, the distances $|\Delta S/2-|S2-S1||$, $|\Delta S/2-|S4-S1||$, and $|\Delta S/2-|S3-S1||$, and then select actual low-resolution images based on the magnitude relationship between those distances. This gives a similar selection result. After all, there is no difference in that consulted frames are selected based on the magnitude relationship between the above distances as observed when the images Fa to Fd are arranged in the common coordinate system based on the amounts of motion.

As described above, in a case where the resolution enhancement factor is 2, with the actual low-resolution image as the datum frame taken as the datum, the remaining actual low-resolution images are subjected to displacement correction, and those actual low-resolution images which have their pixels closer to the positions (i.e. interpolated pixel positions) halfway between adjacent pixels of the datum frame are with higher preference selected as consulted frames. This makes it possible to acquire the pixel values of actual images at positions closer to the interpolated pixel positions to be set on the high-resolution image. As a result, it is possible to acquire the pixel values of the interpolated pixels based on values closer to the ideal values (the brightness values of the actual subject). This is expected to help enhance the virtual resolution of the high-resolution image.

The above description deals with an example in which, out of four actual low-resolution images, three actual low-resolution images including a datum frame are selected. Needless to say, those specific values may be modified. Specifically, by use of the method described above, it is possible to select, out of $Q_A$ actual low-resolution images, $Q_B$ actual low-resolution images including a datum frame. Here, $Q_A$ is an integer of 3 or more, and $Q_B$ is an integer of 2 or more but less than $Q_A$. To alleviate the calculation load on the image processor 4, it is preferable to set as small as possible the number of selection source frames (i.e. $Q_A$) and the number of selected frames (i.e. $Q_B$).

When the resolution enhancement factor is 3: Next, a description will given of the processing performed when the resolution enhancement factor is 3. Considered in terms of one dimension, generating a high-resolution image of three times as high resolution as actual low-resolution images involves adding new pixel positions at the two positions equidistant between every two adjacent pixels of the actual low-resolution image. Specifically, as shown in FIG. 8B or 8C, at the two positions equidistant between pixels P1 and P2 on the datum frame in the common coordinate system, pixel positions where new pixels Px1 and Px2 are to be located are added, so that a high-resolution image Fy or Fz is generated that has pixels P1, P2, Px1, and Px2. Pixels Px1 and Px2 are interpolated pixels, and the high-resolution image Fy or Fz comes to have three times as many pixels as the actual low-resolution image.

Figure 8A:
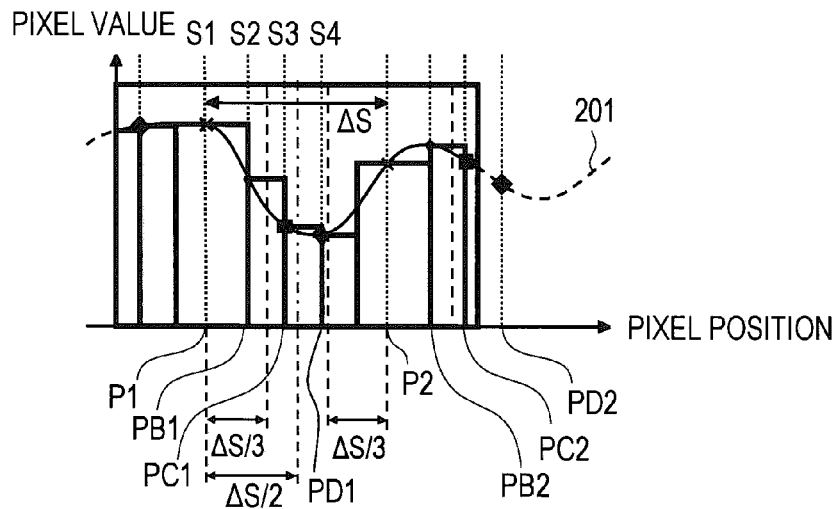
FIG. 8A is a diagram showing displacements in pixel positions among four low-resolution images.
Figure 8B:
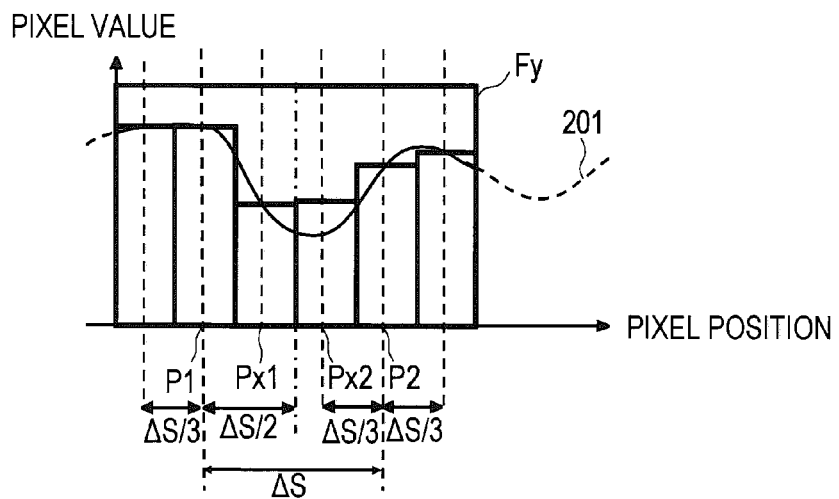
FIGS. 8B and 8C are each a diagram showing a high-resolution image estimated from a plurality of low-resolution images when the resolution enhancement factor is 3.
Figure 8C:
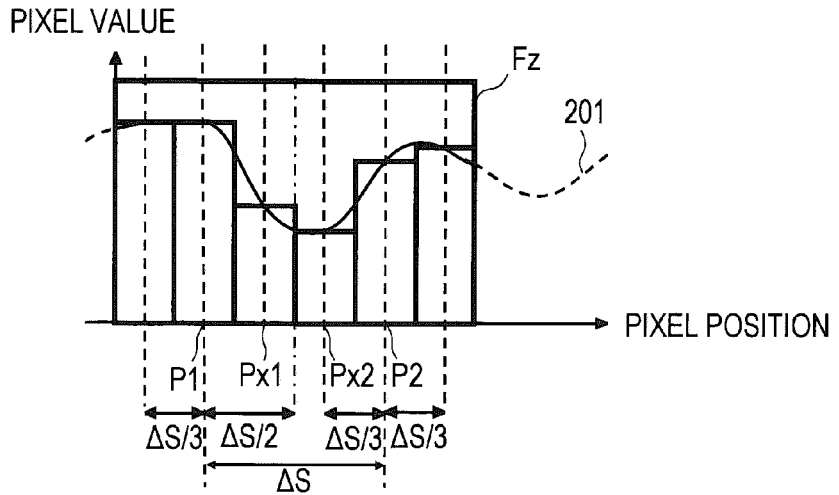

FIG. 8A is a diagram showing the relationship between the pixel position and the pixel value in the common coordinate system, and FIGS. 8B and 8C are conceptual diagrams showing the image data of high-resolution images Fy and Fz generated from a plurality of actual low-resolution images. In FIGS. 8A to 8C, the horizontal axis represents the pixel position in the common coordinate system, and the vertical axis represents the pixel value (brightness value).

When a high-resolution image Fy or Fz as shown in FIG. 8B or 8C is acquired by super-resolution processing, first, with the actual low-resolution image Fa as the datum frame taken as a datum, based on the amounts of motion between the images Fa and Fb, between the images Fa and Fc, and between the images Fa and Fd, the displacements present among the actual low-resolution images Fa to Fd are corrected. Specifically, as in the case where the resolution enhancement factor is 2, the images Fa to Fd are, for the purpose of processing, arranged in a common coordinate system, and on this common coordinate system, position adjustment is performed on the actual low-resolution images Fa to Fd. It is assumed that the amounts of motion here are equal to those mentioned in the description of the case where the resolution enhancement factor is 2.

After the displacement correction, out of the three actual low-resolution images Fb to Fd excluding the actual low-resolution image Fa as the datum frame, one or two actual low-resolution images optimal for super-resolution processing are selected. This selection is performed based on the relationship between the positions of pixels P1 and P2 on the actual low-resolution image Fa and the positions of pixels P1 and P2 on the actual low-resolution images Fb to Fd after displacement correction. Here, the pixel position taken as the datum for the selection differs according to the number of frames (number of images) selected.

In the following description, the pixel position to be used as the datum for the selection will be called "selection datum position". The selection datum position too is handled as a position in the common coordinate system. In principle, out of the selection source actual low-resolution images, those having a pixel located closer to the selection datum position are selected as consulted frames. Accordingly, in the example where the resolution enhancement factor is 2, the selection datum position coincides with the position of an interpolated pixel. This is because, in the example where the resolution enhancement factor is 2, since the positions halfway between adjacent pixels on the datum frame coincide with the interpolated pixel positions, making the selection datum position coincident with a halfway position and hence an interpolated pixel position is believed to contribute to enhancement of the virtual resolution of the high-resolution image.

On the other hand, in the case where the resolution enhancement factor is 3, the positions halfway between adjacent pixels on the datum frame do not coincide with the interpolated pixel positions. As a result, the selection datum position may differ from a halfway position, and may differ also from an interpolated pixel position. Discussed below separately will be a "method in which the selection datum position is set at a position halfway between adjacent pixels on the datum frame" and a "method in which the selection datum position is set at an interpolated pixel position". Which method to use can be determined according to the number of frames of the actual low-resolution images to be selected (the details will be described later).

First, a description will be given of a "method in which the selection datum position is set at a position halfway between adjacent pixels on the datum frame". It is preferable to use this method mainly when the number of consulted frames is less than the number of interpolated pixels to be added between adjacent pixels of actual low-resolution images. If the resolution enhancement factor is 3, the number of interpolated pixels to be added between adjacent pixels of actual low-resolution images is 2. Accordingly, in a case where only one of three actual low-resolution images Fb to Fd excluding a datum frame is selected as a consulted frame, it is preferable to set the selection datum position at a position halfway between adjacent pixels on the datum frame.

In a case where the selection datum position is set at a position halfway between adjacent pixels on the datum frame, selection of consulted frames is performed on the same criterion of selection as when the resolution enhancement factor is 2. Specifically, for example, in a case where, out of the actual low-resolution images Fb to Fd, one consulted frame is selected, if the inequality "$\Delta S/2-|S2-S1||>|\Delta S/2-|S4-S1||>|\Delta S/2-|S3-S1||$" holds, then, with respect to the actual low-resolution images Fb to Fd, it is judged that the images Fc, Fd, and Fb are in this order decreasingly fit for super-resolution processing. Thus, the image Fc alone is selected as a consulted frame. In this case, super-resolution processing based on the actual low-resolution images Fa and Fc is performed, and a high-resolution image Fy as shown in FIG. 8B is obtained.

The "method in which the selection datum position is set at a position halfway between adjacent pixels on the datum frame" is particularly useful in a case where the number of consulted frames is less than the number of interpolated pixels to be added between adjacent pixels of actual low-resolution images. This method, however, is also applicable in a case where the number of consulted frames is equal to or greater than the number of so interpolated pixels, and then its application helps reduce the calculation processing load related to the selection operation. For example, also in a case where the resolution enhancement factor is 3 and where, in addition, two consulted frame are selected out of actual low-resolution images Fb to Fd, it is possible to set the selection datum position at a position halfway between adjacent pixels on the datum frame. In this case, if the inequality "$|\Delta S/2-|S2-S1||>|\Delta S/2-|S4-S1||>|\Delta S/2-|S3-S1||$" holds, then, with respect to the actual low-resolution images Fb to Fd, it is judged that the images Fc, Fd, and Fb are in this order decreasingly fit for super-resolution processing, and thus the images Fc and Fd are selected as consulted frames. After this selection, super-resolution processing based on the actual low-resolution images Fa, Fc, and Fd is performed, and a high-resolution image Fz as shown in FIG. 8C is obtained.

Next, a description will be given of a "method in which the selection datum position is set at an interpolated pixel position". It is preferable to use this method mainly in cases where the number of consulted frames is equal to or greater than the number of interpolated pixels to be added between adjacent pixels of actual low-resolution images. Accordingly, for example, in a case where two out of three actual low-resolution images Fb to Fd excluding a datum frame are selected as consulted frames, it is preferable to set the selection datum position at an interpolated pixel position.

Consider a case where the resolution enhancement factor is 3. In this case, selection datum positions are set, one, at the position the distance "$\Delta S/3$" away, to the right as seen in FIG. 8C, from the position of pixel P1 on the datum frame (i.e. the position of the interpolated pixel Px1) and, another, at the position the distance "$2\Delta S/3$" away, to the right as seen in FIG. 8C, from the position of pixel P1 on the datum frame (i.e. the position of the interpolated pixel Px2). Then, out of the actual low-resolution images, those having a pixel located relatively close to those selection datum positions in the common coordinate system are selected, in decreasing order of closeness, as consulted frames. The selection datum positions where the interpolated pixels Px1 and Px2 are to be located are called "the first and second selection datum positions" respectively.

Suppose now that, as shown in FIG. 8A, the relationship between the amounts of motion (S2−S1), (S3−S1), and (S4−S1) and the adjacent pixel interval $\Delta S$ on the actual low-resolution images fulfill the expression "$|\Delta S/3-|S2-S1||=|\Delta S/3-|S3-S||>|2\Delta S/3-|S4-S1||$". This means that, in the common coordinate system, of the actual low-resolution images Fb to Fd, the image Fd has a pixel located closest to one selection datum position (the second selection datum positions), and that the images Fb and Fc have pixels at an equal distance from the other selection datum position (the first selection datum positions) corresponding to the position of the interpolated pixel Px1. How, on this assumption, two out of the images Fb to Fd are selected as consulted frames will now be described.

It is here assumed that, in the common coordinate system, the positions of pixels P1 and P2 on the actual low-resolution images Fb to Fd are displaced to the right relative to the positions of pixels P1 and P2 on the actual low-resolution image Fa, and that the inequality "$0<(S2-S1)<\Delta S/3<(S3-S1)<(S4-S1)<2\Delta S/3$" holds. It is also assumed that the inequality "$(S2-S1)<(S3-S1)<\Delta S/2$" holds. That is, it is assumed that the actual low-resolution image Fc has a pixel located closer, than the actual low-resolution image Fb, to a position halfway between adjacent pixels on the datum frame.

In this case, in the common coordinate system, the distances from the first selection datum position to the positions of pixel P1 (i.e. the pixel positions PB1, PC1, and PD1) on the actual low-resolution images Fb to Fd are found, and the distances from the second selection datum position to the positions of pixel P1 (i.e. the pixel positions PB1, PC1, and PD1) on the actual low-resolution images Fb to Fd are found; then, of all the distances (a total of six distances) thus found, the shortest one is identified. Then the actual low-resolution image corresponding to that shortest distance is selected as the first consulted frame. In the example being discussed, the expression "$|\Delta S/3-|S2-S1||=|\Delta S/3-|S3-S1||>|2\Delta S/3-|S4-S1||$" holds, and thus the above shortest distance is the distance between the second selection datum position and the position of pixel P1 (i.e., the pixel position PD1) on the actual low-resolution image Fd. Thus, the image Fd is selected as the first consulted frame. Thereafter, out of the two actual low-resolution images Fb and Fc excluding the actual low-resolution images Fa and Fd, the one having a pixel located closer to the first selection datum position is selected as the second consulted frame.

If, for example, the inequality "$|\Delta S/3-|S2-S1||>|\Delta S/3-|S3-S1||$" holds, the image Fc is selected as a consulted frame, and the image Fb is excluded from consulted frames; in the example being discussed, however, since the expression "$|\Delta S/3-|S2-S1||=|\Delta S/3-|S3-S1||$" holds, it is not possible, simply by paying attention to the distances from the selection datum positions, to decide which of the image Fb and Fc to choose. In this case, in the common coordinate system, the distances from a position halfway between adjacent pixels on the datum frame to the pixel positions (those closest to that halfway position) on the actual low-resolution images Fb and Fc are found, and the actual low-resolution image corresponding to the shorter distance is selected as a consulted frame. More specifically, in the common coordinate system, the distances from the position halfway between pixels P1 and P2 on the datum frame to the pixel positions PB1 and PC1 on the actual low-resolution images Fb and Fc are found, and the actual low-resolution image corresponding to the shorter distance is selected as a consulted frame. In the example being discussed, since the inequality "$(S2-S1)<(S3-S1)<\Delta S/2$" holds, out of the images Fb and Fc, the image Fc is selected as the second consulted frame. Thus, the image Fc and Fd are selected as consulted frames, and super-resolution processing based on the actual low-resolution images Fa, Fc, and Fd is performed, and a high-resolution image Fz as shown in FIG. 8C is obtained.

A description will now be given of another selection operation performed on different assumptions from those corresponding to FIG. 8A. Refer to FIGS. 9A to 9D. FIGS. 9A to 9D are diagrams showing the positional relationship among sampling points S1 to S4 on the actual low-resolution images Fa to Fd respectively. In each of FIGS. 9A to 9D, the symbols P1, P2, Px1, and Px2 represent the positions of pixels P1, P2, Px1, and Px2 in the common coordinate system.

It is assumed that, in all the examples corresponding to FIGS. 9A to 9D, the positions of pixels P1 and P2 on the actual low-resolution images Fb to Fd are displaced to the right relative to the positions of pixels P1 and P2 on the actual low-resolution image Fa, and that two out of the images Fb to Fd are selected as consulted frames. Furthermore, it is assumed that, in the examples corresponding to FIGS. 9A and 9B, the inequality "$0<(S2-S1)<\Delta S/3<(S3-S1)<\Delta S/2<(S4-S1)<2\Delta/3$" holds, that, in the example corresponding to FIG. 9C, the inequality "$\Delta S/3<(S2-S1)<\Delta S/2<(S3-S1)<(S4-S1)<2\Delta S/3$" holds, and that, in the example corresponding to FIG. 9D, the inequality "$0<(S2-S1)<\Delta S/3<\Delta S/2<(S3-S1)<(S4-S1)<2\Delta S/3$" holds.

Figure 9A:
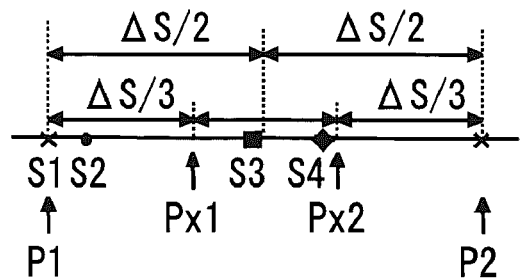
FIGS. 9A to 9D are diagrams showing an example of processing for selecting three out of four low-resolution images when the resolution enhancement factor is 3.

For example, when, as shown in FIG. 9A, the inequality "$|\Delta S/3-|S2-S1||>|\Delta S/3-|S3-S||>|2\Delta S/3-|S4-S1||$" holds, consulted frames are selected based solely on the distances from sampling points S2 to S4 to the selection datum positions in the common coordinate system. The distances from sampling points S2 to S4 to the selection datum positions include the distances from sampling points S2 to S4 to the first selection datum position and the distances from sampling points S2 to S4 to the second selection datum position. In the example corresponding to FIG. 9A, of those distances (a total of six distances), that from sampling point S4 to the second selection datum position is the shortest. Thus, the image Fd, corresponding to sampling point S4, is selected as the first consulted frame. Thereafter, the distance from sampling point S2 to the first selection datum position is compared with the distance form sampling point S3 to the first selection datum position. In the example corresponding to FIG. 9A, the latter distance is shorter than the former, and thus the image Fc, corresponding to the latter distance, is selected as the second consulted frame.

Figure 9B:
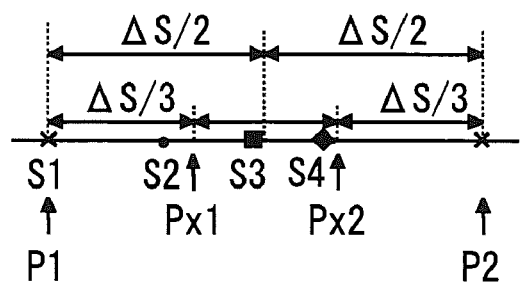

For another example, also when, as shown in FIG. 9B, the inequality "$|\Delta S/3-S3-S1||>|\Delta S/3-|S2-S1||>|2\Delta S/3-|S4-S1||$" holds, consulted frames are selected based solely on the distances from sampling points S2 to S4 to the selection datum positions in the common coordinate system. In the example corresponding to FIG. 9B, of these distances (a total six distances), that from sampling point S4 to the second selection datum position is the shortest. Thus the image Fd corresponding to sampling point S4 is selected as the first consulted frame. Thereafter, the distance from sampling point S2 to the first selection datum position is compared with the distance from sampling point S3 to the first selection datum position. In the example corresponding to FIG. 9B, the former distance is shorter than the latter, and thus the image Fb, corresponding to the former distance, is selected to the second datum frame.

Figure 9C:
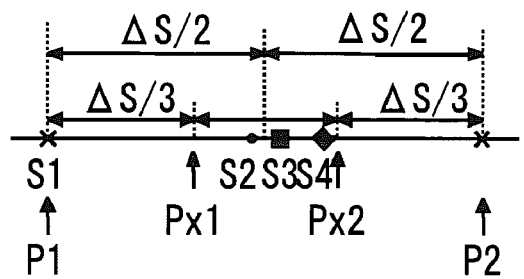
Figure 9D:
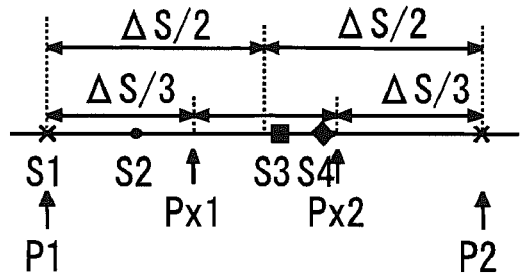

In the examples corresponding to FIGS. 9C and 9D, the expression "$|\Delta S/3-|S2-S1||=|2\Delta S/3-|S3-S1||>|2\Delta S/3-|S4-S1||$" holds. Also in this case, first, the distances from each of sampling points S2 to S4 to the first selection datum position and the distances from each of sampling points S2 to S4 to the second selection datum position are found, and the actual low-resolution image corresponding to the shortest of those distances (a total of six distances) is selected as the first consulted frame. The shortest distance here is that from sampling point S4 to the second selection datum position. Thus, the image Fd is selected as the first consulted frame. Thereafter, out of sampling points S2 and S3, the one closer to the first selection datum position is selected, and the actual low-resolution image corresponding to the selected sampling point is selected as the second consulted frame.

Specifically, when, as in the example shown in FIG. 9C, the inequality "$\Delta S/3<(S2-S1)<\Delta S/2<(S3-S1)<(S4-S1)<2\Delta S/3$" holds, out of sampling points S2 and S3, sampling point S2 is closer to the first selection datum position, and thus the image Fb is selected as the second consulted frame.

Also when, as in the example shown in FIG. 9D, the inequality "$0<(S2-S1)<\Delta S/3<\Delta S/2<(S3-S1)<(S4-S1)<2\Delta S/3$" holds, out of sampling points S2 and S3, sampling point S2 is closer to the first selection datum position, and thus the image Fb is selected as the second consulted frame. Alternatively, in the example shown in FIG. 9D, out of sampling points S2 and S3, the one closer to a position halfway between adjacent pixels on the datum frame may be selected for the selection of the second consulted frame. This halfway position is called "the third selection datum position". In this case, out of sampling points S2 and S3, sampling point S3 is closer to the third selection datum position, and thus the image Fc is selected as the second consulted frame.

In the example shown in FIG. 9D, which of the first and third selection datum positions to use as the basis for judgment in selecting one of the images Fb and Fc as a consulted frame may be varied according to the distance from sampling point S2 and/or S3 to the first selection datum position. Specifically, when the distance from sampling point S2 and/or S3 to the first selection datum position is shorter than a predetermined value, the first selection datum position is used as the above basis for judgment (in this case, the image Fb is selected as the second consulted frame). By contrast, when the distance from sampling point S2 and/or S3 to the first selection datum position is longer than the predetermined value, the third selection datum position is used as the above basis for judgment (in this case, the image Fc is selected as the second consulted frame).

Although the above description deals with a method of selecting consulted frames when the resolution enhancement factor is 3, a similar method of selection can be applied in cases where the resolution enhancement factor is 4 or more.

In such cases, when the number of consulted frames to be selected is relatively small, or when reduction of the calculation processing load related to the selection operation is attempted, it is preferable to set the selection datum position at a position halfway between adjacent pixels on the datum frame as described above.

By contrast, when the number of consulted frames to be selected is relatively great, it is preferable to set the selection datum position at an interpolated pixel position as described above. In this case, if there are a plurality of sampling points (in the examples shown in FIGS. 8A to 8C, S2 and S3) whose distances from a given selection datum position corresponding to one interpolated pixel position are equal, and in addition there are no sampling points, other than those sampling points, that are closer to that selection datum position, then it is preferable to select consulted frames based on the distances (in the examples shown in FIGS. 8A to 8C, the distance ($\Delta S/2-|S2-S1|$) and the distance ($\Delta S/2-|S3-S1|$)) from those sampling points and a position halfway between adjacent pixels on the datum frame.

As will be understood from the above description, in the present specification, whenever the distance from the position of a pixel on an image of interest to a position of interest is discussed, the distance refers to "the distance from, of all the pixels forming the image of interest, the one closest to the position of interest to the position of interest, as measured in the image space". This equally applies in cases where images are handled as two-dimensional images as will be described later.

Displacement Correction

Next, the operation for displacement correction will be described in brief. Displacement correction is performed on actual low-resolution images, and is executed taking, as a datum, the actual low-resolution image that is handled as the datum frame during super-resolution processing. That is, the displacements of actual low-resolution images as consulted frames relative to an actual low-resolution image as a datum frame are corrected. Displacement correction is executed based on the amounts of motion among actual low-resolution images. In the above description, for the sake of simplicity, amounts of motion have been handled as one-dimensional quantities; in reality, however, amounts of motion are two-dimensional quantities (in other words, quantities having magnitude and direction) containing horizontal and vertical components, and are what is generally called "motion vectors", or "displacement vectors". Accordingly, amounts of motion may be read as motion vectors or displacement vectors.

As a series of chronologically ordered actual low-resolution images is obtained from the image sensor 1, one amount of motion after another is detected between every two temporally adjacent actual low-resolution images (i.e. between every two adjacent frames). When an amount of motion is detected, of the two actual low-resolution images involved, one is handled as a datum image and the other as a non-datum image. When i represents an integer of 3 or more, the amount of motion between the first actual low-resolution image obtained and the i-th actual low-resolution image obtained is detected by finding the sum of the amount of motion detected between the first and second actual low-resolution images obtained, the amount of motion detected between the second and third actual low-resolution images obtained, and the amount of motion detected between the (i−1)-th and i-th actual low-resolution images obtained. For example, by taking as a datum frame the i-th actual low-resolution image obtained, it is possible to detect the amount of motion between a given actual low-resolution image and the datum frame. The detected amounts of motion are used also in the selection of consulted frames.

The detected amounts of motion have a so-called subpixel resolution, a resolution higher than the pixel interval of the actual low-resolution images. That is, amounts of motion are detected in units of distances shorter than the interval between adjacent pixels on the actual low-resolution images. Accordingly, the processing for detecting the amounts of motion between a datum image and a non-datum image can be taken as including processing for detecting amounts of motion in units of pixels (pixel-unit amounts of motion) and processing for detecting amounts of motion in units of subpixels (subpixel-unit amounts of motion). The latter processing may be executed after the execution of the former processing by use of the results of this processing. Pixel-unit motion amount detection processing and subpixel-unit motion amount detection processing can be achieved by well-known methods, of which examples will be described below.

Pixel-unit Motion Amount Detection Processing: In pixel-unit motion amount detection processing, by use of a well-known image matching method, the pixel-unit amount of motion of a non-datum image relative to a datum image is detected. The following description deals with, as an example, a case where the representative matching method is used. Needless to say, the block matching method or the like may be used instead.

Figure 10:
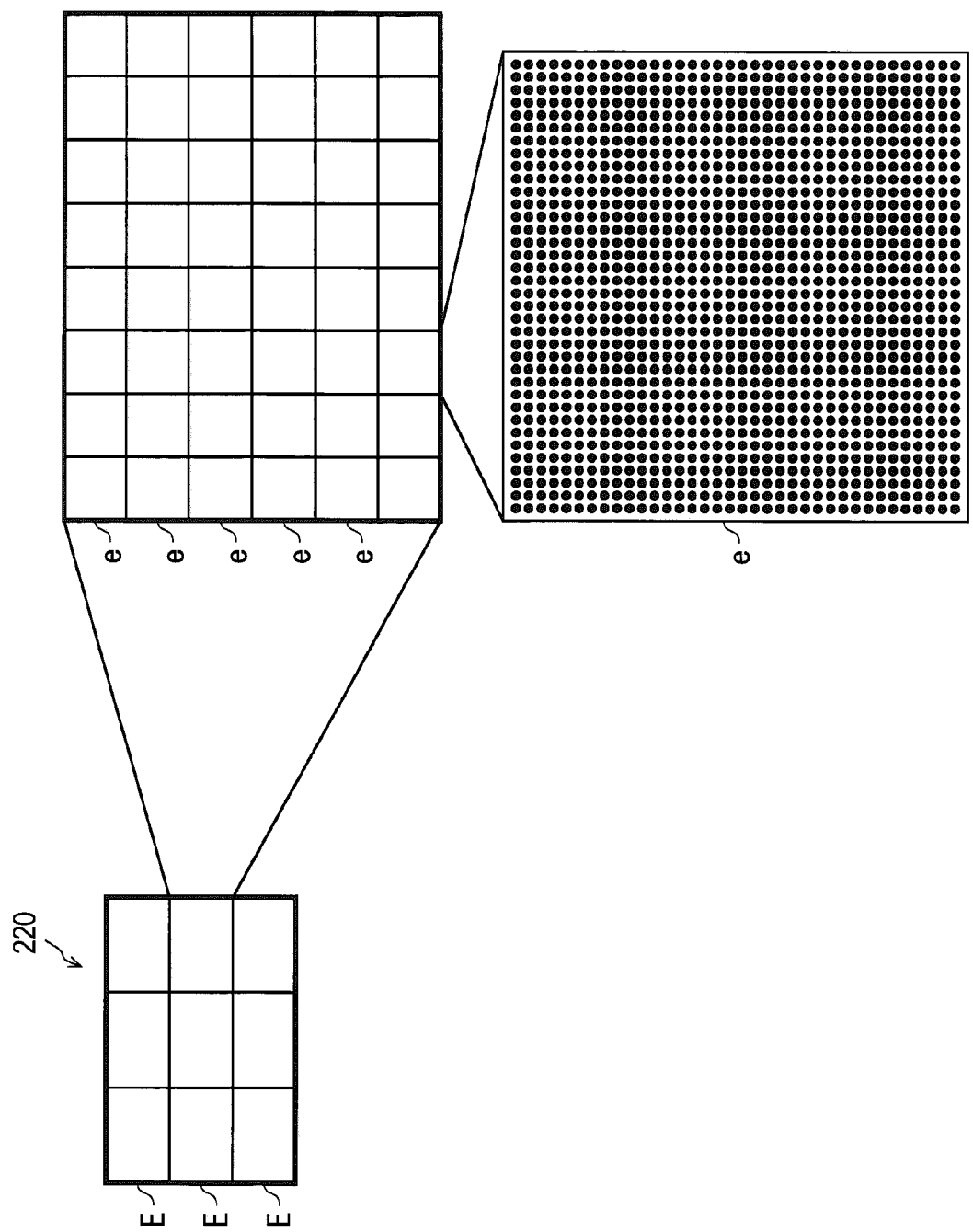
FIG. 10 shows how the entire region of an image is divided into a plurality of detection regions, and how each detection region is further divided into a plurality of small blocks.
Figure 11A:
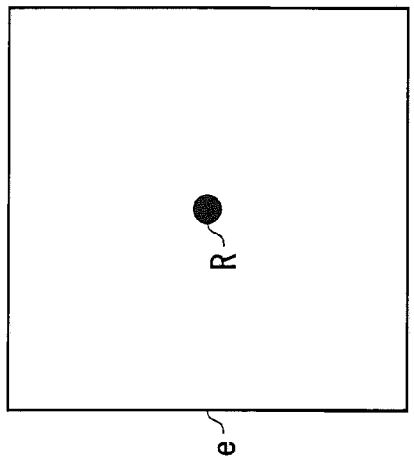
FIG. 11A shows how one representative point is set within a small block shown in FIG. 10.
Figure 11B:
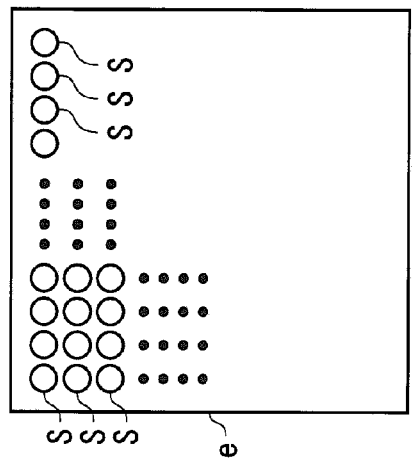
FIG. 11B shows how a plurality of sampling points are set within a small block shown in FIG. 10.
Figure 12A:
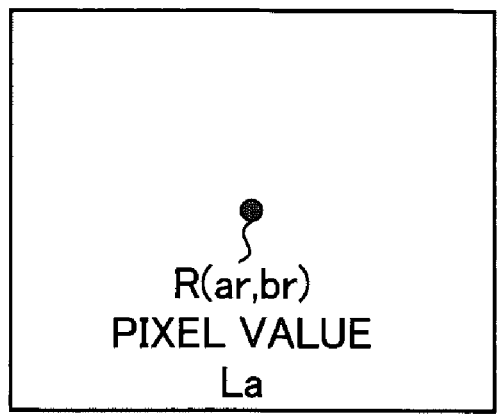
FIGS. 12A and 12B are diagrams illustrating subpixel-unit motion amount detection processing.
Figure 12B:
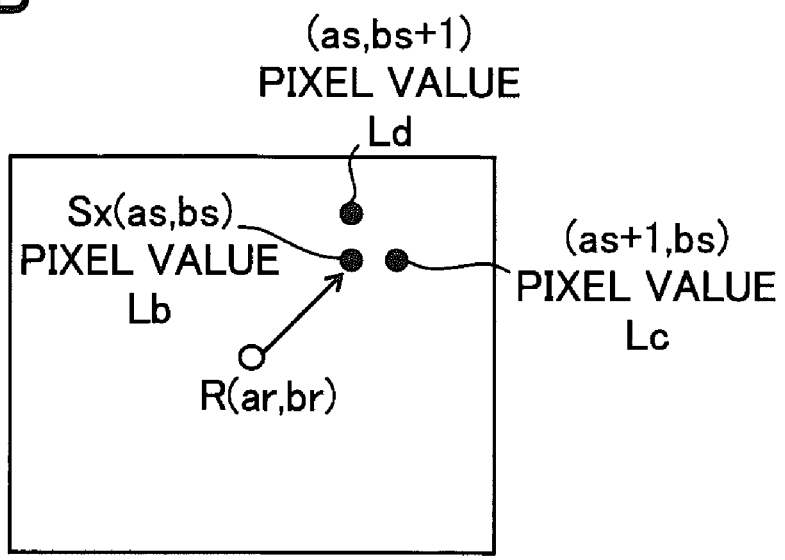

Refer to FIG. 10. In FIG. 10, the image 220 is a datum image or a non-datum image. Within the image 220, there are provided a plurality of detection regions "E". For example, the entire region of the image 220 is divided into three equal parts in both the vertical and horizontal directions to provide a total of nine detection regions "E". Each detection region "E" is further divided into a plurality of small regions "e". In the example shown in FIG. 10, each detection region is divided into 48 small regions "e" (by being divided into 6 parts in the vertical direction and 8 parts in the horizontal direction). Each small region "e" is composed of a two-dimensional array of pixels (for example a two-dimensional array of 36 pixels in the vertical direction×36 pixels in the horizontal direction). And, as shown in FIG. 11A, in each small region "e" within a datum image, one pixel is set as a representative point R. On the other hand, as shown in FIG. 11B, in each small region "e" within a non-datum image, a plurality of pixels are set as a plurality of sampling points S (all the pixels within the small region "e" may be set as sampling points S).

After the setting of detection regions "E" and small regions "e" in this way, by the representative matching method, for each detection region, the SAD (sum of absolute differences) or SSD (sum of square differences) of the pixel values (brightness values) between the datum image and the non-datum image is calculated. By use of the result of this calculation, for each detection region, the sampling point S that exhibits the highest correlation with the representative point R is found, and the displacement of that sampling point S relative to the representative point R is found in units of pixels. Then the average value of the displacements found one for each detection region is detected as the pixel-unit amount of motion between the datum image and the non-datum image.

More specifically, the processing proceeds in the following manner. One small region "e" within the datum image will be taken as of interest, and the small region "e" within the non-datum image which is located at the same position as the first-mentioned small region "e" will be taken as of interest. For each of the sampling points S, the difference between the pixel value of the representative point R within the small region "e" of interest on the datum image and the pixel value of that sampling point S within the small region "e" of interest on the non-datum image is found as a correlation value.

Thereafter, for each detection region "E", as many correlation values of the sampling points S at the same relative position as the representative point R are accumulated, i.e. added up, as the number of small regions "e" belonging to the detection region "E". If the number of small regions "e" belonging to one detection region "E" is 48, then, for one sampling point S, 48 correlation values are added up to find one accumulated correlation value. Thus, for each detection region "E", as many accumulated correlation values are found as the number of sampling points S set in one small region "e".

After a plurality of accumulated correlation values (i.e. one for each of the sampling points S) are found for each detection region "E" in this way, then, for each detection region "E", the minimum value among those accumulated correlation values is detected. The correlation with the representative point R of the sampling point S corresponding to this minimum value is believed to be higher than the correlation of the other sampling points S. Thus the displacement from the representative point R to the sampling point S corresponding to the minimum value is detected as the amount of motion with respect to the detection region "E" of interest. This detection is performed for each detection region "E". The amounts of motion found one for each detection region "E" are averaged to obtain an average value, which is detected as the pixel-unit amount of motion between the datum image and the non-datum image.

Subpixel-unit Motion Amount Detection Processing: After the detection of pixel-unit amounts of motion, subpixel-unit amounts of motion are detected as well. The sampling point S that exhibits the highest correlation with the representative point R as found by the representative matching method as described above is represented by $S_X$. Then, for example, for each small region "e", based on the pixel value of the pixel at the representative point R on the datum image and the pixel values of the pixel at sampling point $S_X$ and of its surrounding pixels on the non-datum image, the subpixel-unit amount of motion is found.

This will now be described with reference to FIGS. 12A, 12B, 13A, and 13B. It is assumed that, in the datum image, the representative point R is located at the pixel position (ar, br), and that the pixel value at the representative point R is La (see FIG. 12A). It is assumed that, in the non-datum image, sampling point $S_X$ is located at the pixel position (as, bs), and that the pixel value at sampling point $S_X$ is Lb (see FIG. 12B). It is also assumed that, in the non-datum image, the pixel value at the pixel position (as+1, bs) adjacent to sampling point $S_X$ in the horizontal direction (to the right in FIG. 12B) is Lc, and the pixel value at the pixel position (as, bs+1) adjacent to sampling point $S_X$ in the vertical direction (up in FIG. 12B) is Ld. Then the pixel-unit amount of motion between the datum image and the non-datum image is represented by a vector expressed as (as−ar, bs−br).

Figure 13A:
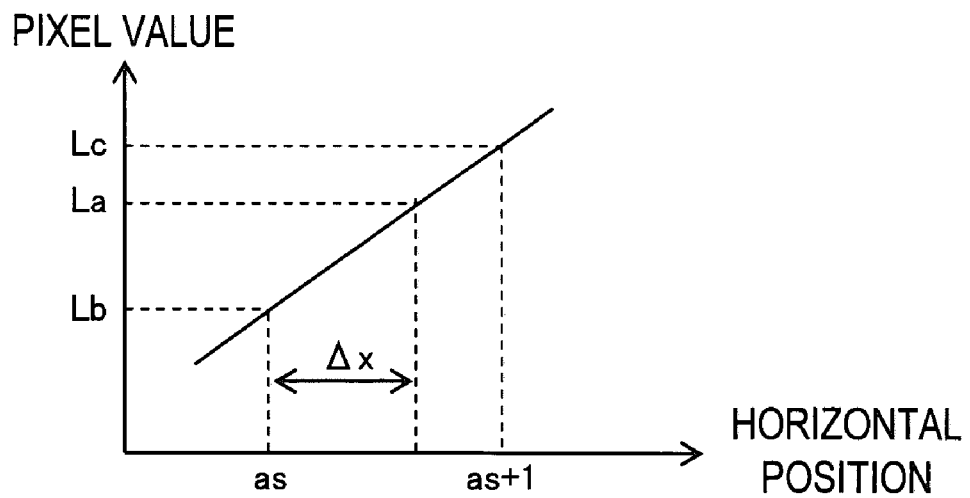
FIGS. 13A and 13B are diagrams illustrating subpixel-unit motion amount detection processing.
Figure 13B:
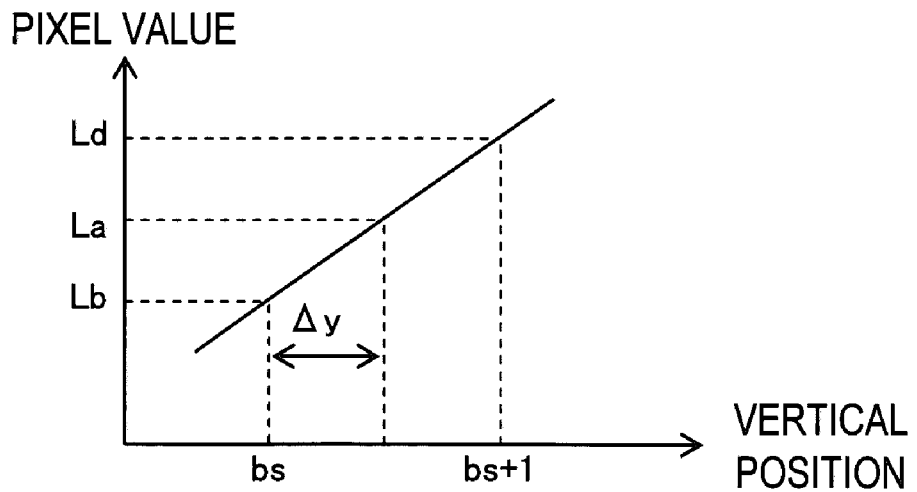

Moreover, it is assumed that, as shown in FIG. 13A, as one moves one pixel from the pixel at sampling point $S_X$ in the horizontal direction, the pixel value varies from Lb to Lc linearly, and it is assumed that, as shown in FIG. 13B, as one moves one pixel from the pixel at sampling point $S_X$ in the vertical direction, the pixel value varies from Lb to Ld linearly. On these assumptions, the position (as+$\Delta$x) in the horizontal direction at which the pixel value takes the value La between the pixel positions (as, bs) and (as+1, bs) is found, and the position (bs+$\Delta$y) in the vertical direction at which the pixel value takes the value La between the pixel positions (as, bs) and (as, bs+1) is found. The values of $\Delta$x and $\Delta$y are given by the formulae $\Delta x=(La-Lb)/(Lc-Lb)$ and $\Delta y=(La-Lb)/(Ld-Lb)$. The calculation of $\Delta$x and $\Delta$y is performed for each small region "e", and the vector quantity expressed as ($\Delta x$, $\Delta y$) is found as the subpixel-unit amount of motion in that small region "e".

Thereafter, the subpixel-unit amounts of motion found one for each small region "e" are averaged, and the resulting averaged amount of motion is detected as the subpixel-unit amount of motion between the datum image and the non-datum image. Then the value obtained by adding the subpixel-unit amount of motion between the datum and non-datum images to the pixel-unit amount of motion between the datum and non-datum images is ultimately detected as the amount of motion between the datum and non-datum images.

By use of the methods described above, the amount of motion between two temporally adjacent actual low-resolution images is detected. The amount of motion between a given actual low-resolution image and a datum frame that is not temporally adjacent to it can be found by adding up the amount of motion found for every actual low-resolution image obtained between the two images. Based on the amounts of motion thus found, consulted frames optimal for super-resolution processing can be selected, and the displacements between the selected consulted frames and the datum frame can be corrected. The methods of processing for motion amount detection specifically described above are merely examples. Any other methods may be used instead so long as they can detect amounts of motion with a subpixel resolution; such other methods may be used to detect the amounts of motion between an actual low-resolution image as a datum frame and other actual low-resolution images.

Example of Configuration of Image Processor

An example of the configuration of the image processor 4 (see FIG. 1) that performs the above-described super-resolution processing, consulted frame selection processing, motion amount detection processing, and displacement correction processing is shown in FIG. 14. FIG. 14 is a block diagram of part of the image sensing apparatus shown in FIG. 1, including an internal block diagram of the image processor 4.

The image processor 4 shown in FIG. 14 includes parts identified by the reference signs 41 to 46. A frame memory 41 temporarily stores the image signal, representing actual low-resolution images equivalent to a plurality of frames, from the AFE 2. An image signal equivalent to one frame from the AFE 2 forms one actual low-resolution image. A motion amount calculator 42 receives from the AFE 2 an image signal representing the actual low-resolution image of the current frame, and receives from the frame memory 41 an image signal representing the actual low-resolution image one frame before the current frame; the motion amount calculator 42 calculates the amount of motion between these two images. The current frame is the frame currently being obtained from the AFE 2. Based on the amount of motion calculated by the motion amount calculator 42, an image evaluator 43 selects, out of a plurality of actual low-resolution images obtained from the AFE 2, those optimal for super-resolution processing on the actual low-resolution image of the current frame. A displacement corrector 44 corrects the displacements between the actual low-resolution images selected by the image evaluator 43 and the actual low-resolution image of the current frame fed from the frame memory 41. A super-resolution calculator 45 receives the actual low-resolution image of the current frame from the AFE 2 and the actual low-resolution images selected by the image evaluator 43 and then displacement-corrected by the displacement corrector 44, and by use of these images performs super-resolution processing. A signal processor 46 generates illuminance and color-difference signals from the image signal representing the high-resolution image obtained by the super-resolution processing by the super-resolution calculator 45 or from the image signal fed directly from the AFE 2.

The processing performed within the image processor 4, including the selection processing by the image evaluator 43, the displacement correction processing by the displacement corrector 44, and the super-resolution processing by the super-resolution calculator 45, are executed on the assumption that, as described previously, the plurality of low-resolution images and the high-resolution image to be generated by super-resolution processing are, for the purpose of processing, arranged in a common coordinate system.

As long as no operation requesting image resolution enhancement is made on the operated portion 15, the digital image signal from the AFE 2 is fed, frame by frame, to the signal processor 46 without going through the super-resolution calculator 45. The signal processor 46 then generates from the image signal fed to it luminance and color-difference signals, and feeds, frame by frame, the generated luminance and color-difference signals to the compression processor 6. The compression processor 6 compresses/encodes the luminance and color-difference signals fed to it.

By contrast, when an operation requesting image resolution enhancement is made on the operated portion 15, the digital image signal from the AFE 2 is fed, frame by frame, to the frame memory 41, the motion amount calculator 42, and the super-resolution calculator 45. Then, based on the specified resolution (resolution enhancement factor) and the number of frames of actual low-resolution images to be selected as consulted frames, the image evaluator 43 sets the selection datum position in the common coordinate system by the method described above. Specifically, the selection datum position for the selection of actual low-resolution images fit for super-resolution processing (i.e. consulted frames) is chosen between a position halfway between adjacent pixels on the datum frame and an interpolated pixel position on the high-resolution image. Although the previously given description of the method for setting the selection datum position assumes, for the sake of simplicity, that the common coordinate system is one-dimensional, in cases where two-dimensional images are handled, the common coordinate system is two-dimensional.

While the selection datum position is set, the actual low-resolution image of the current frame is fed from the AFE 2 to the super-resolution calculator 45, which then handles this actual low-resolution image of the current frame as a datum frame. Moreover, through the motion amount detection processing described previously, the motion amount calculator 42 calculates the amount of motion between two temporally adjacent actual low-resolution images. This calculation is performed for every two consecutive frames.

Based on the amount of motion calculated by the motion amount calculator 42, the image evaluator 43 (or motion amount calculator 42) finds the amount of motion between each of the actual low-resolution images equivalent to a plurality of frames temporarily stored in the frame memory 41 and the actual low-resolution image of the current frame from the AFE 12. Whenever the former and latter images are not the images of mutually adjacent frames, as described previously, the sum of the amount of motion calculated for every two consecutive frames is found.

Based on the selection datum position and the amounts of motion thus found, the image evaluator 43 selects actual low-resolution images fit for super-resolution processing (i.e. consulted frames). Suppose, for example, that a first, a second, a third, . . . , an N-th, and an (N+1)-th actual low-resolution image are shot in this order, that the first to N-th actual low-resolution images are temporarily stored in the frame memory 41, and that the (N+1)-th actual low-resolution image is the current frame. Then the (N+1)-th actual low-resolution image is handled as the datum frame, the first to N-th actual low-resolution images are each handled as a consulted frame candidate (an evaluated image), and the amount of motion between the datum frame and each consulted frame candidate is found. Then, in a case where the super-resolution calculator 45 performs super-resolution processing based on actual low-resolution images equivalent to (M+1) frames, then, based on the amount of motion between the datum frame and each consulted frame candidate, the image evaluator 43 selects M of the first to N-th actual low-resolution images as consulted frames. Here, N is an integer of 2 or more, and M is an integer of 1 or more but less than N.

On completion of the selection of consulted frames in this way, according to the selection result, the frame memory 41 is notified of which frames to feed to the displacement corrector 44. According to this notification, the frame memory 41 feeds the image signal of the frames (i.e. consulted frames) to be fed to the displacement corrector 44 to it.

On the other hand, the image signal of the frames not selected by the image evaluator 43 are deleted from the frame memory 41. An exception is that the current frame (corresponding to the datum frame) fed from the AFE 2 is exempt from the deletion and remains stored in the frame memory 41; the frame represented by its image signal is used as a consulted frame candidate in the consulted frame selection processing performed next time. As a result of the image signal of the frames not selected by the image evaluator 43 being deleted from the frame memory 41, when the image signal of the next frame is fed from the AFE 2 to the image processor 4, the image evaluator 43 selects, out of the image signal of the frames kept stored in the frame memory 41, the image signal of frames fit for the super-resolution processing performed next time.

Moreover, when the image signal of the selected consulted frames is fed to the displacement corrector 44, the amounts of motion of the consulted frames from the datum frame are also fed from the image evaluator 43 (or the motion amount calculator 42) to the displacement corrector 44. Based on the amounts of motion thus fed, the displacement corrector 44 performs the displacement correction described previously. Through the displacement correction, the pixel positions on the consulted frames are converted into positions based on the pixel positions on the datum frame. That is, the pixels of the consulted frames are, for the purpose of processing, arranged in the common coordinate system, which is the coordinate system of the image space of the datum frame, and when they are so arranged, the pixel positions on the consulted frames are displaced from the pixel positions on the datum frame by distances corresponding to the amounts of motion.

While the image signal of the consulted frames displacement-corrected by the displacement corrector 44 is fed to the super-resolution calculator 45, the image signal of the current frame as the datum frame from the AFE 2 is fed to the super-resolution calculator 45. The super-resolution calculator 45 performs the previously described super-resolution processing on the image signal fed from the displacement corrector 44 and the AFE 2 and thereby produces a high-resolution image based on the consulted frames and the datum frame. The image signal of the high-resolution image thus obtained is fed to the signal processor 46, which then generates luminance and color-difference signals from the image signal of the high-resolution image equivalent to one frame fed to it, and feeds those luminance and color-difference signals to the compression processor 6.

Although it is described above that the image signal of the frames not selected by the image evaluator 43 is deleted from the frame memory 41, it is instead also possible to delete from the frame memory 41 the image signal of one frame at a time, namely the frame stored earliest in the frame memory 41 every time the frame of the image signal fed from the AFE 2 is renewed.

In the example described above, the actual low-resolution image of the current frame corresponding to the newest frame is handled as the datum frame for the super-resolution processing by the super-resolution calculator 45. It is instead also possible to handle as the datum frame for super-resolution processing the actual low-resolution image of the oldest frame among the actual low-resolution images stored in the frame memory 41, or any one of the actual low-resolution images stored in the frame memory 41.

First Example of Configuration of Super-Resolution Calculator

Figure 15:
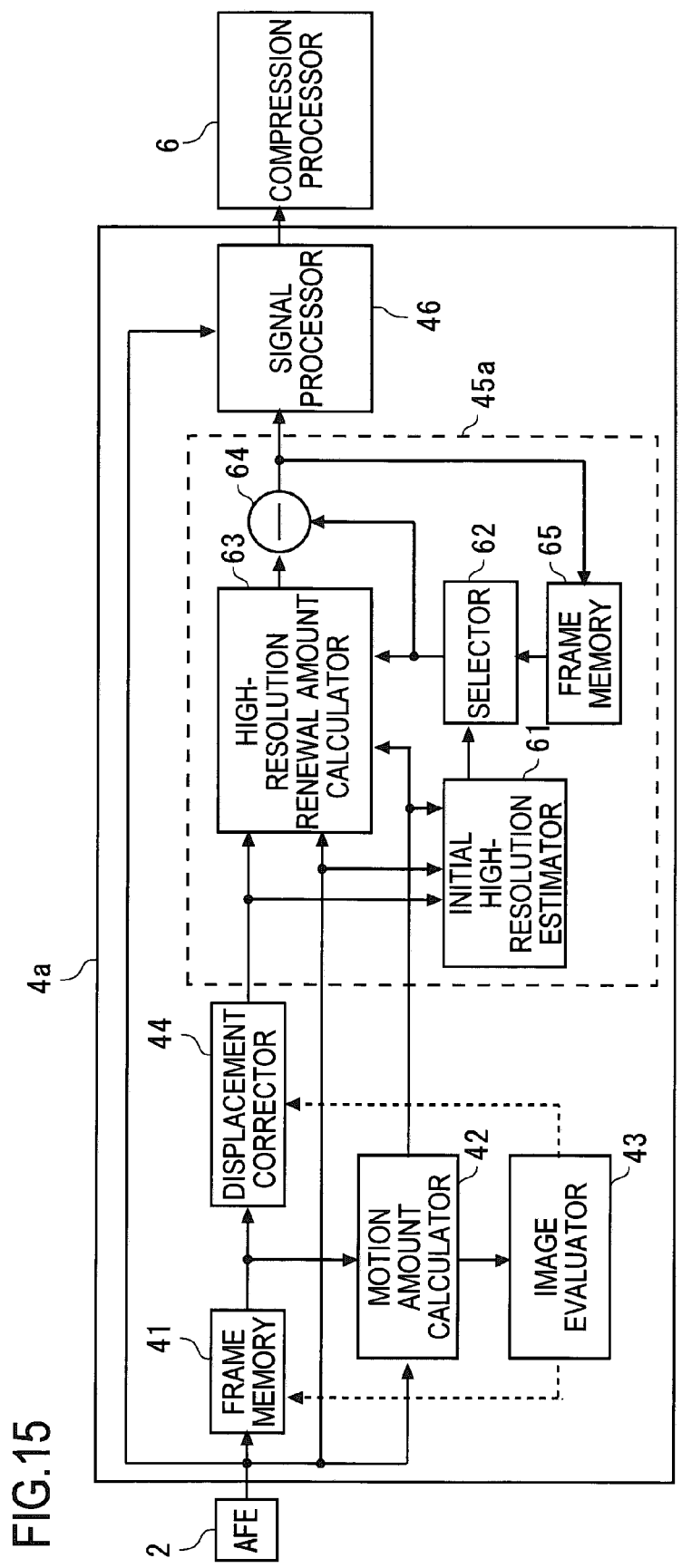
FIG. 15 is a block diagram of part of an image sensing apparatus, including another internal block diagram of the image processor in FIG. 1, according to the first embodiment of the invention.

A first example of the configuration of the super-resolution calculator 45 shown in FIG. 14 will now be described, taking up as an example a case where super-resolution calculation is performed by the MAP method. FIG. 15 is a block diagram of part of the image sensing apparatus shown in FIG. 1, including an internal block diagram of the super-resolution calculator 45a used as the super-resolution calculator 45 in FIG. 14. In FIG. 15, the reference sign 4a represents the image processor used as the image processor 4 in FIG. 1. The image processor 4a includes parts identified by the reference signs 41 to 44 and 46, and their functions and operation are the same as those of their counterparts shown in FIG. 14. The image processor 4a further includes a super-resolution calculator 45a. The description of the example of configuration shown in FIG. 15—and also that shown in FIG. 16, which will be described later—assumes that, out of the plurality of frames stored in the frame memory 41, actual low-resolution images equivalent to two frames are selected as consulted frames, and that, by use of two consulted frames and one datum frame, a high-resolution image is generated.

The super-resolution calculator 45a receives from the AFE 2 the actual low-resolution image that is the current frame, and also receives actual low-resolution images equivalent to two frames that have been displacement-corrected by the displacement corrector 44. In the super-resolution calculator 45a, the former actual low-resolution image is handled as a datum frame, and the latter actual low-resolution image is handled as a consulted frame.

The super-resolution calculator 45a includes parts identified by the reference signs 61 to 65. Based on the datum frame from the AFE 2 and the two consulted frames from the displacement corrector 44, an initial high-resolution estimator 61 (hereinafter abbreviated to "estimator 61") estimates a high-resolution image as an initial high-resolution image. A selector 62 chooses one of the high-resolution image estimated by the estimator 61 and the high-resolution image temporarily stored in a frame memory 65, and feeds the selected one to the stage succeeding the selector 62. Based on the high-resolution image chosen by the selector 62 and actual low-resolution images equivalent to three frames (i.e. one datum frame and two consulted frames), a high-resolution renewal amount calculator 63 (hereinafter abbreviated to "renewal amount calculator 63") finds the amount of renewal for the high-resolution image. A subtracter 64 subtracts the amount of renewal found by the renewal amount calculator 63 from the high-resolution image chosen by the selector 62. The frame memory 65 stores the high-resolution image generated by the subtraction by the subtracter 64. The selector 62, when performing the selection operation for the first time, selects the initial high-resolution image estimated by the estimator 61 and, when performing the selection operation for the second time or later, selects the high-resolution image temporarily stored in the frame memory 65.

The operation of the super-resolution calculator 45a configured as described above will now be described with reference to FIGS. 3 and 5A to 5D. Suppose now that the actual low-resolution image as the datum frame obtained from the AFE 2 is the actual low-resolution image Fa, and that the two actual low-resolution images as the two consulted frames obtained from the frame memory 41 are the actual low-resolution images Fb and Fc.

The super-resolution calculator 45a generates, from the high-resolution image, estimated low-resolution images corresponding to an estimated version of the actual low-resolution images. Let the number of pixels on a low-resolution image, for example an actual or estimated low-resolution image, be "u", and let the number of pixels on a high-resolution image, for example the initial high-resolution image, be "v". Here, "v" is an arbitrary value greater than "u". For example, in a case where the resolution enhancement factor is 2 in both the vertical and horizontal directions, "v" is four times "u". The pixel value group of the actual low-resolution image Fa composed of "u" pixels is represented by $Ya=[ya_1, ya_2, \ldots ya_u]$, the pixel value group of the actual low-resolution image Fb composed of "u" pixels is represented by $Yb=[yb_1, yb_2, \ldots yb_u]$, and the pixel value group of the actual low-resolution image Fc composed of "u" pixels is represented by $Yc=[yc_1, yc_2, \ldots yc_u]$.

Processing Related to Initial High-Resolution Image: When the image processor 4a performs super-resolution processing, the actual low-resolution image Fa of the current frame is fed, as a datum frame, from the AFE 2 to the estimator 61, and the actual low-resolution images Fb and Fc equivalent to two frames which have been displacement-corrected by the displacement corrector 44 are fed, as two consulted frames, to the estimator 61. As in the processing in Step 31 corresponding to FIG. 5A, based on the amounts of motion obtained by the motion amount calculator 42, the estimator 61 detects the displacements among the actual low-resolution images Fa to Fc, and performs interpolation using the detected displacements on the pixel value groups Ya, Yb, and Yc to generate an initial high-resolution image Fx1 composed of "v" pixels.

The pixel value group of the high-resolution image Fx1 composed of "v" pixels is represented by $X=[x_1, x_2, \ldots x_v]$. Through processing at a later stage, the high-resolution image Fx1 is renewed and thereby a high-resolution image Fx2 is generated; through processing at further later stages, high-resolution images Fx3, Fx4, ..., Fxn are generated one after another. The pixel value groups of these high-resolution images Fx2 to Fxn are each also represented by $X=[x_1, x_2, \ldots x_v]$.

In the process of generating the image Fx1, it is possible to use, as part of the filter for generating a high-resolution image, a filter (such as a median filter) that is expected to reduce noise. Here, to enhance the signal-to-noise ratio (S/N ratio) of the image Fx1 generated, it is preferable to give a relatively great tap number to the filter for generating a high-resolution image. It is also possible to generate the initial high-resolution image Fx1 based solely on the actual low-resolution image Fa as the datum frame. In this case, the initial high-resolution image Fx1 can be generated by enhancing the resolution of the actual low-resolution image Fa by linear interpolation or the like.

When the estimator 61 outputs the image Fx1, the selector 62 selects the image Fx1 and feeds it to the renewal amount calculator 63. The renewal amount calculator 63 also receives the amount of motion calculated by the motion amount calculator 42. Based on the amount of motion from the motion amount calculator 42, the renewal amount calculator 63 calculates the displacements of the actual low-resolution images Fa to Fc relative to the high-resolution image fed from the selector 62. Thereafter, to degrade the high-resolution image from the selector 62 and thereby estimate the original low-resolution images (i.e. the actual low-resolution images Fa to Fc), camera parameter matrices Wa to Wc (i.e. Wa, Wb, and Wc) are found that include as parameters the displacements calculated, the image blur attributable to resolution reduction, and the amount of down sampling from a high-resolution image of "v" pixels to a low-resolution image of "u" pixels.

Then, as in Step 32 in FIG. 3 (see also FIG. 5B), the renewal amount calculator 63 multiplies the pixel value group X of the high-resolution image Fx1 by each of the camera parameter matrices Wa to Wc to generate estimated low-resolution images Fa1 (=Wa·X), Fb1 (=Wb·X), and Fc1 (=Wc·X), which correspond to an estimated version of the actual low-resolution images Fa, Fb, and Fc. Needless to say, in calculation processing such as multiplication, an image of interest can be taken as a matrix having as its elements the pixel values of the image; thus, the pixel value group X with respect to the high-resolution image and the pixel value groups Ya to Yc with respect to the actual low-resolution images Fa to Fc can be taken as matrices.

The errors between the estimated low-resolution images and the actual low-resolution images are represented by |Wa·X−Ya|, |Wb·X−Yb|, and |Wc·X−Yc|. The renewal amount calculator 63 defines, as an evaluation function for estimating those errors, an evaluation function I given by formula (A1) below. Specifically, the renewal amount calculator 63 finds, based on the actual low-resolution images Fa to Fc equivalent to three frames from the AFE 2 and the displacement corrector 44, the squared errors $|Wa \cdot X - Ya|^2$, $|Wb \cdot X - Yb|^2$, and $|Wc \cdot X - Yc|^2$ between the estimated images Fa1 to Fc1 and the actual images Fa to Fc, and, by adding to them a constraining term, finds the evaluation function I. Then, the renewal amount calculator 63 finds the amount of renewal such as to minimize the evaluation function I. The fourth term of the right side of formula (A1) is the constraining term based on the high-resolution image from the selector 62. The matrix C in this constraining term $\gamma|C \cdot X|^2$ is one based on an "a priori" probability model. The matrix C is set based on the "a priori" knowledge that "a high-resolution image contains only a small proportion of high-band components", and is formed with a high-pass filter such as, for example, a Laplacian filter. The coefficient γ is a parameter representing the weight of the constraining term for the evaluation function I.

$$I = |Wa \cdot X - Ya|^2 + |Wb \cdot X - Yb|^2 + |Wc \cdot X - Yc|^2 + \gamma|C \cdot X|^2 \quad (A1)$$

Any method may be adopted to minimize the evaluation function I. Suppose now that the gradient method is used. In this case, the renewal amount calculator 63 finds the gradient $\partial I/\partial X$ for the evaluation function I. The gradient $\partial I/\partial X$ is given by formula (A2) below. Here, a matrix followed by the superscript T is the transposed matrix of an original matrix. Accordingly, for example $Wa^T$ represents the transposed matrix of a matrix Wa. The gradient $\partial I/\partial X$ found based on the high-resolution image Fx1 is calculated as the amount of renewal for the high-resolution image Fx1. The gradient $\partial I/\partial X$ corresponds to the differential image ΔFx1 (see FIG.

5C), and the calculation processing here corresponds to the processing in Step 33 in FIG. 3, which corresponds to FIG. 5C.

$$\partial I/\partial X = 2 \times [Wa^T \cdot (Wa \cdot X - Ya) + \\ Wb^T \cdot (Wb \cdot X - Yb) + Wc^T \cdot (Wc \cdot X - Yc) + \gamma C^T \cdot C \cdot X] \quad (A2)$$

The subtracter 64 receives from the renewal amount calculator 63 the amount of renewal represented by the gradient $\partial I/\partial X$, and receives via the selector 62 the high-resolution image Fx1 from the estimator 61. As in the processing performed in Step 34 in FIG. 3 (see also FIG. 5D), the subtracter 64 subtracts the amount of renewal $\partial I/\partial X$ for the high-resolution image Fx1 from the high-resolution image Fx1 (i.e. the pixel value group X of the high-resolution image Fx1), and thereby calculates a high-resolution image Fx2 having as its pixel values the elements of the matrix X' given by formula (A3) below. The obtained high-resolution image Fx2 is fed from the subtracter 64 to the frame memory 65 for temporary storage.

$$X' = X - \partial I/\partial X \quad (A3)$$

High-Resolution Image Renewal Processing: After a new high-resolution image, i.e. the high-resolution image Fx2, is obtained, the selector 62 selects the high-resolution image stored in the frame memory 65 and feeds it to the renewal amount calculator 63 and the subtracter 64. Thereafter, within the super-resolution calculator 45a, the loop processing consisting of the processing from Steps 32 through 34 in FIG. 3 is executed repeatedly. For the sake of convenience, this loop processing is called "super-resolution calculation processing".

Specifically, when generalized by use of n, which is an integer of 2 or more, super-resolution calculation processing, at its n-th execution, proceeds as follows. At the n-th execution of super-resolution calculation processing, the selector 62 feeds the high-resolution image Fxn stored in the frame memory 65 to the renewal amount calculator 63 and the subtracter 64. Based on the high-resolution image Fxn, the renewal amount calculator 63 generates estimated low-resolution images Fan (=Wa·X), Fbn (=Wb·X), and Fcn (=Wc·X), which correspond to an estimated version of the actual low-resolution images Fa, Fb, and Fc. Then, based on the generated estimated low-resolution images Fan, Fbn, and Fcn, the actual low-resolution images Fa, Fb, and Fc, and the high-resolution image Fxn, the renewal amount calculator 63 calculates, according to formula (A2) above, the amount of renewal $\partial I/\partial X$ (in other words, the differential image ΔFxn) for the high-resolution image Fxn. According to formula (A3), the subtracter 64 subtracts the amount of renewal $\partial I/\partial X$ (in other words, the differential image ΔFxn) from the high-resolution image Fxn, and thereby generates a new high-resolution image Fx(n+1).

In a case where the upper limit of the number of repetition of super-resolution calculation processing is set at n, the latest high-resolution image Fx(n+1) obtained by the subtracter 64 is output from the subtracter 64 to the signal processor 46. In a case where the just-mentioned upper limit of the number of repetition is set at (N+1) or more, the high-resolution image Fx(n+1) is fed to the frame memory 65 for temporary storage, and is then fed via the frame memory 65 to the selector 62 so that super-resolution calculation processing is performed for the (n+1)-th time.

In a case where the exposure period for one frame is relatively short, as when a moving image is shot or when still images are shot continuously, the upper limit of the number of repetition of super-resolution calculation processing is set at a relatively small number. The upper limit of the number of repetition of super-resolution calculation processing when still images are shot in an ordinary manner different from when they are shot continuously may be set greater than that when a moving image is shot or when still images are shot continuously. Regardless of the number of repetition of super-resolution calculation processing, if it is judged that the amount of renewal $\partial I/\partial X$ for the high-resolution image Fxn has converged, the latest high-resolution image Fx(n+1) obtained by the subtracter 64 may be output from the subtracter 64 to the signal processor 46.

Second Example of Configuration of Super-Resolution Calculator

Figure 16:
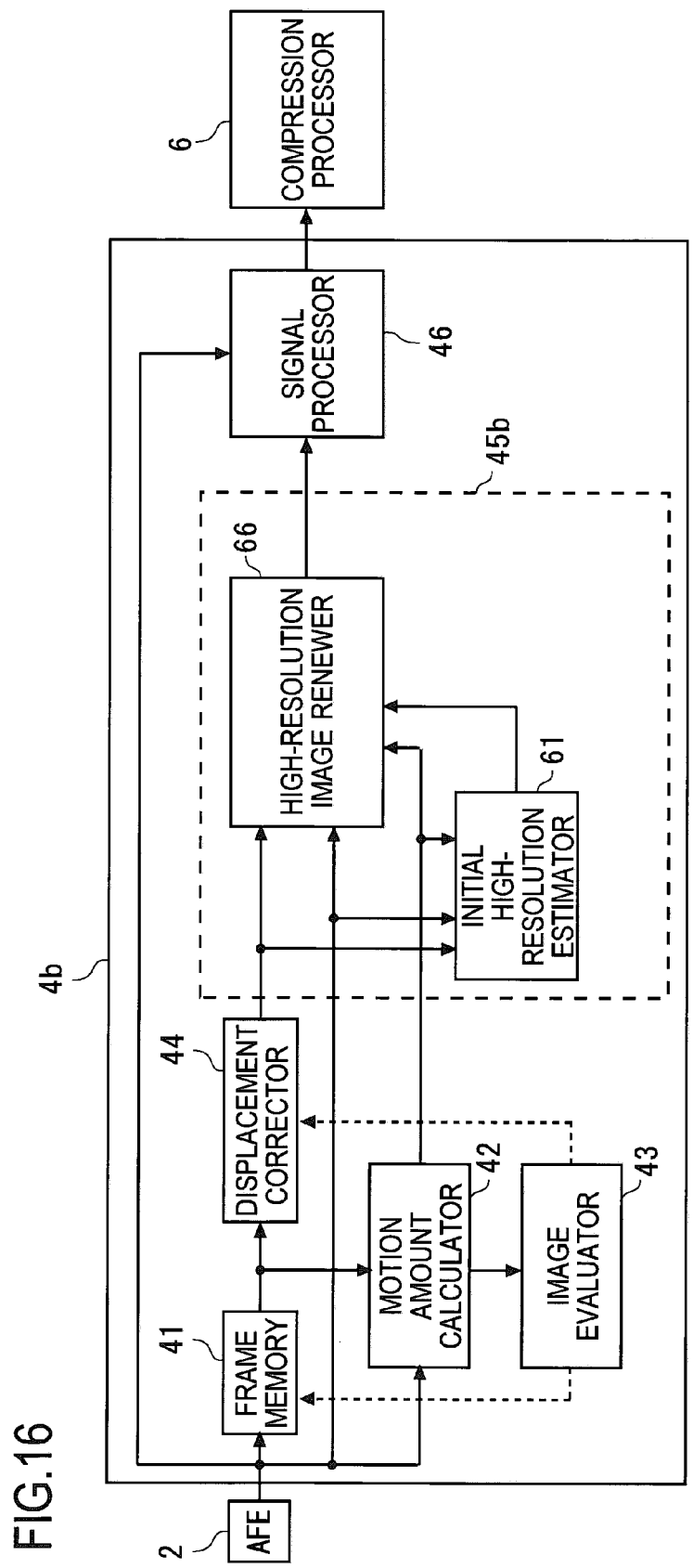
FIG. 16 is a block diagram of part of an image sensing apparatus, including yet another internal block diagram of the image processor in FIG. 1, according to the first embodiment of the invention.

A second example of the configuration of the super-resolution calculator 45 shown in FIG. 14 will now be described, taking up as an example a case where super-resolution calculation is performed by the MAP method. FIG. 16 is a block diagram of part of the image sensing apparatus shown in FIG. 1, including an internal block diagram of the super-resolution calculator 45b used as the super-resolution calculator 45 in FIG. 14. In FIG. 16, the reference sign 4b represents the image processor used as the image processor 4 in FIG. 1. The image processor 4b includes parts identified by the reference signs 41 to 44 and 46, and their functions and operation are the same as those of their counterparts shown in FIG. 14. The image processor 4b further includes a super-resolution calculator 45b.

The super-resolution calculator 45b on one hand includes the same estimator 61 as that shown in FIG. 15, and on the other hand includes, instead of the selector 62, the renewal amount calculator 63, the subtracter 64, and the frame memory 65, a high-resolution image renewer 66 (hereinafter abbreviated to "renewer 66"). The renewer 66 repeats twice the execution of the renewal processing of the high-resolution image, which is to be performed within the super-resolution calculator 45a in FIG. 15. The renewer 66 receives the actual low-resolution image Fa, which is the current frame, from the AFE 2, also receives the actual low-resolution images Fb and Fc displacement-corrected by the displacement corrector 44, and also receives the high-resolution image Fx1 estimated by the estimator 61. The renewer 66 further receives the amount of motion calculated by the motion amount calculator 42. As in the above description of the first example of configuration, the pixel value groups of the actual low-resolution images Fa, Fb, and Fc each composed of "u" pixels are represented by Ya, Yb, and Yc respectively; moreover, the pixel value group of the high-resolution image Fx1 composed of "v" pixels is represented by X. In the description of the second example of configuration, however, as distinct from that of the first example of configuration, the pixel value group of a high-resolution image (such as Fx2) other than the high-resolution image Fx1 is represented by a symbol other than X (the details will be described later).

The estimator 61 in the super-resolution calculator 45b, like the estimator 61 in the super-resolution calculator 45a of FIG. 15, generates an initial high-resolution image Fx1 from the actual low-resolution image Fa from the AFE 2 and the actual low-resolution images Fb and Fc displacement-corrected by the displacement corrector 44. The pixel value group X of the initial high-resolution image Fx1 and the pixel value groups Ya, Yb, and Yc of the actual low-resolution images Fa, Fb, and Fc are fed to the renewer 66.

First, by use of the pixel value groups X, Ya, Yb, and Yc, the renewer 66 finds the gradient $\partial I/\partial X$ according to formula (A2) above. Next, based on this gradient $\partial I/\partial X$, the renewer

66 finds the pixel value group X1 of a new high-resolution image Fx2. Here, X1=X−∂I/∂X. Thereafter, the renewer 66 calculates the gradient ∂I/∂X1 for the pixel value group X1 according to the formula noted below. By subtracting this gradient ∂I/∂X1 from the pixel value group X1, the pixel value group X2 (=X1−∂I/∂X1) of a high-resolution image Fx3 is obtained. That is, the high-resolution image Fx3 to be obtained by performing renewal processing twice on the high-resolution image Fx1 is obtained.

$$\partial I / \partial X = 2 \times [Wa^T \cdot (Wa \cdot X1 - Ya) +$$
$$Wb^T \cdot (Wb \cdot X1 - Yb) + Wc^T \cdot (Wc \cdot X1 - Yc) + \gamma C^T \cdot C \cdot X1]$$

This renewer 66 can be formed with a FIR (finite impulse response) filter. The method of calculating the filter coefficients in a case where the renewer 66 is formed with a FIR filter will be described below with reference to the relevant drawings. For the sake of simplicity, it is here assumed that the super-resolution calculator 45*b* generates a high-resolution image of a resolution twice as high as that of actual low-resolution images (i.e. it is assumed that the resolution enhancement factor is 2 in both the horizontal and vertical directions). It is also assumed that, relative to an actual low-resolution image Fa as a datum frame, actual low-resolution images Fb and Fc equivalent to two frames selected as consulted frames are each displaced in either the horizontal or vertical direction, and that the magnitude of these displacements (i.e. the magnitude of the amounts of motion) are in units of pixels of the high-resolution image. That is, it is assumed that the amount of motion between the images Fb and Fa is an amount of motion in the horizontal or vertical direction of the images (the direction of the motion vector between the images Fb and Fa is parallel to the horizontal or vertical direction of the images), and that, in addition, the magnitude of the amount of motion (the magnitude of the motion vector) is an integer times the adjacent pixel interval of the high-resolution image. This equally applies to the amount of motion between the images Fc and Fa.

Figures 17A, 17B:
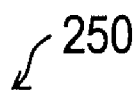
FIG. 17A is a diagram showing a filter as a point spread function for generating an estimated low-resolution image from a high-resolution image according to the first embodiment of the invention.
FIG. 17B is a diagram showing a pixel of interest along with its surrounding pixels in a high-resolution image.

Furthermore, it is assumed that the point spread function (hereinafter called "PSF") for generating estimated low-resolution images from a high-resolution image is formed with a filter (blur filter) 250 of a filter size of 3×3 as shown in FIG. 17A, and that the constraining term γ|CX|² is zero. The nine, in total, coefficients of the filter 250 are represented by $k_{11}$, $k_{21}$, $k_{31}$, $k_{12}$, $k_{22}$, $k_{32}$, $k_{13}$, $k_{23}$ and $k_{33}$. Relative to the position at which the coefficient $k_{22}$ is assigned, the coefficients assigned on its upper left, upper, upper right, left, right, lower left, lower, and lower right sides are $k_{11}$, $k_{21}$, $k_{31}$, $k_{12}$, $k_{32}$, $k_{13}$, $k_{23}$ and $k_{33}$ respectively. A pixel of interest on the high-resolution image is represented by x[p,q] as shown in FIG. 17B, where p and q are each a natural number. In the high-resolution image, the pixels adjacent to the pixel of interest x[p,q] on its upper left, upper, upper right, left, right, lower left, lower, and lower right sides are represented by x[p−1,q−1], x[p,q−1], x[p+1,q−1], x[p−1,q], x[p+1,q], x[p−1,q+1], x[p,q+1], and x[p+1,q+1]. Moreover, for the sake of convenience, the pixel value of pixel x[p,q] is also represented by x[p,q], and the same applies to x[p−1,q−1] etc.

Then, by treating the pixel of interest x[p,q] with the filter 250, the coefficients $k_{11}$, $k_{21}$, $k_{31}$, $k_{12}$, $k_{22}$, $k_{32}$, $k_{13}$, $k_{23}$ and $k_{33}$ are multiplied by the pixel values x[p−1,q−1], x[p,q−1], x[p+1,q−1], x[p−1,q], x[p,q], x[p+1,q], x[p−1,q+1], x[p,q+1], and x[p+1,q+1] respectively.

In the symbols representing pixels including the pixel of interest, the value on the left in the brackets (in x[p,q], "p") represents the horizontal position of the pixels and, the greater this value, the more the pixels are located to the right. In the symbols representing pixels including the pixel of interest, the value on the right in the brackets (in x[p,q], "q") represents the vertical position of the pixels and, the greater this value, the farther the pixels are located down. This applies equally to the symbols ya[p,q] etc. mentioned later.

Suppose further that the amount of motion between the actual low-resolution images Fa and Fb is an amount of motion in the horizontal direction, with the magnitude of the amount of motion corresponding to one pixel of the high-resolution image, and in addition that the amount of motion between the actual low-resolution images Fa and Fc is an amount of motion in the vertical direction, with the magnitude of the amount of motion corresponding to one pixel of the high-resolution image. When the adjacent pixel interval of the actual low-resolution images is represented by ΔS, then the magnitude of the amount of motion between images Fa and Fb and the magnitude of the amount of motion between images Fa and Fc, each corresponding to the width of one pixel (its width in the horizontal or vertical direction) of the high-resolution image, are each represented by ΔS/2.

Figures 19A, 19B:
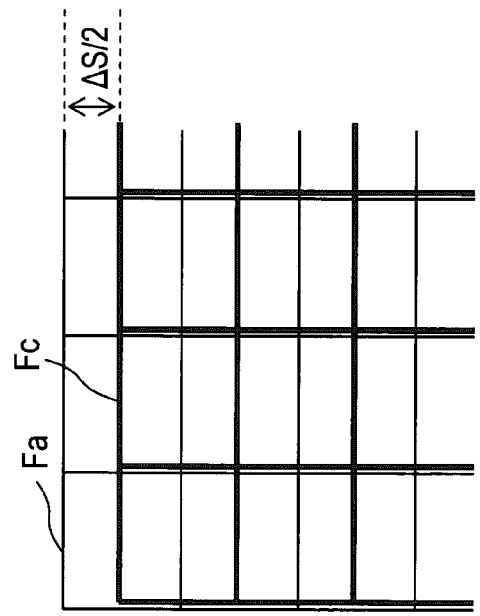
FIG. 19A is a diagram showing how, relative to a given low-resolution image, another low-resolution image is displaced in the vertical direction by one pixel of a high-resolution image.
FIG. 19B is a diagram showing the two low-resolution images superposed on each other in a common coordinate system.

Specifically, suppose that, as shown in FIGS. 18A and 18B, relative to the image Fa, the image Fb is displaced in the horizontal direction (specifically, to the right) by one pixel of the high-resolution image (i.e. by ΔS/2), and that, as shown in FIGS. 19A and 19B, relative to the image Fa, the image Fc is displaced in the vertical direction (specifically, down) by one pixel of the high-resolution image (i.e. by ΔS/2). FIG. 18A is a diagram showing the images Fa and Fb separately, and FIG. 18B is a diagram showing them overlaid on each other in the common coordinate system. In FIG. 18B, to make the images Fa and Fb distinguishable, they are shown slightly displaced from each other in the up/down direction. FIG. 19A is a diagram showing the images Fa and Fc separately, and FIG. 19B is a diagram showing them overlaid on each other in the common coordinate system. In FIG. 19B, to make the images Fa and Fc distinguishable, they are shown slightly displaced from each other in the left/right direction. The symbol ya[p, q] represents a pixel on the image Fa or its pixel value, the symbol yb[p, q] represents a pixel on the image Fb or its pixel value, and the symbol yc[p, q] represents a pixel on the image Fc or its pixel value.

Figure 21A:
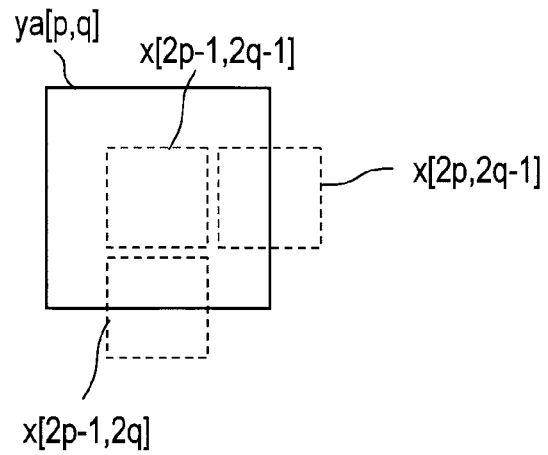
FIGS. 21A to 21C are each a diagram showing the positional relationship between one pixel on a first to a third low-resolution image, respectively, and three pixels on a high-resolution image.
Figure 21B:
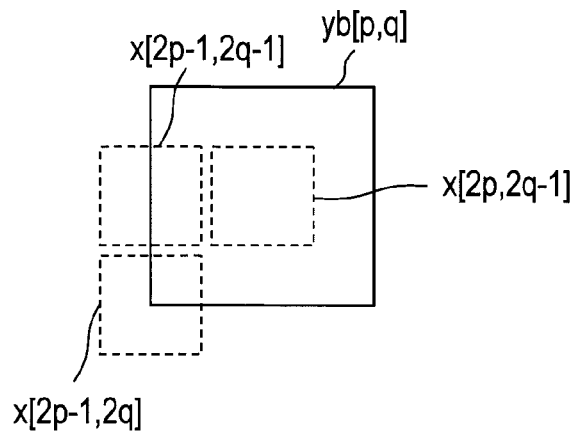
Figure 21C:
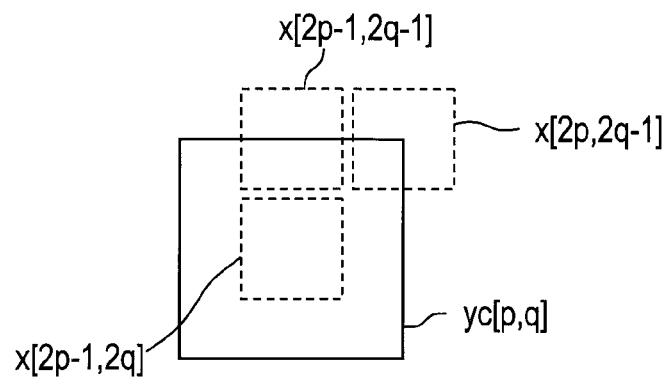

Then if, as shown in FIG. 20A, the center position of pixel ya[1, 1] on the actual low-resolution image Fa coincides with the center position of pixel x[1,1] on the initial high-resolution image Fx1, then, as shown in FIG. 20B, the center position of pixel yb[1,1] on the actual low-resolution image Fb coincides with the center position of pixel x[2,1] on the initial high-resolution image Fx1, and in addition, as shown in FIG. 20C, the center position of pixel yc[1,1] on the actual low-resolution image Fc coincides with the center position of pixel x[1,2] on the initial high-resolution image Fx1. In addition, as shown in FIGS. 20A and 21A, the center position of pixel ya[p,q] on the image Fa coincides with the center position of pixel x[2p−1,2q−1] on the image Fx1, and, as shown in FIGS. 20B and 21B, the center position of pixel yb[p, q] on the image Fb coincides with the center position of pixel x[2p,2q−1] on the image Fx1, and, as shown in FIGS. 20C and 21C, the center position of pixel yc[p, q] on the image Fc coincides with the center position of pixel x[2p−1,2q] on the image Fx1. The solid-line grids in FIGS. 20A, 20B, and 20C represent the pixel value groups of the images Fa, Fb, and Fc respectively, and the broken-line grids in FIGS. 20A, 20B, and 20C represent the pixel value groups of the high-resolution image Fx, which includes the initial high-resolution image Fx1.

Assuming that the positional relationship between the pixels of the actual low-resolution images Fa, Fb, and Fc and the pixels of the initial high-resolution image Fx1 is as shown in FIGS. 20A to 20C and 21A to 21C, the operation of the super-resolution calculator 45b shown in FIG. 16 will be described below.

Processing for Deriving Pixel Values of Estimated Low-Resolution Images (First Subprocessing): The processing for deriving the pixel values of the estimated low-resolution images (hereinafter also called "the first subprocessing") will now be described. The pixel values A[p, q], B[p, q], and C[p, q] of the estimated low-resolution images Fa1, Fb1, and Fc1, respectively, estimated from the initial high-resolution image Fx1 are given by formulae (B1) to (B3) below. The pixel values A[p, q], B[p, q], and C[p, q] are represented by matrices Wa·X, Wb·X, and Wc·X respectively.

$$A[p, q] = k_{11} \cdot x[2p - 2, 2q - 2] + k_{21} \cdot x[2p - 1, 2q - 2] + \\ k_{31} \cdot x[2p, 2q - 2] + k_{12} \cdot x[2p - 2, 2q - 1] + \\ k_{22} \cdot x[2p - 1, 2q - 1] + k_{32} \cdot x[2p, 2q - 1] + \\ k_{13} \cdot x[2p - 2, 2q] + k_{23} \cdot x[2p - 1, 2q] + k_{33} \cdot x[2p, 2q] \quad (B1)$$

$$B[p, q] = k_{11} \cdot x[2p - 1, 2q - 2] + k_{21} \cdot x[2p, 2q - 2] + \\ k_{31} \cdot x[2p - 1, 2q - 2] + k_{12} \cdot x[2p - 1, 2q - 1] + \\ k_{22} \cdot x[2p, 2q - 1] + k_{32} \cdot x[2p + 1, 2q - 1] + \\ k_{13} \cdot x[2p - 1, 2q] + k_{23} \cdot x[2p, 2q] + k_{33} \cdot x[2p + 1, 2q] \quad (B2)$$

$$C[p, q] = \\ k_{11} \cdot x[2p - 2, 2q - 1] + k_{21} \cdot x[2p - 1, 2q - 1] + k_{31} \cdot x[2p, 2q - 1] + \\ k_{12} \cdot x[2p - 2, 2q] + k_{22} \cdot x[2p - 1, 2q] + k_{32} \cdot x[2p, 2q] + \\ k_{13} \cdot x[2p - 2, 2q + 1] +_{23} \cdot x[2p - 1, 2q + 1] + k_{33} \cdot x[2p, 2q + 1] \quad (B3)$$

Processing for Deriving Gradient at Each Pixel on High-Resolution Image (Second Subprocessing): The processing for deriving the gradient at each pixel on the high-resolution image (hereinafter also called "the second subprocessing") will now be described. After the pixel values of the estimated low-resolution images Fa1 to Fc1 are obtained in the manner described above, then, based on the differences between them and the pixel values of the actual low-resolution images Fa to Fc, the gradient ∂I/∂X for the initial high-resolution image Fx1 is calculated. Below will be described the methods of calculating the gradient ∂I/∂X in cases where the pixel of interest on the high-resolution image is x[2p−1,2q−1], x[2p, 2q−1], and x[2p−1,2q] respectively.

First, a description will be given of the method of calculating the gradient ∂I/∂X when the pixel of interest is pixel x[2p−1,2q−1].

Figure 22A:
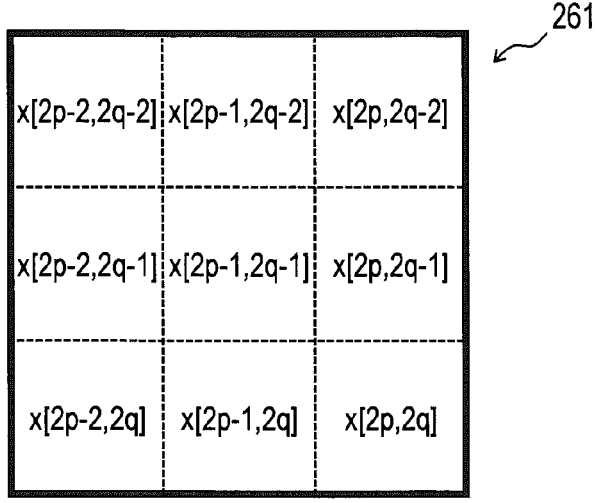
FIGS. 22A to 22C are each a diagram showing the 3×3-pixel rectangular region centered around a first to a third pixel of interest, respectively, on a high-resolution image.

When the pixel of interest is pixel x[2p−1,2q−1], the region 261 shown in FIG. 22A, composed of 3×3 pixels x[2p−2,2q−2] to x[2p,2q] centered around pixel x[2p−1,2q−1], is taken as of interest, and this region 261 is subjected to filtering processing with a PSF, which may be called a blur function. Thus, by use of the pixel values of, of the pixels of the actual low-resolution images Fa, Fb, and Fc and the estimated low-resolution images Fa1, Fb1, and Fc1, those whose center positions are located within the region 261, the gradient ∂I/∂X at pixel x[2p−1,2q−1] is calculated.

More specifically, the processing proceeds as follows. As will be understood from FIGS. 21A to 21C etc., within the region 261, the center positions of pixels x[2p−1,2q−1], x[2p, 2q−1], and x[2p−1,2q] on the initial high-resolution image Fx1 coincide with the center positions of pixel ya[p, q] on the image Fa, pixel yb[p,q] on the image Fb, and pixel yc[p,q] on the image Fc, and in addition the center positions of pixels x[2p−2,2q−1] and x[2p−1,2q−2] on the image Fx1 coincide with the center positions of pixel yb[p−1,q] on the image Fb and pixel yc[p,q−1] on the image Fc. Thus, based on the pixel values ya[p,q], yb[p−1,q], yb[p,q], yc[p,q−1] and yc[p,q] on the actual low-resolution images Fa to Fc, the pixel values A[p,q], B[p−1,q], B[p,q], C[p,q−1] and C[p,q] on the estimated low-resolution images Fa1 to Fc1, and the filter 250 shown in FIG. 15, the gradient ∂I/∂X_x[2p−1,2q−1] at pixel x[2p−1,2q−1] is found according to formula (B4) below. Here, K=$k_{12}+k_{22}+k_{32}+k_{11}+k_{13}+k_{31}+k_{33}$.

$$\partial I / \partial X\_x[2p - 1, 2q - 1] = k_{22} \cdot (A[p, q] - ya[p, q]) / K1 + \\ k_{12} \cdot (B[p - 1, q] - yb[p - 1, q]) / K1 + \\ k_{32} \cdot (B[p, q] - yb[p, q]) / K1 + \\ k_{21} \cdot (C[p, q - 1] - yc[p, q - 1]) / K1 + \\ k_{23} \cdot (C[p, q] - yc[p, q]) / K1 \quad (B4)$$

Second, a description will be given of the method of calculating the gradient ∂I/∂X when the pixel of interest is pixel x[2p,2q−1].

Figure 22B:
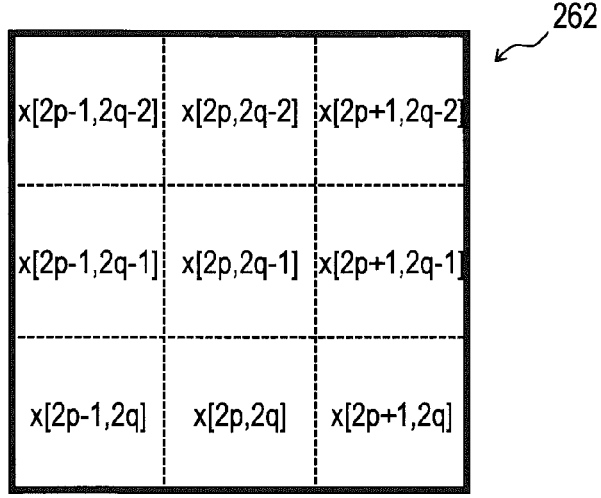

When the pixel of interest is pixel x[2p,2q−1], the region 262 shown in FIG. 22B, composed of 3×3 pixels x[2p−1,2q−2] to x[2p+1,2q] centered around pixel x[2p,2q−1], is taken as of interest, and this region 262 is subjected to filtering processing with a PSF. Thus, by use of the pixel values of, of the pixels of the actual low-resolution images Fa, Fb, and Fc and the estimated low-resolution images Fa1, Fb1, and Fc1, those whose center positions are located within the region 262, the gradient ∂I/∂X at pixel x[2p,2q−1] is calculated.

More specifically, the processing proceeds as follows. As will be understood from FIGS. 21A to 21C etc., within the region 262, the center positions of pixels x[2p−1,2q−1], x[2p+1,2q−1], x[2p,2q−1], x[2p−1,2q−2], x[2p−1,2q], x[2p+1,2q−2], x[2p+1,2q] on the initial high-resolution image Fx1 coincide with the center positions of pixels ya[p,q] and ya[p+1,q] on the image Fa, pixel yb[p,q] on the image Fb, and pixels yc[p,q−1], yc[p,q], yc[p+1,q−1], and yc[p+1,q] on the image Fc. Thus, based on the pixel values ya[p,q], ya[p+1,q], yb[p, q], yc[p,q−1], yc[p,q], yc[p+1,q−1] and yc[p+1,q] on the actual low-resolution images Fa to Fc, the pixel values A[p,q], A[p+1,q], B[p,q], C[p,q−1], C[p,q], C[p+1,q−1], and C[p+1, q] on the estimated low-resolution images Fa1 to Fc1, and the filter 250 shown in FIG. 15, the gradient ∂I/∂X_x[2p,2q−1] at pixel x[2p,2q−1] is found according to formula (B5) below. Here, K2=$k_{12}+k_{22}+k_{32}+k_{11}+k_{13}+k_{31}+k_{33}$.

$$\partial I / \partial X\_x[2p - 1, 2q - 1] = \quad (B5) \\ k_{22} \cdot (B[p, q] - yb[p, q]) / K2 + k_{12} \cdot (A[p, q] - ya[p, q]) / K2 + \\ k_{32} \cdot (A[p + 1, q] - ya[p + 1, q]) / K2 + \\ k_{11} \cdot (C[p, q - 1] - yc[p, q - 1]) / K2 + \\ k_{13} \cdot (C[p, q] - yc[p, q]) / K2 + \\ k_{31} \cdot (C[p + 1, q - 1] - yc[p + 1, q - 1]) / K2 + \\ k_{33} \cdot (C[p + 1, q] - yc[p + 1, q]) / K2$$

Third, a description will be given of the method of calculating the gradient ∂I/∂X when the pixel of interest is pixel x[2p−1,2q].

Figure 22C:
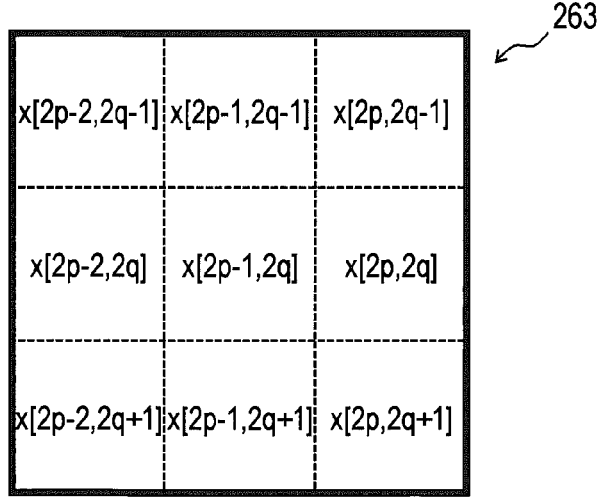

When the pixel of interest is pixel x[2p−1,2q], the region 263 shown in FIG. 22C, composed of 3×3 pixels×[2p2,2q−1] to x[2p,2q+1] centered around pixel x[2p−1,2q], is taken as of interest, and this region 263 is subjected to filtering processing with a PSF. Thus, by use of the pixel values of, of the pixels of the actual low-resolution images Fa, Fb, and Fc and the estimated low-resolution images Fa1, Fb1, and Fc1, those whose center positions are located within the region 263, the gradient ∂I/∂X at pixel x[2p−1,2q] is calculated.

More specifically, the processing proceeds as follows. As will be understood from FIGS. 21A to 21C etc., within the region 263, the center positions of pixels×[2p−1,2q−1], x[2p−1,2q+1], x[2p−2,2q−1], x[2p,2q−1], x[2p−2,2q+1], x[2p,2q+1], x[2p+1,2q] on the initial high-resolution image Fx1 coincide with the center positions of pixels ya[p,q] and ya[p,q+1x] on the image Fa, pixels yb[p−1,q], yb[p,q], yb[p−1,q+1], and yb[p,q+1] on the image Fb, and pixel yc[p,q] on the image Fc. Thus, based on the pixel values ya[p,q], ya[p,q+1], yb[p−1,q], yb[p,q], yb[p−1,q+1], yb[p,q+1], and yc[p,q] on the actual low-resolution images Fa to Fc, the pixel values A[p,q], A[p,q+1], B[p−1,q], B[p,q], B[p−1,q+1], B[p,q+1] and C[p,q] on the estimated low-resolution images Fa1 to Fc1, and the filter 250 shown in FIG. 15, the gradient ∂I/∂X_x[2p−1,2q] at pixel x[2p−1,2q] is found according to formula (B6) below. Here, K3=$k_{21}+k_{22}+k_{23}+k_{11}+k_{13}+k_{31}+k_{33}$.

$$\partial I/\partial X\_x[2p-1, 2q] = \quad (B6)$$
$$k_{22} \cdot (C[p, q] - yc[p, q])/K3 + k_{21} \cdot (A[p, q] - ya[p, q])/K3 +$$
$$k_{23} \cdot (A[p, q+1] - ya[p, q+1])/K3 +$$
$$k_{11} \cdot (B[p-1, q] - yb[p-1, q])/K3 +$$
$$k_{31} \cdot (B[p, q] - yb[p, q])/K3 +$$
$$k_{13} \cdot ([p-1, q+1] - yb[p-1, q+1])/K3 +$$
$$k_{33} \cdot (B[p, q+1] - yb[p, q+1])/K3$$

Processing for Renewing Pixel Value at Each Pixel on High-Resolution Image (Third Subprocessing): The processing for renewing the pixel value at each pixel on the high-resolution image (hereinafter also called "the third subprocessing") will now be described. After the gradient ∂I/∂X at each pixel on the high-resolution image is calculated in the manner described above, by subtracting the calculated gradients from the pixel values of the initial high-resolution image, the pixel values of a renewed high-resolution image are calculated. Specifically, as a result of the pixel value at pixel x[p,q] being renewed by use of the gradient ∂I/∂X_x[p,q] at pixel x[p,q], the pixel value at pixel x1[p,q] on a high-resolution image Fx2 is calculated. The symbol x1[p,q] represents a pixel on the image Fx2 or its pixel value. Here, x1[p,q]=x[p,q]−∂I/∂X_x[p,q].

Through the first to third subprocessing described above, the high-resolution image is renewed. At the second execution of the renewal, through the first subprocessing, the pixel values of the estimated low-resolution images Fa2 to Fc2 are found according to formulae (B1) to (B3) above. Here, instead of the pixel values (x[2p,2q] etc.) of the high-resolution image Fx1, the pixel values (x1[2p,2q] etc.) of the high-resolution image Fx2 are used. Specifically, the pixel values of the estimated low-resolution images Fa2, Fb2, and Fc2 are represented by formulae (B7) to (B9) below. For the sake of convenience, as with the estimated low-resolution images Fa1, Fb1, and Fc1, the pixel values of images Fa2, Fb2, and Fc2 are also represented by A [p,q], B[p,q], and C[p,q]. The pixel values A [p,q], B[p,q], and C[p,q] of the images Fa2, Fb2, and Fc2 are represented by matrices Wa·X1, Wb·X1, and Wc·X1 (as described previously, X1 represents the pixel value group of the high-resolution image Fx2).

$$A[p, q] = k_{11} \cdot x1[2p-2, 2q-2] + k_{21} \cdot x1[2p-1, 2q-2] + \quad (B7)$$
$$k_{31} \cdot x1[2p, 2q-2] + k_{12} \cdot x1[2p-2, 2q-1] +$$
$$k_{22} \cdot x1[2p-1, 2q-1] + k_{32} \cdot x1[2p, 2q-1] +$$
$$k_{13} \cdot x1[2p-2, 2q] + k_{23} \cdot x1[2p-1, 2q] + k_{33} \cdot x1[2p, 2q]$$

$$B[p, q] = k_{11} \cdot x1[2p-1, 2q-2] + k_{21} \cdot x1[2p, 2q-2] + \quad (B8)$$
$$k_{31} \cdot x1[2p-1, 2q-2] + k_{12} \cdot x1[2p-1, 2q-1] +$$
$$k_{22} \cdot x1[2p, 2q-1] + k_{32} \cdot x1[2p+1, 2q-1] +$$
$$k_{13} \cdot x1[2p-1, 2q] + k_{23} \cdot x1[2p, 2q] + k_{33} \cdot x1[2p+1, 2q]$$

$$C[p, q] = k_{11} \cdot x1[2p-2, 2q-1] + \quad (B9)$$
$$k_{21} \cdot x1[2p-1, 2q-1] + k_{31} \cdot x1[2p, 2q-1] +$$
$$k_{12} \cdot x1[2p-2, 2q] + k_{22} \cdot x1[2p-1, 2q] + k_{32} \cdot x1[2p, 2q] +$$
$$k_{13} \cdot x1[2p-2, 2q+1] +_{23} \cdot x1[2p-1, 2q+1] +$$
$$k_{33} \cdot x1[2p, 2q+1]$$

After the pixel values of the estimated low-resolution images Fa2 to Fc2 are found, according to formulae (B4) to (B6) above, the gradient ∂I/∂X1 for each pixel on the high-resolution image is calculated, and this gradient ∂I/∂X1 is subtracted from the pixel values of the high-resolution image Fx2. Thus the renewal processing is performed for the second time, and thereby a high-resolution image Fx3 is generated.

As described previously, when calculation processing using a PSF represented by a 3×3 matrix is performed, at the first execution of the renewal processing, with respect to a pixel of interest x[p,q] on the initial high-resolution image Fx1, an image region IR shown in FIG. 23A is taken as of interest. The image region IR is formed by 3×3 pixels×[p−1,q−1] to x[p+1,q+1] centered around the pixel of interest x[p,q]. And the pixel values of those pixels of the actual low-resolution images and the estimated low-resolution images which are located within the image region IR are needed. In the following description, with respect to the high-resolution image, an image region, like the image region IR, formed by 3×3 pixels centered around a given pixel (pixel of interest) is called "consulted image region".

On one hand, the pixel values of the estimated low-resolution images are found, as described above, by substituting the pixel values of 3×3 pixels on the initial high-resolution image Fx1 in the PSF. On the other hand, to acquire the pixel values of those pixels on the estimated low-resolution images which are located at the pixel positions within the image region IR other than at the pixel of interest x[p,q], the pixel values of 3×3 pixels on the initial high-resolution image Fx1 are used. Accordingly, at the first execution of the renewal processing, those 5×5 pixels×[p−2,q−2] to x[p+2,q+2] on the initial high-resolution image Fx1 which are located within the frame 280 in FIG. 23B are used.

Specifically, to generate the high-resolution image Fx2 by renewing the initial high-resolution image Fx1 only once, with respect to the pixel of interest x[p,q] on the initial high-resolution image Fx1, the pixel values of 5×5 pixels×[p−2,q−2] to x[p+2,q+2] on the initial high-resolution image Fx1 are needed. In addition, a consulted image region formed by 3×3 pixels×[p−1,q−1] to x[p+1,q+1] on the initial high-resolution image Fx1 are taken as of interest, and the pixel values of those pixels of the actual low-resolution images Fa to Fc which are located within that consulted image region are needed.

In a case where the high-resolution image Fx2, already renewed once, is further renewed, it is subjected to processing using the renewed pixel values. Specifically, with respect to a pixel of interest x1[p,q] on the high-resolution image Fx2, the pixel values of 5×5 pixels x1[p−2,q−2] to x1x[p+2,q+2] on the high-resolution image Fx2 are needed. In addition, a consulted image region formed by 3×3 pixels x1[p1,q−1] to x1[p+1,q+1] on the high-resolution image Fx2 are taken as of interest, and the pixel values of those pixels of the actual low-resolution images Fa to Fc which are located in that consulted image region are needed.

When the high-resolution image Fx2 is generated from the initial high-resolution image Fx1 by renewal of pixel values, however, for each pixel, the pixel values of 5×5 pixels on the initial high-resolution image Fx1, and also the pixel values of those pixels of the actual low-resolution images Fa to Fc which are located within a consulted image region on the initial high-resolution image Fx1, are needed. Specifically, the pixel values of those 5×5 pixels x1[p−2,q−2] to x1[p+2,q+2] on the high-resolution image Fx2 which are to be used for a pixel of interest x1[p,q] on the high-resolution image Fx2 are calculated at the first execution of the renewal processing by use of the pixel values of 5×5 pixels on the initial high-resolution image Fx1, and the pixel values of those pixels of the actual low-resolution images Fa to Fc which are located within the consulted image region on the initial high-resolution image Fx1.

Figure 24:
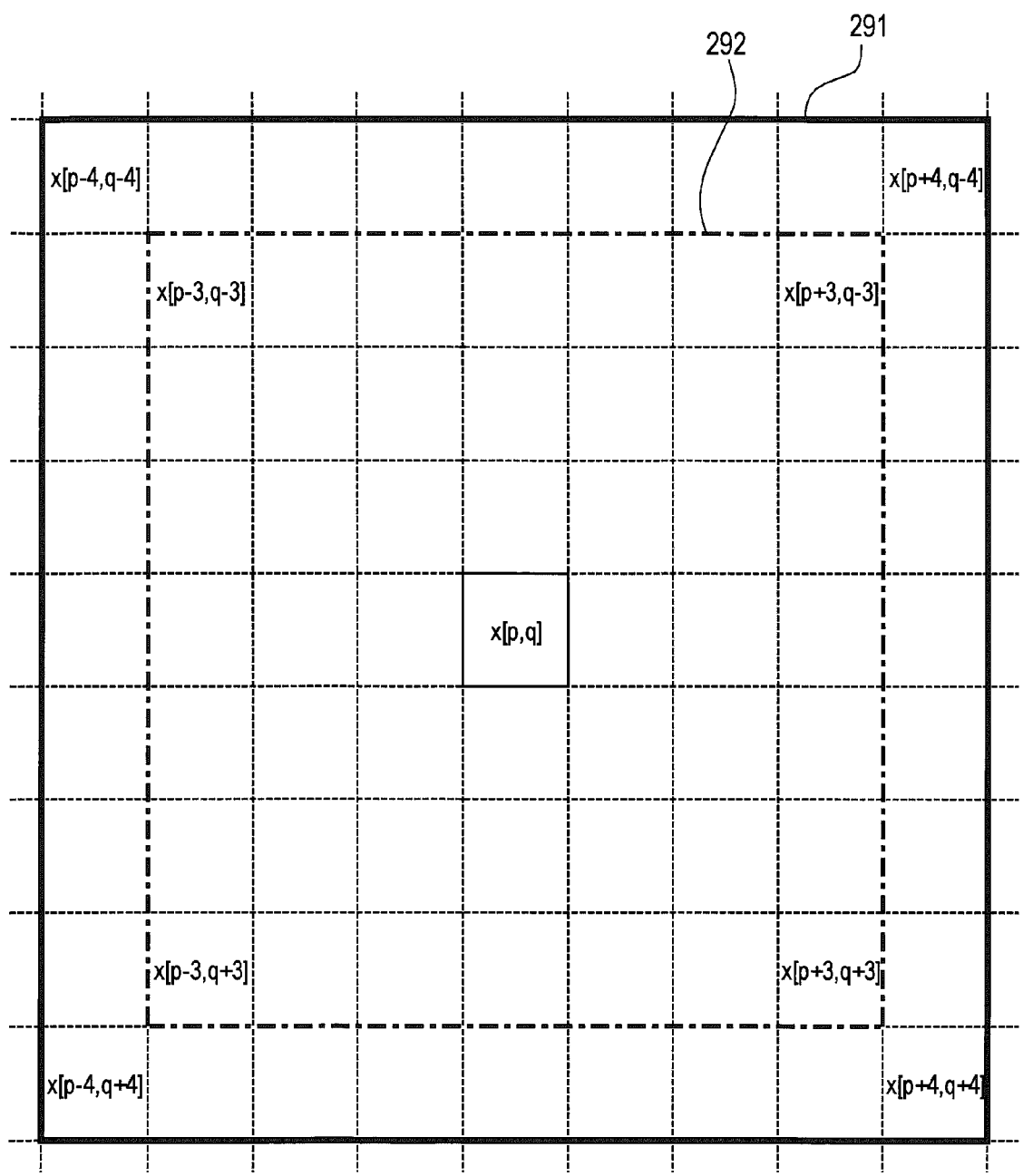
FIG. 24 is a diagram showing the 9×9-pixel rectangular region centered around a pixel of interest on a high-resolution images.

Thus, when the initial high-resolution image Fx1 is renewed twice, with respect to a pixel of interest x[p,q], the pixel values renewed at 5×5 pixels×[p−2,q−2] to x [p+2,q+2] are used for further renewal. Specifically, for the renewal here, the pixel values of those 5×5 pixels on the initial high-resolution image Fx1 which are centered around each of 5×5 pixels×[p−2,q−2] to x[p+2,q+2] are used. Moreover, in the renewal here, consulted image regions (a total of 25 consulted image regions) on the initial high-resolution image Fx1 are taken as of interest that each take one of 5×5 pixels [p−2,q−2] to x[p+2,q+2] as a pixel of interest, and the pixel values of those pixels of the actual low-resolution images Fa to Fc which are located within those consulted image regions are also used. Thus, when the initial high-resolution image Fx1 is renewed twice, with respect to a pixel of interest x[p,q] on the initial high-resolution image Fx1, the pixel values of those 9×9 pixels×[p−4,q−4] to x[p+4,q+4] on the initial high-resolution image Fx1 which are located within the solid-line frame 291 in FIG. 24 are needed. In addition, the pixel values of those pixels on the actual low-resolution images Fa to Fc which are located within the image region surrounded in the dash-dot line frame 292 in FIG. 24 are also needed. The image region surrounded in the dash-dot line frame 292 is itself identified by the same reference sign 292. The image region 292 is formed by 7×7 pixels×[p−3,q−3] to x[p+3,q+3] on the initial high-resolution image Fx1.

Accordingly, the FIR filter that forms the renewer 66 in FIG. 16 is formed as one that receives as input values "the pixel values of 9×9 pixels on the initial high-resolution image Fx1" and "the pixel values of those pixels on the actual low-resolution images Fa to Fc which are located within the image region 292 on the initial high-resolution image Fx1" and that outputs the pixel value of the pixel of interest.

The coefficients of this FIR filter can be acquired as follows. First, the pixel values of the estimated low-resolution images obtained according to formulae (B1) to (B3) above are substituted in formulae (B4) to (B6) above, to find gradients. Thereafter the pixel values of the high-resolution image renewed with the gradients according to formulae (B4) to (B6) are substituted in formulae (B7) to (B9), and the pixel values of the resulting estimated low-resolution images are substituted in formulae (B4) to (B6), to find new gradients (second-time gradients). Then, by use of these new gradients, the subtraction formula for renewing the high-resolution image is developed to find the coefficients by which to multiply "the pixel values of 9×9 pixels on the initial high-resolution image Fx1" and the coefficients by which to multiply "the pixel values of those pixels on the actual low-resolution images Fa to Fc which are located within the image region 292 on the initial high-resolution image Fx1". The coefficients thus found are acquired as the coefficients of the FIR filter.

In the example under discussion, the amount of renewal that results when the renewal operation that is repeated within the super-resolution calculator 45a is performed twice is calculated by the renewer 66. Instead, the amount of renewal that results when the renewal operation within the super-resolution calculator 45a is performed repeatedly, three or more times, may be calculated by the renewer 66. For example, consider a case where the amount of renewal that results when the renewal operation within the super-resolution calculator 45a is performed $H_A$ times is calculated by the renewer 66, and that the PSF, which may be called a blur function, is formed by a matrix of $(2 \cdot K_A+1) \times (2 \cdot K_A+1)$. Here, $H_A$ is an integer of 3 or more, and $K_A$ is a natural number. In this case, the FIR filter forming the renewer 66 in FIG. 16 is formed as one that receives as input values "the pixel values of $(4H_A \times K_A+1) \times (4H_A \times K_A+1)$ pixels on the initial high-resolution image Fx1" and "the pixel values of those pixels on the actual low-resolution images Fa to Fc which are located within an image region 295 on the initial high-resolution image Fx1" and that outputs the pixel value of the pixel of interest. Here, the image region 295 is an image region formed by $(2(2H_A-1) \times K_A+1) \times (2(2H_A-1) \times K_A-1)$ pixels on the initial high-resolution image Fx1. The image region 295 is omitted from illustration. In the super-resolution calculator of the second example of configuration, a selector 452 and a frame memory 455 similar to those provided in the super-resolution calculator 45a of the first example of configuration may be provided so that, by use of them, super-resolution calculation processing is executed repeatedly.

Figure 25:
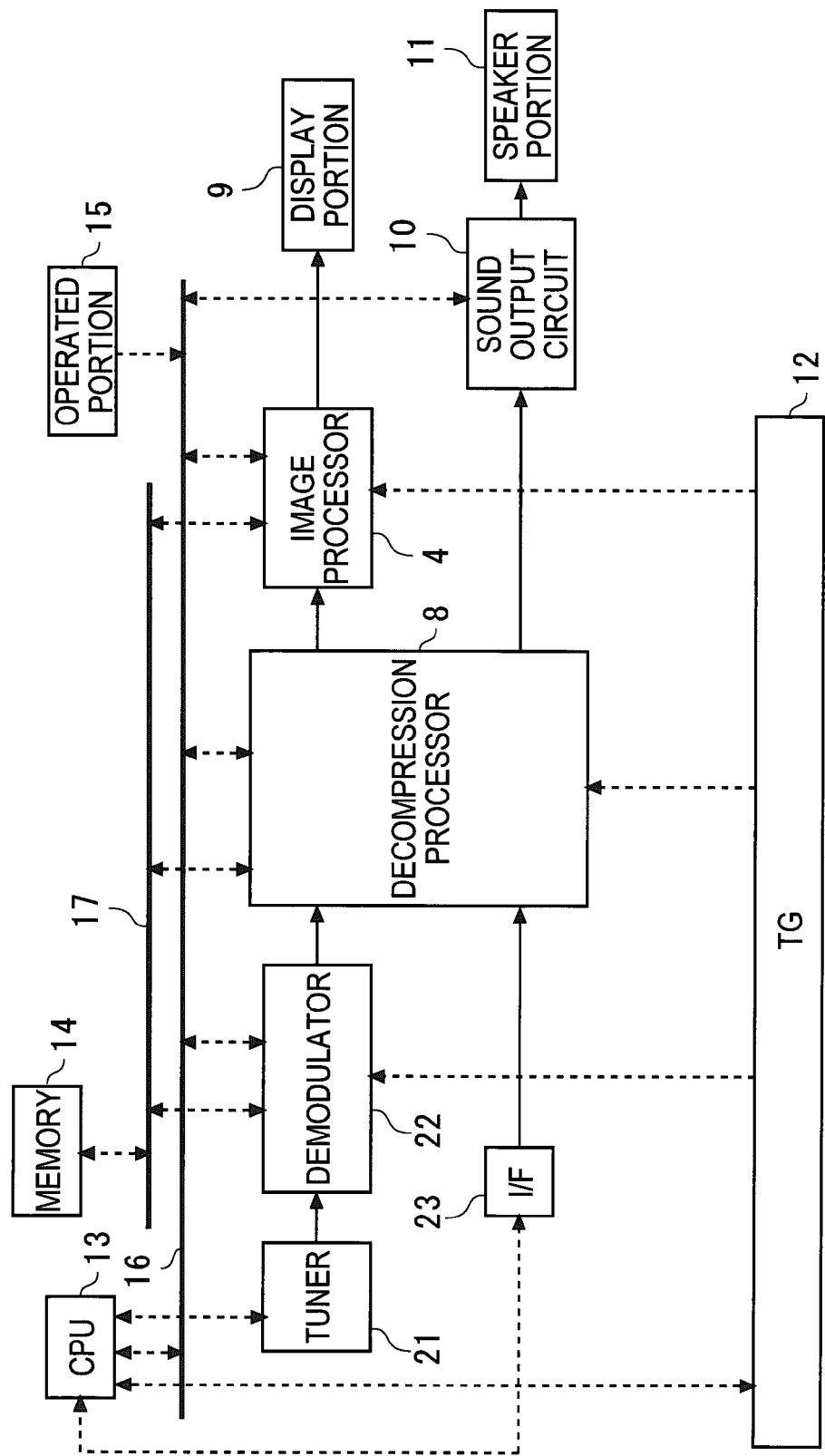
FIG. 25 is an overall block diagram of a display apparatus according to the invention.

An image processing method according to the invention has been described taking up as an example the image sensing apparatus configured as shown in FIG. 1. This image processing method may be applied not only to image sensing apparatuses but also to display apparatuses, as exemplified by liquid crystal displays and plasma televisions, that perform digital processing of images. FIG. 25 shows a display apparatus provided with an image processing apparatus (corresponding to an image processor) that performs an image processing method according to the invention. FIG. 25 is an overall block diagram of the display apparatus.

The display apparatus shown in FIG. 25, like the image sensing apparatus shown in FIG. 1, includes an image processor 4, an decompression processor 8, a display portion 9, a sound output circuit 10, a speaker portion 11, a timing generator 12, a CPU 13, a memory 14, an operated portion 15, and buses 16 and 17. The display apparatus shown in FIG. 25 further includes: a tuner 21 that selects among broadcast signals received outside; a demodulator 22 that demodulates the broadcast signal selected by the tuner 21; and an interface 23 that receives a digital compressed signal fed from outside. The compressed signal fed to the interface 23 contains a compressed/encoded image signal representing a moving or still image.

When the display apparatus shown in FIG. 25 receives a broadcast signal, the tuner 21 selects the broadcast signal of the desired channel, and the demodulator 22 demodulates the selected broadcast signal; thus a digital signal is obtained as a compressed signal conforming to the MPEG compression method. The compressed signal obtained from the broadcast signal contains a compressed/encoded image signal representing a moving or still image. The decompression processor 8 decompresses, by the MPEG compression method, the compressed signal received by the interface 23 or the compressed signal obtained by the demodulator 22. The image signal obtained through the decompression processing by the decompression processor 8 is fed, as an image signal of chronologically ordered actual low-resolution images, to the image processor 4. Specifically, an image signal of a plurality of chronologically ordered actual low-resolution images is fed sequentially, frame by frame, to the image processor 4.

When an operation requesting image resolution enhancement is made on the operated portion 15, the image processor 4 in FIG. 25 executes the previously described actual low-resolution image selection processing (consulted frame selection processing) and super-resolution processing on the actual low-resolution images fed thereto, and thereby generates a high-resolution image. An image signal representing the so generated high-resolution image is fed to the display portion 9, which thus performs image reproduction including the reproduction of the high-resolution image. Moreover, the sound signal obtained by the decompression processing by the decompression processor 8 is fed via the sound output circuit 10 to the speaker portion 11, which thus reproduces and outputs sounds.

In the image sensing apparatus of FIG. 1 or the display apparatus of FIG. 25, the image on which the image processor 4 performs super-resolution processing may be a moving image or a still image. The above description of an example of operation centers around the operation performed when an image signal of a moving image is fed to the image processor 4.

The previously given description of selection optimization processing, namely the description of the processing for selecting actual low-resolution images optimal for the generation of a high-resolution image, mainly assumes that the images processed are one-dimensional. Below will be described, as examples of selection optimization processing for two-dimensional images, a first to a fifth example of selection optimization processing. It should be noted that, unless inconsistent, any explanation given in connection with the first example of selection optimization processing applies equally to the second to fifth examples of selection optimization processing; moreover, unless inconsistent, different examples of selection optimization processing may be performed in combination.

Selection optimization processing is executed by the image processor 4 in FIG. 1 or 25, and, as the image processor 4, the image processor 4a in FIG. 15 or the image processor 4b in FIG. 16 can be used. In a case where the image processor 4 is provided in an image sensing apparatus, an image signal of a series of chronologically ordered actual low-resolution images obtained by the shooting by the image sensor 1 in FIG. 1 is fed to the image processor 4, and the series of actual low-resolution images is subjected to processing including selection optimization processing and super-resolution processing within the image processor 4. In a case where the image processor 4 is provided in a display apparatus, an image signal of a series of chronologically ordered actual low-resolution images obtained via the demodulator 22 or the interface 23 in FIG. 25 is fed to the image processor 4, and the series of actual low-resolution images is subjected to processing including selection optimization processing and super-resolution processing within the image processor 4.

First Example of Selection Optimization Processing

First, a first example of selection optimization processing will be described. In the first example of selection optimization processing, it is assumed that, out of three actual low-resolution images including a datum frame, two actual low-resolution images including the datum frame are selected. Accordingly, the following description deals with the processing of selecting one consulted frame out of two actual low-resolution images excluding the datum frame. Of the three actual low-resolution images, the one set as the datum frame is identified by the reference sign F1, and the other two are identified by the reference signs F2 and F3.

Figure 26:
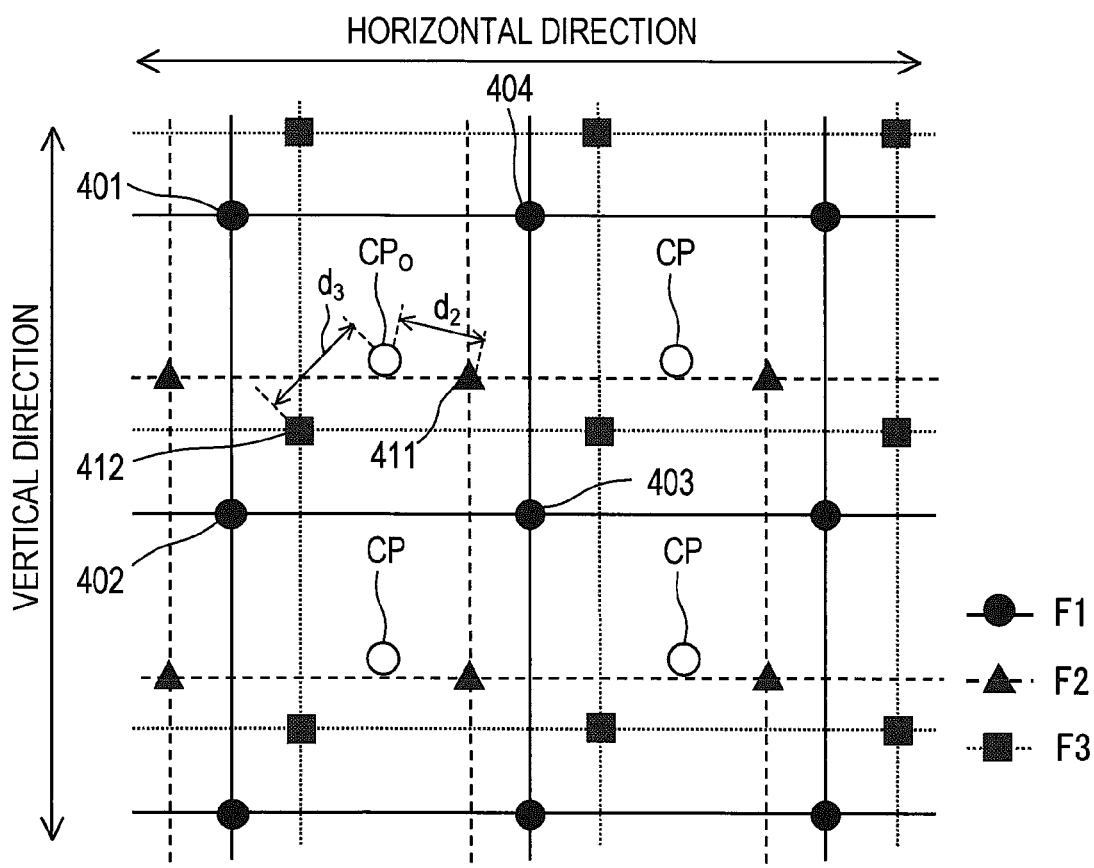
FIG. 26 is a diagram showing a pixel position relationship observed when a first to a third low-resolution images, after correction of their displacements, are arranged in a common coordinate system.

Based on the result of the motion amount calculation by the motion amount calculator 42 shown in FIG. 14, the amount of motion $M_{12}$ between the images F1 and F2 relative to the image F1 and the amount of motion $M_{13}$ between the images F1 and F3 relative to the image F1 are calculated. Based on these amounts of motion $M_{12}$ and $M_{13}$, the displacements of the images F2 and F3 relative to the image F1 are corrected, so that the images F2 and F3 are arranged in a common coordinate system that is the coordinate system of the image F1. FIG. 26 shows the pixel position relationship among the images F1, F2, and F3 after displacement correction.

In FIG. 26 (and in FIGS. 27 to 30 described later), solid black circles represent pixel positions on the image F1 and the pixels located there; solid black triangles represent pixel positions on the image F2 and the pixels located there; solid black squares represent pixel positions on the image F3 and the pixel located there. In FIG. 26 etc., of the pixel positions (and the pixels) of image F1, four are identified by the reference signs 401 to 404; of the pixel positions (and the pixels) of image F2, one is identified by the reference sign 411; and, of the pixel positions (and the pixels) of image F3, one is identified by the reference sign 412. The reference signs 401 to 404, 411, and 412 are used to identify pixel positions or pixels. In FIG. 26 (and in FIGS. 27 to 30 described later), the up/down direction of the drawing is parallel to the vertical direction of the images, and the left/right direction of the drawing is parallel to the horizontal direction of the images.

On the image F1, pixels 401 and 402 are pixels adjacent in the vertical direction, and pixels 403 and 404 are pixels adjacent in the vertical direction. Moreover, on the image F1, pixel 404 is a pixel adjacent, to the right, to pixel 401, and pixel 403 is a pixel adjacent, to the right, to pixel 402. Thus, pixels 401 to 404 form a rectangular region of an image size of 2×2. Within this rectangular region, pixels 411 and 412 are located (in other words, within this rectangular region, the pixel positions 411 and 412 exist). As described previously, on the low-resolution images, the adjacent pixel interval is ΔS in both the horizontal and vertical directions. Assuming that, when the magnitude of the amount of motion $M_{12}$ is zero, the pixel position 402 and the pixel position 411 coincide, if the magnitudes of the vertical and horizontal components of the amount of motion $M_{12}$ are both less than ΔS, the vector starting at the pixel position 411 and ending at the pixel position 402 is a motion vector representing the amount of motion $M_{12}$. The amount of motion $M_{13}$ is explained similarly.

Figure 27:
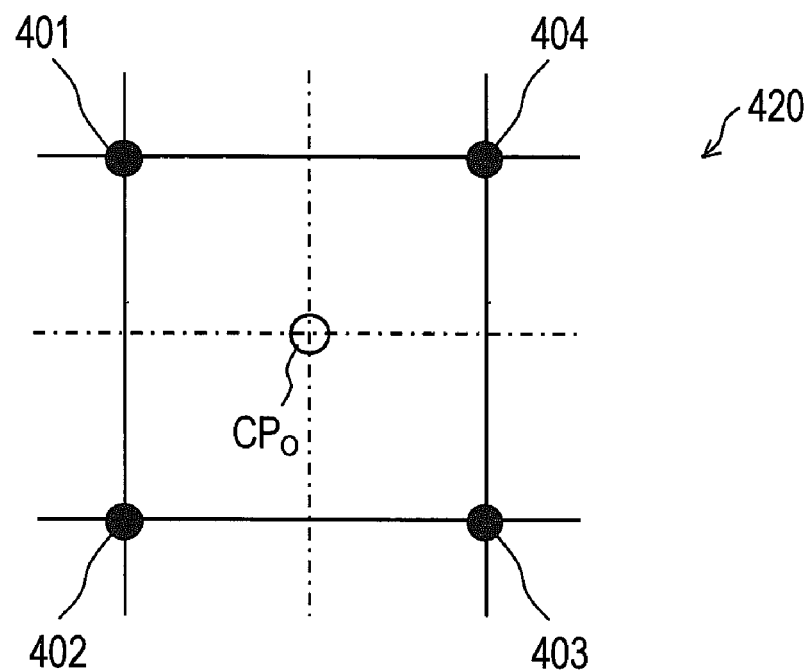
FIG. 27 is a diagram showing the 2×2 pixels on the first low-resolution image in FIG. 26, along with the center position within the rectangular region formed by those 2×2 pixels.

In FIG. 26 (and in FIGS. 27, 29, and 30 described later), hollow circles indicated by the reference sign $CP_O$ or CP each represent the center position of a rectangular region of an image size of 2×2 that connects four pixel positions on the image F1. In the following description, such a rectangular region on the image F1 is called "minimum rectangular region". The center position of the minimum rectangular region formed by pixels 401 to 404 is identified especially by the reference sign $CP_O$. Moreover, as shown in FIG. 27, the minimum rectangular region formed by pixels 401 to 404 is identified especially by the reference sign 420. The center position $CP_O$ is located at the center of the minimum rectangular region 420.

In the first example of selection optimization processing, it is assumed that the resolution enhancement factor by which a high-resolution image is generated from actual low-resolution images is 2 both in the horizontal and vertical directions. Accordingly, when the minimum rectangular region 420 is taken as of interest, the interpolated pixel positions at which to locate interpolated pixels are additionally set at the point halfway between pixel positions 401 and 402, at the point halfway between pixel positions 403 and 404, at the point halfway between pixel positions 401 and 404, at the point halfway between pixel positions 402 and 403, and at the center position $CP_O$. Through super-resolution processing, a high-resolution image is generated that has a pixel at each of those interpolated pixel positions and each of the pixel positions on the image F1.

In the first example of selection optimization processing, the selection datum position, which serves as the datum in the selection of consulted frames, is set at the center position of the minimum rectangular region. Here, the image evaluator 43 in FIG. 14, to select one of the images F2 and F3 as a consulted frame, calculates, in the common coordinate system, the distance $d_2$ between the selection datum position and a pixel of the image F2 and the distance $d_3$ between the selection datum position and a pixel of the image F3. The distances calculated here are the minimum distance between the selection datum position and a pixel of the image F2. Accordingly, as shown in FIG. 26, when the center position $CP_O$ is taken as of interest, the distance $d_2$ is the distance from the center position $CP_O$ to the pixel position 411 in the common coordinate system, and the distance $d_3$ is the distance from the center position $CP_O$ to the pixel position 412 in the common coordinate system.

The image evaluator 43 selects as a consulted frame, whichever of the images F2 and F3 has a pixel closer to the selection datum position. Accordingly, if the distance $d_2$ is shorter than the distance $d_3$, the image F2 is selected as a consulted frame; if the distance $d_3$ is shorter than the distance $d_2$, the image F3 is selected as a consulted frame. Based on the image F1 as the datum frame and the image F2 or F3 as a consulted frame, the previously described super-resolution processing is performed, and a high-resolution image is generated.

Second Example of Selection Optimization Processing

Next, a second example of selection optimization processing will be described. The center position of a minimum rectangular region is one example of an interpolated pixel position at which an interpolated pixel is located. An interpolated pixel position different from the center position of a minimum rectangular region may instead be set as the selection datum position. This will now be described in more detail. Like the description of the first example of selection optimization processing, the following description deals with processing in which the image F1 is set as a datum frame and one of the two images F2 and F3 is selected as a consulted frame. Suppose also that the pixel position relationship among the images F1 to F3 after displacement correction in the common coordinate system is as shown in FIG. 26.

Figure 28:
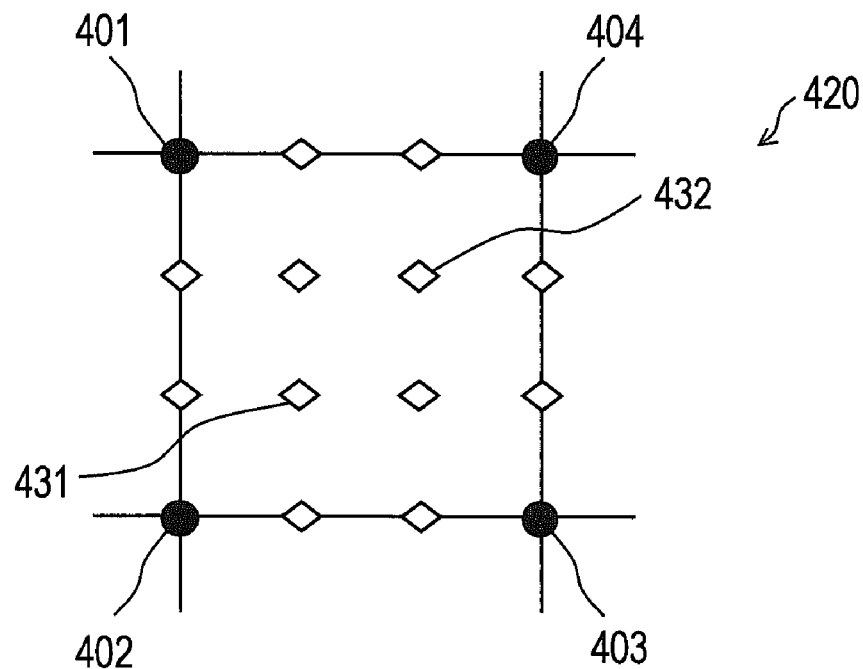
FIG. 28 is a diagram showing the 2×2 pixels on the first low-resolution image in FIG. 26, along with the interpolated pixel positions set within and on the rectangular region formed by those 2×2 pixels (as observed when the resolution enhancement factor is 3 in both the horizontal and vertical directions)

It is in addition assumed that the resolution enhancement factor at which a high-resolution image is generated from actual low-resolution images is 3 in both the horizontal and vertical directions. The interpolated pixel positions set in this case are shown in FIG. 28. In FIG. 28, only those interpolated pixel positions which are to be located within or on the minimum rectangular region 420 are indicated by hollow lozenges. Two interpolated pixel positions are set on each of the line segment connecting the pixel positions 401 and 402, the line segment connecting the pixel positions 402 and 403, the line segment connecting the pixel positions 403 and 404, the line segment connecting the pixel positions 404 and 401, the line segment connecting the pixel positions 401 and 403, and the line segment connecting the pixel positions 402 and 404. On each of these line segments, the two interpolated pixel positions are arranged where they divide the line segment into three equal parts.

Consider now a case where, of the two interpolated pixel positions 431 and 432 on the line segment connecting the pixel positions 402 and 404, the interpolated pixel position 431, which is closer to the pixel position 402 than to the pixel position 404, is the selection datum position to be taken as of interest. In this case, the image evaluator 43 in FIG. 14 calculates, in the common coordinate system, the minimum distance $d_2'$ between the selection datum position and a pixel of the image F2 (i.e. the distance between the interpolated pixel position 431 and the pixel position 411) and the minimum distance $d_3'$ between the selection datum position and a pixel of the image F3 (i.e. the distance between the interpolated pixel position 431 and the pixel position 412). Then, if the distance $d_2'$ is shorter than the distance $d_3'$, the image F2 is selected as a consulted frame; if the distance $d_3'$ is shorter than the distance $d_2'$, the image F3 is selected as a consulted frame.

If the distances $d_2'$ and $d_3'$ are equal, the previously mentioned distances $d_2$ and $d_3$ may be found so that, as described in connection with the first example of selection optimization processing, the consulted frame is selected base on the distances $d_2$ and $d_3$. Here, the concept that the two distances are equal may be taken as including the concept that the two distances are substantially equal. Accordingly, for example, in a case where the difference between the distances $d_2'$ and $d_3'$ is equal to or less than a predetermined threshold value $d_{LL}$, it may be judged that the distances $d_2'$ and $d_3'$ are substantially equal so that the consulted frame is selected based on the distances $d_2$ and $d_3$. Specifically, if $|d_2'-d_3'| \leq d_{LL}$ holds, the distances $d_2$ and $d_3$ may be compared so that, if $d_2 < d_3$ holds, the image F2 is selected as a consulted frame and, if $d_2 > d_3$ holds, the image F3 is selected as a consulted frame. The threshold value $d_{LL}$ is a threshold value for checking whether two distances, the magnitude relationship between which is to be determined, are substantially equal or not, and is set to be, for example, about one-eighth of the adjacent pixel interval $\Delta S$ of the actual low-resolution images. The threshold value $d_{LL}$ may be determined according to the accuracy of the detection of amounts of motion.

For the sake of simplicity, in the above description, as consulted frame candidates, only two images F2 and F3 are taken as of interest; what has been described above in connection with the second example of selection optimization processing, however, is particularly useful in cases where two or more consulted frames are selected. Specifically, for example, it is useful in a case where an image F1 is set as a datum frame and, out of images F2 to F4, two consulted frames are selected. Here, it is assumed that the image F4 is an actual low-resolution image different from the images F1 to F3, and that, because the minimum distance between a pixel position on the image F4 and the interpolated pixel position 432 in FIG. 28 is shorter than those with respect to the images F2 and F3, the image F4 is selected as one consulted frame. In this case, to select another consulted frame, the above-mentioned selection operation based on the distances $d_2'$ and $d_3'$, or selection operation based on the distances $d_2'$, $d_3'$, $d_2$, and $d_3$, is executed.

Third Example of Selection Optimization Processing

Next, a third example of selection optimization processing will be described. In the third example of selection optimization processing, unless inconsistent, any explanation given in connection with the first example of selection optimization processing applies. Accordingly, the resolution enhancement factor by which a high-resolution image is generated from actual low-resolution images is 2 in both the horizontal and vertical directions, and the pixel position relationship among the images F1 to F3 after displacement correction is as shown in FIG. 26. Moreover, the image F1 is set as a datum frame, and one of the two images F2 and F3 is selected as a consulted frame.

Figure 29:
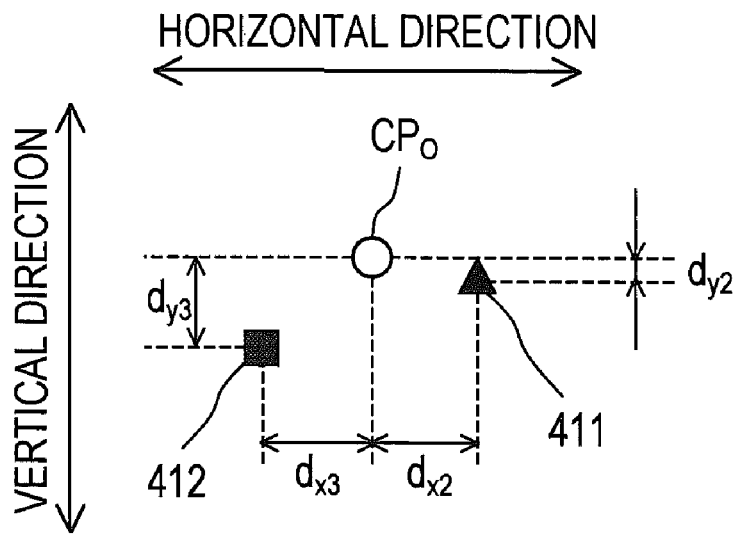
FIG. 29 is a diagram showing the relationship between the center position in FIG. 27 and the pixel positions on the second and third low-resolution images.

In the selection here, first, the distances $d_2$ and $d_3$ are calculated and their magnitude relationship is evaluated. In the third example of selection optimization processing, it is assumed that these distances $d_2$ and $d_3$ are equal. Here, as shown in FIG. 29 (see also FIG. 26), it is assumed that the pixel position 411 on the image F2 is located at a position away from the center position $CP_O$ as the selection datum position by distances of $d_{x2}$ and $d_{y2}$ in the horizontal and vertical directions respectively, and that the pixel position 412 on the image F3 is located at a position away from the center position $CP_O$ as the selection datum position by distances of $d_{x3}$ and $d_{y3}$ in the horizontal and vertical directions respectively. Thus $d_2 = ((d_{x2})^2 + (d_{y2})^2)^{1/2}$ and $d_3 = ((d_{x3})^2 + (d_{y3})^2)^{1/2}$. Naturally, representing distances, $d_{x2}$, $d_{y2}$, $d_{x3}$ and $d_{y3}$ all have positive values.

When the distances $d_2$ and $d_3$ are equal, if a consulted frame is selected based solely on the magnitude relationship between the distances $d_2$ and $d_3$, either the image F2 or the image F3 may be selected as a consulted frame. In the third example of selection optimization processing, when the distances $d_2$ and $d_3$ are equal, to permit only one of the images F2 and F3 to be selected, the distances $d_{y2}$, and $d_{y3}$ in the vertical direction are consulted. Specifically, if the distance $d_{y2}$ is shorter than the distance $d_{y3}$, the image F2 is selected as a consulted frame and, if the distance $d_{y3}$ is shorter than the distance $d_{y2}$, the image F3 is selected as a consulted frame. In the example corresponding to FIG. 29, $d_{y2} < d_{y3}$, and hence the image F2 is selected as a consulted frame.

The human eye exhibits higher visual performance in the vertical direction than in the horizontal direction. This visual characteristic is exploited to select as consulted frames such actual low-resolution images as are fit for the enhancement of the resolution as perceived in the vertical direction, and this is achieved by the selection processing described above. Specifically, when a plurality of distances (including $d_2$ and $d_3$) found for a plurality of actual low-resolution images relative to the selection datum position are equal, an actual low-resolution image having a pixel position whose distance from the selection datum position in the vertical direction is relatively short is with higher preference selected as a consulted frame.

Moreover, it is assumed that, when a low-resolution image or high-resolution image is displayed on the display portion 9 (or on a display apparatus other than the display portion 9), the vertical direction of the image coincides with the vertical direction (up/down direction) of the display screen.

As mentioned in the description of the second example of selection optimization processing, the concept that the two distances are equal may be taken as including the concept that the two distances are substantially equal. Accordingly, for example, in a case where the difference between the distances $d_2$ and $d_3$ is equal to or less than a predetermined threshold value $d_{LL}$, it may be judged that the distances $d_2$ and $d_3$ are substantially equal. Specifically, if $|d_2 - d_3| \leq d_{LL}$ holds, the distances $d_{y2}$ and $d_{y3}$ may be compared so that, if $d_{y2} < d_{y3}$ holds, the image F2 is selected as a consulted frame and, if $d_{y2} > d_{y3}$ holds, the image F3 is selected as a consulted frame.

Fourth Example of Selection Optimization Processing

Next, a fourth example of selection optimization processing will be described. In the fourth example of selection optimization processing, unless inconsistent, any explanation given in connection with the first example of selection optimization processing applies. Accordingly, the resolution enhancement factor by which a high-resolution image is generated from actual low-resolution images is 2 in both the horizontal and vertical directions, and the pixel position relationship among the images F1 to F3 after displacement correction is as shown in FIG. 26. Moreover, the image F1 is set as a datum frame, and one of the two images F2 and F3 is selected as a consulted frame.

Figure 30:
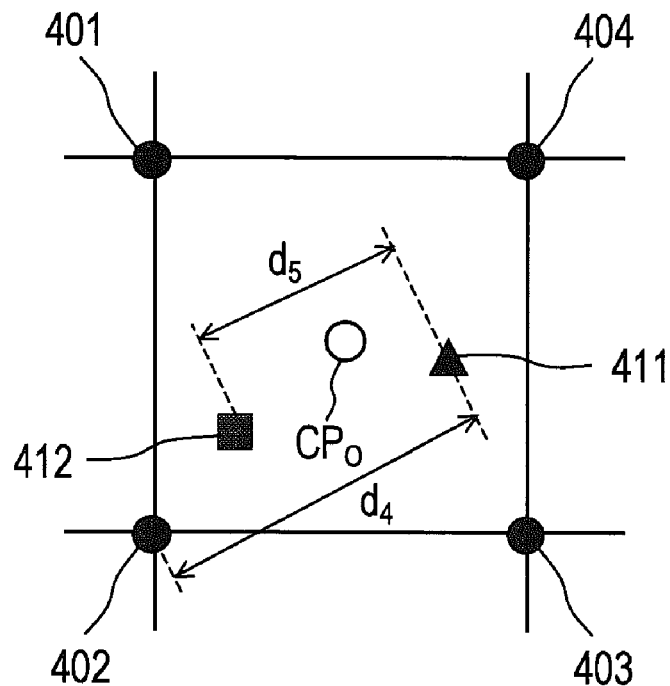
FIG. 30 is a diagram showing the relationship between the center position in FIG. 27 and the pixel positions on the first to third low-resolution images

In the selection here, first, the distances $d_2$ and $d_3$ are calculated and their magnitude relationship is evaluated. As in the third example of selection optimization processing, also in the fourth example of selection optimization processing, it is assumed that those distances $d_2$ and $d_3$ are equal. Moreover, it is also assumed that, on the time axis, the images F1, F2, and F3 are acquired in this order. As shown in FIG. 30, in the common coordinate system, the distance between pixels 402 and 411 and the distance between pixels 411 and 412 are represented by $d_4$ and $d_5$ respectively (see also FIG. 26).

The images F1 and F2 are mutually adjacent frames, and the images F2 and F3 are mutually adjacent frames. Thus, the amount of motion corresponding to the distance $d_4$ and the amount of motion corresponding to the distance $d_5$ are each the amount of motion between adjacent frames. Such an amount of motion is calculated by the motion amount calculator 42 in FIG. 14. The distance $d_4$ corresponds to the magnitude of the amount of motion (the magnitude of the motion vector) between the images F1 and F2, and the distance $d_5$ corresponds to the magnitude of the amount of motion (the magnitude of the motion vector) between the images F2 and F3. It is to be noted that, in this example, it is assumed that the horizontal and vertical components of the amount of motion between adjacent frames are both less than $\Delta S$.

When the distances $d_2$ and $d_3$ are equal, if a consulted frame is selected based solely on the magnitude relationship between the distances $d_2$ and $d_3$, either the image F2 or the image F3 may be selected as a consulted frame. In the fourth example of selection optimization processing, when the distances $d_2$ and $d_3$ are equal, to permit only one of the images F2 and F3 to be selected, the amounts of motion between frames are consulted. Specifically, if the distance $d_4$ is shorter than the distance $d_5$, the image F2 is selected as a consulted frame and, if the distance $d_5$ is shorter than the distance $d_4$, the image F3 is selected as a consulted frame. In the example corresponding to FIG. 30, $d_4 > d_5$, and hence the image F3 is selected as a consulted frame.

As described above, when a plurality of distances (including $d_2$ and $d_3$) found for a plurality of actual low-resolution images relative to the selection datum position are equal, an actual low-resolution image corresponding to a relatively small amount of motion between adjacent frames is with higher preference selected as a consulted frame. That is, a frame containing a relatively small amount of motion relative to the preceding frame is with higher preference selected as a consulted frame. Thus, an actual low-resolution image is selected that is less affected by image motion between adjacent frames, and this helps enhance the resolution as perceived in the high-resolution image generated by super-resolution processing.

As mentioned in the description of the second example of selection optimization processing, the concept that the two distances are equal may be taken as including the concept that the two distances are substantially equal. Accordingly, for example, in a case where the difference between the distances $d_2$ and $d_3$ is equal to or less than a predetermined threshold value $d_{LL}$, it may be judged that the distances $d_2$ and $d_3$ are substantially equal. Specifically, if $|d_2-d_3| \leq d_{LL}$ holds, the distances $d_4$ and $d_5$ may be compared so that, if $d_4<d_5$ holds, the image F2 is selected as a consulted frame and, if $d_4>d_5$ holds, the image F3 is selected as a consulted frame.

As processing that is executed when a plurality of distances (including $d_2$ and $d_3$) found for a plurality of actual low-resolution images relative to the selection datum position are equal, the third and fourth selection optimization processing has been described separately. It is also possible to configure the image processor 4 so that the processing it executes can be switched between the two examples of processing.

Fifth Example of Selection Optimization Processing

Next, a fifth example of selection optimization processing will be described. In the fifth example of selection optimization processing, it is assumed that the resolution enhancement factor by which a high-resolution image is generated from actual low-resolution images is $m_H$ in the horizontal direction and $m_V$ in the vertical direction, where $m_H \neq m_V$. For the sake of concreteness, the following description deals with a case where $m_H>m_V$ (for example, $m_H=3$ and $m_V=2$). Except that the resolution enhancement factor differs between in the horizontal and vertical directions, any explanation given in connection with the first example of selection optimization processing applies equally to the fifth example of selection optimization processing. Accordingly, the positional relationship of the images F1 to F3 after displacement correction is as shown in FIG. 26. Moreover, it is assumed that the image F1 is set as a datum frame, and one of the two images F2 and F3 is selected as a consulted frame.

In the fifth example of selection optimization processing, the selection datum position as the datum for the selection of a consulted frame is set at the center position of a minimum rectangular region; alternatively, it is set at an interpolated pixel position added when a high-resolution image is generated from actual low-resolution images. Suppose now that the selection datum position is set at the center position of a minimum rectangular region. In the fifth example of selection optimization processing, of the horizontal and vertical directions, the one in which the resolution enhancement factor is higher is taken as of interest, and in the direction of interest, the distance between a pixel position on the image F2 and the selection datum position is compared with the distance between a pixel position on the image F3 and the selection datum position. In this example, since $m_H>m_V$, the horizontal direction is taken as of interest. Thus the distance $d_{x2}$ between a pixel position on the image F2 and the selection datum position is compared with the distance $d_{x3}$ between a pixel position on the image F3 and the selection datum position (see FIG. 29). If $d_{x2}<d_{x3}$, the image F2 is selected as a consulted frame; if $d_{x2}>d_{x3}$, the image F3 is selected as a consulted frame.

The selection processing based on the distances $d_{x2}$ and $d_{x3}$ may be executed only when the distances $d_2$ and $d_3$ are equal (or substantially equal). Specifically, first, according to the method described in connection with the first example of selection optimization processing, an attempt is made to select a consulted frame based on the magnitude relationship between the distances $d_2$ and $d_3$. Here, if $|d_2-d_3| \leq d_{LL}$ holds, it may be judged that the distances $d_2$ and $d_3$ are equal (or substantially equal) so that the selection processing based on the distances $d_{x2}$ and $d_{x3}$ is performed. Specifically, if $|d_2-d_3| \leq d_{LL}$ and $d_{x2}<d_{x3}$ hold, the image F2 is selected as a consulted frame; if $|d_2-d_3| \leq d_{LL}$ and $d_{x2}>d_{x3}$ hold, the image F3 is selected as a consulted frame.

Second Embodiment

Next, a second embodiment of the invention will be described. Like the first embodiment, the second embodiment also mainly deals with, as examples of electronic appliances provided with an image processing apparatus that performs image processing according to the invention, image sensing apparatuses such as digital still cameras and digital video cameras. The overall block diagram showing the internal configuration of an image sensing apparatus according to the second embodiment is the same as that shown in FIG. 1, and the image sensing apparatus according to the second embodiment includes parts identified by the reference signs 1 to 17 and 20. Accordingly, no separate block diagram will be additionally given of the image sensing apparatus according to the second embodiment. In the second embodiment, the functions and configuration of the individual parts of the image sensing apparatus are, unless otherwise stated, the same as those described in connection with the first embodiment.

The definitions of various terms used in the description of the first embodiment apply, unless otherwise stated, equally to the second embodiment, and also to the third embodiment described later. Such terms include, among others:
frame image (or frame);
low-resolution image; actual low-resolution image; estimated low-resolution image; high-resolution image;
amount of motion; common coordinate system;
datum frame; consulted frame; and selection optimization processing.

Anyway, unless inconsistent, any explanation given in connection with the first embodiment applies equally to the second embodiment, and also to the third embodiment described later.

The image processor 4 provided in the image sensing apparatus according to the second embodiment also is configured to be capable of performing super-resolution processing, and the basic concept of the super-resolution processing according to the second embodiment is the same as that which has been described above with reference to FIGS. 2, 3, 4A to 4D, and 5A to 5D. For super-resolution processing, the image processor 4 uses the ML method, the MAP method, the POCS method, the IBP method, or the like. The following description assumes the use of the MAP method.

When super-resolution processing is performed, a series of actual low-resolution images to be used for the estimation of a high-resolution image is obtained from the image sensor 1. This series of actual low-resolution images may contain a plurality of actual low-resolution images that can be regarded as substantially identical in terms of their relationship with an actual low-resolution image to be taken as the datum frame. Feeding such a plurality of actual low-resolution images intact as a plurality of consulted frames to the super-resolution calculator results in little effect on the calculation load. Specifically, when a comparison is made between processing in which a plurality of actual low-resolution images that can be regarded as substantially identical in terms of their relationship with an actual low-resolution image to be taken as the datum frame are fed intact as a plurality of consulted frames to the super-resolution calculator and processing in which only one of that plurality of actual low-resolution images is fed as an consulted frame to the super-resolution calculator, although the results the two processing yield are almost the same, the calculation load of the former is heavier than that of the latter, and the time the former processing takes is longer than that the latter processing takes. Moreover, when a plurality of actual low-resolution images can be regarded as substantially identical in terms of their relationship with an actual low-resolution image to be taken as the datum frame, they can be merged together at the stage preceding the super-resolution calculator, and such merging is expected to improve the signal-to-noise ratio (hereinafter also called "S/N ratio") of the images.

Out of these considerations, the image processor 4 in the second embodiment has the function of, by use of image merging processing, generating a low-resolution image for super-resolution processing. This function makes it possible to generate a satisfactory high-resolution image, and helps reduce the calculation load for super-resolution processing and increase the acquisition speed of the high-resolution image.

In reconstruction-based super-resolution processing as exemplified by the MAP method, after an initial high-resolution image is generated, calculation processing (super-resolution calculation processing) including the calculation of the amount of renewal and the renewal of the high-resolution image by use of the amount of renewal is executed repeatedly. The repeated execution of this calculation processing, however, is not essential. The super-resolution processing in this embodiment may be any other than reconstruction-based super-resolution processing. Specifically, it is also possible to generate an initial high-resolution image from a plurality of low-resolution images and take that initial high-resolution image, without ever renewing it, as the ultimately obtained high-resolution image.

Below will be described a first to a fifth example of configuration/processing, as specific examples of configuration and processing according to this embodiment, or examples of configuration/processing illustrating the technical features related to them. Unless inconsistent, any explanation given in connection with one example of configuration/processing applies equally to any other; moreover, unless inconsistent, different examples of configuration/processing may be performed in combination. The following description of different examples of configuration/processing is focused on the configuration and operation related to super-resolution processing. Since the operations for shooting a moving image, shooting a still image, reproducing a moving image, and reproducing a still image are the same as those described in connection with the first embodiment, no detailed description of these will be repeated in the following description of different examples of configuration/processing.

First Example of Configuration/Processing

Figure 31:
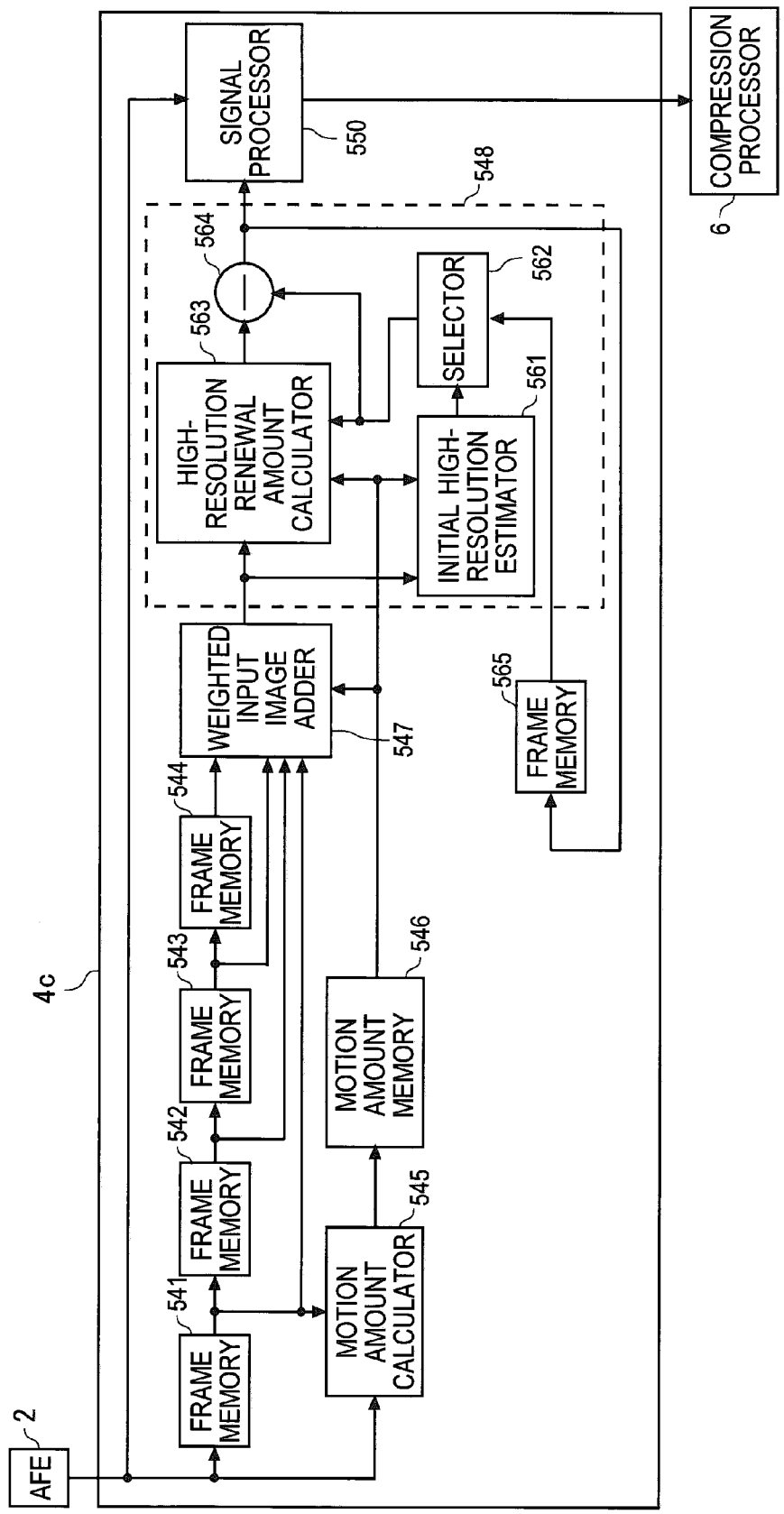
FIG. 31 is a block diagram of part of an image sensing apparatus, including an internal block diagram of the image processor in FIG. 1, according to a second embodiment of the invention.

A first example of configuration/processing according to the second embodiment will now be described. FIG. 31 is a block diagram of part of the image sensing apparatus of FIG. 1, including an internal block diagram of an image processor 4c used as the image processor 4 in FIG. 1. In the first example of configuration/processing, and also in the second to fifth examples of configuration/processing described later, unless otherwise stated, it is assumed that actual low-resolution images equivalent to four frames, i.e. four actual low-resolution images, are temporarily stored, and these four actual low-resolution images are subjected to calculation processing to generate a high-resolution image. These four actual low-resolution images are identified by the reference signs Fa, Fb, Fc, and Fd. Of these images, the image Fd is shot first, and after the shooting of the image Fd, the images Fc, Fb, and Fa are shot in this order.

The image processor 4c includes parts identified by the reference signs 541 to 548, 550, and 565. In the example shown in FIG. 31, a frame memory 565 is provided outside a super-resolution calculator 548; instead, the frame memory 565 may be provided within the super-resolution calculator 548 (this applies equally to all the other examples of configuration/processing described later).

A frame memory 541 temporarily stores an image signal of a actual low-resolution image equivalent to one frame which is represented by the digital signal from the AFE 2. A frame memory 542 temporarily stores the actual low-resolution image equivalent to one frame which is stored in the frame memory 541. A frame memory 543 temporarily stores the actual low-resolution image equivalent to one frame which is stored in the frame memory 542. A frame memory 544 temporarily stores the actual low-resolution image equivalent to one frame which is stored in the frame memory 543. The contents stored in the frame memory 541 are transferred, every time the period of one frame passes, to the frame memory 542, then to the frame memory 543, and then to the frame memory 544. As a result, at the time that the shooting of the image Fa is complete, the actual low-resolution images Fa, Fb, Fc, and Fd are stored in the frame memories 541, 542, 543, and 544, respectively.

A motion amount calculator 545 receives from the AFE 2 the image signal representing the actual low-resolution image of the current frame, receives from the frame memory 541 the image signal representing the actual low-resolution image one frame before the current frame, and calculates the amount of motion between those two images. The current frame denotes the frame that is currently being obtained from the AFE 2. Based on the amount of motion calculated by the motion amount calculator 545, a motion amount memory 546 stores the amounts of motion between adjacent frames with respect to the actual low-resolution images equivalent to four frames stored in the frame memories 541 to 544. Based on the amounts of motion stored in the motion amount memory 546, a weighted input image adder 547 (hereinafter abbreviated to "weighted adder 547") merges together the actual low-resolution images equivalent to a plurality of frames among the actual low-resolution images equivalent to four frames stored in the frame memories 541 to 544. As will be described in detail later, the merging here employs weighted addition, and is executed only when a particular condition is fulfilled.

The super-resolution calculator 548 performs super-resolution processing on the plurality of low-resolution images obtained via the weighted adder 547 to generate a high-resolution image. The frame memory 565 temporarily stores the high-resolution image obtained by the super-resolution calculator 548, and then feeds it back to the super-resolution calculator 548. From the image signal representing the high-resolution image obtained by the super-resolution processing by the super-resolution calculator 548, or from the image signal fed directly from the AFE 2, a signal processor 550 generates luminance and color-difference signals.

The super-resolution calculator 548 includes parts identified by the reference signs 561 to 564. An initial high-resolution estimator 561 (hereinafter abbreviated to "estimator 561") estimates a high-resolution image as an initial high-resolution image from the plurality of low-resolution images from the weighted adder 547. A selector 562 selects one of the high-resolution image estimated by the estimator 561 and the high-resolution image temporarily stored in the frame memory 565, and feeds the selected one to the succeeding stage. A high-resolution renewal amount calculator 563 (hereinafter abbreviated to "renewal amount calculator 563") finds the amount of renewal for the high-resolution image based on the high-resolution image selected by the selector 562 and the plurality of low-resolution images. A subtracter 564 subtracts the amount of renewal found by the renewal amount calculator 563 from the high-resolution image selected by the selector 562. This subtraction causes the high-resolution image generated by the subtracter 564 to be stored in the frame memory 565. The selector 562 selects, at the first execution of the selection operation, the initial high-resolution image estimated by the estimator 561 and, at the second and following execution of the selection operation, the high-resolution image temporarily stored in the frame memory 565.

As described above, the motion amount calculator 545 receives from the AFE 2 the image signal representing the actual low-resolution image of the current frame, receives from the frame memory 541 the image signal representing the actual low-resolution image one frame before the current frame, and calculates the amount of motion that represents the displacement between those two images. The calculated amount of motion is a two-dimensional quantity (in other words, a quantity having magnitude and direction) containing horizontal and vertical components, and is what is generally called "motion vector", or "displacement vector". Accordingly, an amount of motion may be read as a motion vector or displacement vector.

The processing by which the motion amount calculator 545 calculates an amount of motion is the same as that by which the motion amount calculator 42 (see FIG. 14) does so in the first embodiment, and therefore no description of this calculation processing will be repeated. The calculated mount of motion has a so-called subpixel resolution, a resolution higher than the pixel interval of the actual low-resolution images. One amount of motion after another is detected between every two temporally adjacent actual low-resolution images (i.e. between every two adjacent frames), and, of the two actual low-resolution images involved at a given time, one is handled as a datum image and the other as a non-datum image.

Figure 32A:
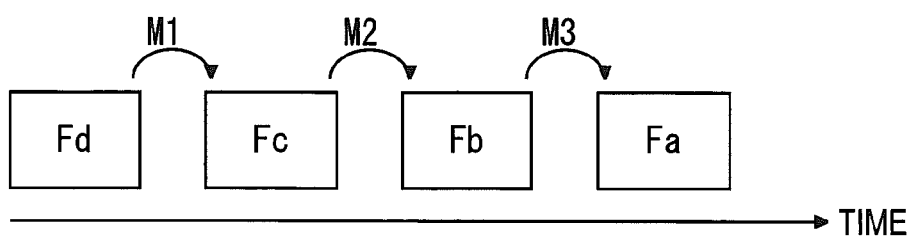
FIG. 32A is a diagram showing amounts of motion between consecutive frames.

In the example under discussion, the images Fd, Fc, Fb, and Fa are obtained in this order. Thus the motion amount calculator 545 calculates, as shown in FIG. 32A, the amount of motion M1 between the images Fd and Fc, the amount of motion M2 between the images Fc and Fb, and the amount of motion M3 between the images Fb and Fa, and these amounts of motion M1 to M3 are stored in the motion amount memory 546. The amounts of motion M1, M2, and M3 are amounts of motion relative to the images Fd, Fc, and Fb, respectively, taken as the datum image. Instead, the amounts of motion M1, M2, and M3 may be calculated relative to the images Fc, Fb, and Fa, respectively, taken as the datum image.

Operation of Weighted Adder

The operation of the weighted adder 547 will now be described. The weighted adder 547 receives the amounts of motion M1 to M3 stored in the motion amount memory 546.

Figure 32B:
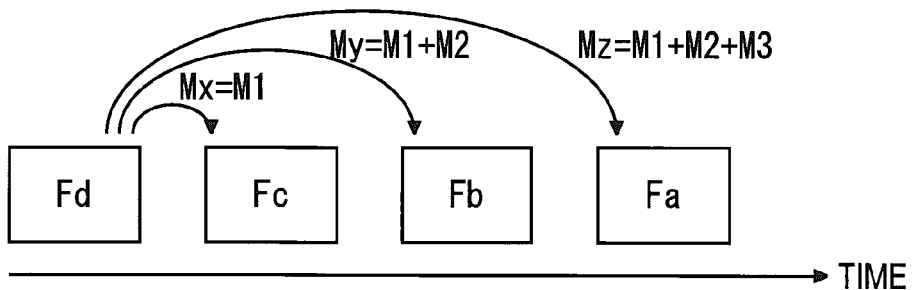
FIG. 32B is a diagram showing amounts of motion calculated for a plurality of low-resolution images relative to a single low-resolution image as a datum.

Based on the amounts of motion M1 to M3, the weighted adder 547 calculates, taking as the datum image the image Fd stored in the frame memory 544, the amount of motion Mx between images Fd and Fc, the amount of motion My between images Fd and Fb, and the amount of motion Mz between images Fd and Fa. FIG. 32B is a conceptual diagram of the amounts of motion Mx, My, and Mz. The amount of motion Mx is the amount of motion M1 itself. The amount of motion My is the sum of the amounts of motion M1 and M2. The amount of motion Mz is the sum of the amounts of motion M1 to M3. That is, the motion vector as the amount of motion My is the composite vector of the motion vector as the amount of motion M1 and the motion vector as the amount of motion M2; and the motion vector as the amount of motion Mz is the composite vector of the motion vector as the amount of motion M1, the motion vector as the amount of motion M2, and the motion vector as the amount of motion M3.

Based on the amounts of motion Mx, My, and Mz, the weighted adder 547 selects any two or more actual low-resolution images to be merged together by weighted addition. Specifically, for example, it is checked whether or not any of the amounts of motion Mx, My, and Mz is equal to any other, and selects any two or more actual low-resolution images that correspond to an equal amount of motion as those to be merged together by weighted addition. Below will be described the operation of the weighted adder 547 separately in case 1 to case 4.

Figure 33C:
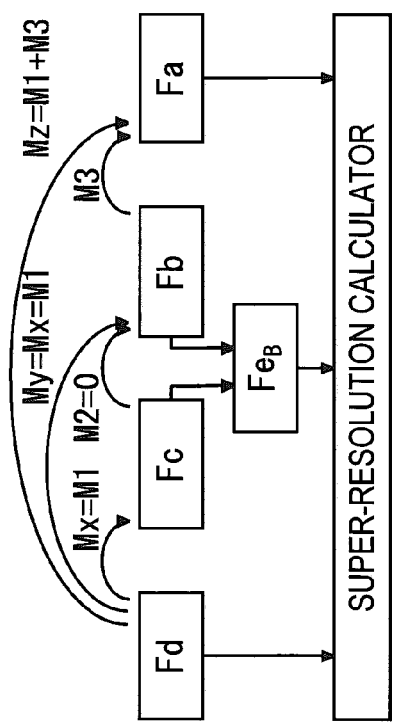
FIGS. 33A to 33D are diagrams illustrating processing performed by the weighted input image adder in FIG. 31.
Figure 33D:
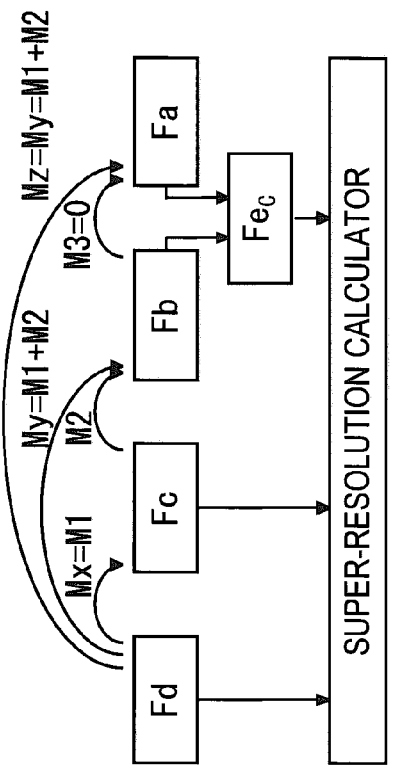
Figure 33A:
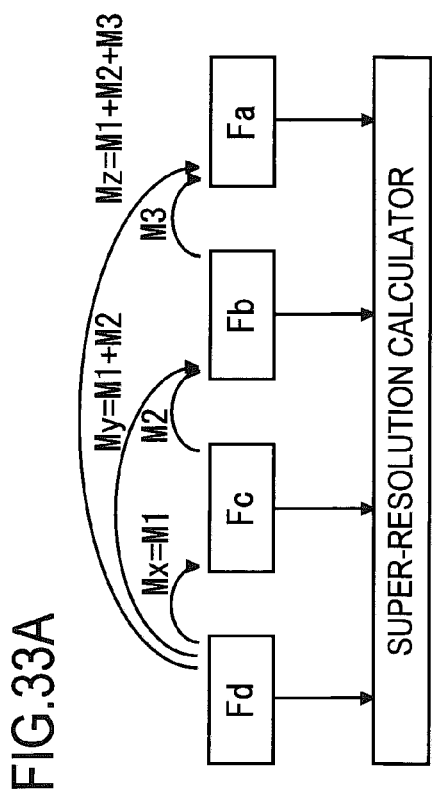

Case 1—When Mx≠My and My≠Mz: The operation in case 1 is as follows. As shown in FIG. 33A, in case 1, the magnitude of none of the amounts of motion M1 to M3 between adjacent frames is zero; thus, the amount of motion Mx differs from the amount of motion My, and the amount of motion My differs from the amount of motion Mz. In this case, as shown in FIG. 33A, the weighted adder 547 feeds the images Fa to Fd from the frame memories 541 to 544 intact to the super-resolution calculator 548. That is, in this case, the weighted adder 547 does not perform image merging, and thus the super-resolution calculator 548 performs super-resolution processing by using the four images Fa to Fd.

Figure 33B:
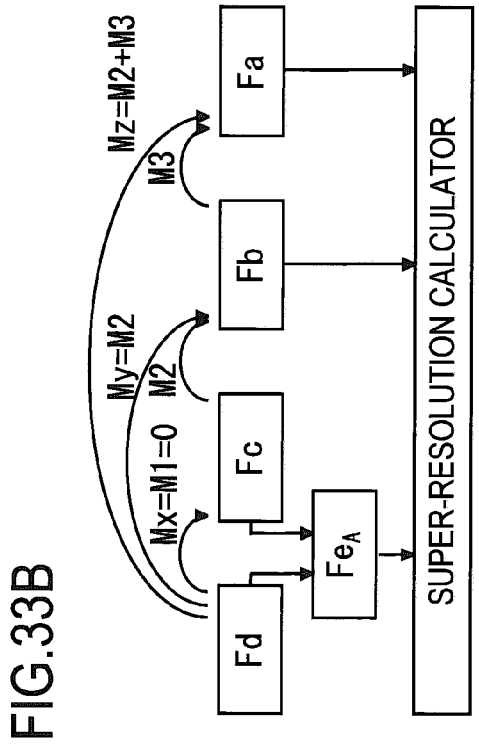

Case 2—When the magnitude of the amount of motion Mx is zero: The operation in case 2 is as follows. As shown in FIG. 33B, in case 2, the magnitude of the amount of motion Mx is zero; in other words, the magnitude of the amount of motion M1 is zero. Moreover, in case 2, the magnitudes of the amounts of motion M2 and M3 are not zero, though the magnitudes of the amounts of motion M2 and M3 may be zero. In case 2, the images Fc and Fd can be regarded as identical, and thus, as shown in FIG. 33B, the weighted adder 547 merges together the images Fc and Fd by weighted addition, and thereby generates a low-resolution image $Fe_A$ equivalent to one frame, which corresponds to the composite image of the images Fc and Fd. Then the weighted adder 547 feeds the images Fa, Fb, and $Fe_A$ to the super-resolution calculator 548, which then performs super-resolution processing by using the three images Fa, Fb, and $Fe_A$.

The image $Fe_A$ is an image obtained by merging together a plurality of actual low-resolution images, and is not a low-resolution image obtained by actual shooting. In the following description, however, the image $Fe_A$ (and also $Fe_B$, $Fe_C$, and Fe mentioned later) is sometimes referred to as an actual low-resolution image.

The image $Fe_A$ is generated in the following manner. For example, the pixel values of the pixels forming the image Fd are multiplied by a weight coefficient $k_W$ (where $0<k_W<1$), the pixel values of the pixels forming the image Fc are multiplied by a weight coefficient $(1-k_W)$, and the thus multiplied pixel values of the images Fc and Fd are added up to generate the image $Fe_A$. That is, when the pixel values of the pixels at coordinates (x, y) on the images Fc, Fd, and $Fe_A$ are represented by $PV_c(x, y)$, $PV_d(x, y)$, and $PV_e(x, y)$ respectively, the pixel values of the image $Fe_A$ are found according to the formula "$PV_e(x, y)=(1-k_W) \cdot PV_c(x, y)+k_W \cdot PV_d(x, y)$". The pixels at coordinates (x, y) on the images Fc, Fd, and $Fe_A$ are pixels located at an identical pixel position. The value of $k_W$ may be set previously: $k_W$ can be set at 0.5, and, with consideration given to the fact that the amounts of motion Mx, My, and Mz are calculated with the image Fd taken as the datum image, the weight coefficient $k_W$ for the image Fd may be set greater than the weight coefficient $(1-k_W)$.

In the example described above, a single weight coefficient $k_W$ is set for all the pixels of the image Fd and a single weight coefficient $(1-k_W)$ is set for all the pixels of the image Fc. Instead, different weight coefficients may be set for different pixels of the images Fd and Fc.

Case 3—When the amounts of motion Mx and My are equal: The operation in case 3 is as follows. As shown in FIG. 33C, in case 3, the magnitude of the amount of motion M2 is zero, and this makes the amounts of motion Mx and My equal. Moreover, in case 3, the magnitudes of the amounts of motion M1 and M3 are not zero, though the magnitudes of the amounts of motion M1 and M3 may be zero. Since the magnitude of the amount of motion M2 is zero, the images Fb and Fc can be regarded as identical. Thus, as shown in FIG. 33C, the weighted adder 547 merges together the images Fb and Fc by weighted addition, and thereby generates a low-resolution image $Fe_B$ equivalent to one frame, which corresponds to the composite image of the images Fb and Fc. The weighted adder 547 then feeds the images Fa, Fd, and $Fe_B$ to the super-resolution calculator 548, which then performs super-resolution processing by using the three images Fa, Fd, and $Fe_B$. The method by which the image $Fe_B$ is generated from the images Fb and Fc is similar to that described above by which the image $Fe_A$ is generated from the images Fc to Fd.

Case 4—When the amounts of motion My and Mz are equal: The operation in case 4 is as follows. As shown in FIG. 33D, in case 4, the magnitude of the amount of motion M3 is zero, and this makes the amounts of motion My and Mz equal. Moreover, in case 4, the magnitudes of the amounts of motion M1 and M2 are not zero, though the magnitudes of the amounts of motion M1 and M2 may be zero. Since the magnitude of the amount of motion M3 is zero, the images Fa and Fb can be regarded as identical. Thus, as shown in FIG. 33D, the weighted adder 547 merges together the images Fa and Fb by weighted addition, and thereby generates a low-resolution image $Fe_C$ equivalent to one frame, which corresponds to the composite image of the images Fa and Fb. The weighted adder 547 then feeds the images Fc, Fd, and $Fe_C$ to the super-resolution calculator 548, which then performs super-resolution processing by using the three images Fc, Fd, and $Fe_C$. The method by which the image $Fe_C$ is generated from the images Fa and Fb is similar to that described above by which the image $Fe_A$ is generated from the images Fc to Fd.

A zero in an amount of motion can be interpreted as a substantial zero, and the concept that a given amount of motion is equal to another amount of motion can be taken as including the concept that they are substantially equal.

Accordingly, when the magnitude of the amount of motion Mx is equal to or less than a predetermined threshold value $M_{TH1}$, it may be judged that the magnitude of the amount of motion Mx is substantially zero so that the operation in case 2 is performed. Specifically, when the magnitude of the amount of motion Mx is equal to or less than the predetermined threshold value $M_{TH1}$, an image $Fe_A$ may be generated from the images Fc and Fd so that the three images Fa, Fb, and $Fe_A$ are fed to the super-resolution calculator 548.

When, relative to a datum image, the amount of motion of a first image and the amount of motion of a second image are substantially equal, it means that the difference between the horizontal component of the amount of motion of the former and the horizontal component of the amount of motion of the latter and the difference between the vertical component of the amount of motion of the former and the vertical component of the amount of motion of the latter are both equal to or less than a predetermined threshold value $M_{TH2}$; or it means that the magnitude of the differential vector between the motion vector as the amount of motion of the former and the motion vector as the amount of motion of the latter is equal to or less than a predetermined threshold value $M_{TH3}$. Here, the datum image is the one relative to which the amounts of motion Mx, My, and Mz are found, and is therefore, in this example, the image Fd.

Accordingly, when a comparison between the amounts of motion Mx and My shows that the difference between the horizontal component of the amount of motion Mx and the horizontal component of the amount of motion My and the difference between the vertical component of the amount of motion Mx and the vertical component of the amount of motion My are both equal to or less than the predetermined threshold value $M_{TH2}$, or that the magnitude of the differential vector between the motion vector as the amount of motion Mx and the motion vector as the amount of motion My is equal to or less than the predetermined threshold value $M_{TH3}$, it may be judged that the amounts of motion Mx and My are substantially equal so that the operation in case 3 is performed (specifically, an image $Fe_B$ is generated from the images Fb and Fc, and the three images Fa, Fd, and $Fe_B$ are fed to the super-resolution calculator 548).

Likewise, when a comparison between the amounts of motion My and Mz shows that the difference between the horizontal component of the amount of motion My and the horizontal component of the amount of motion Mz and the difference between the vertical component of the amount of motion My and the vertical component of the amount of motion Mz are both equal to or less than the predetermined threshold value $M_{TH2}$, or that the magnitude of the differential vector between the motion vector as the amount of motion My and the motion vector as the amount of motion Mz is equal to or less than the predetermined threshold value $M_{TH3}$, it may be judged that the amounts of motion My and Mz are substantially equal so that the operation in case 4 is performed (specifically, an image $Fe_C$ is generated from the images Fa and Fb, and the three images Fc, Fd, and $Fe_C$ are fed to the super-resolution calculator 548).

When, as in case 2, the magnitude of the amount of motion Mx is substantially zero, it can be said that, relative to the datum image, the amounts of motion of the images Fc and Fd are substantially equal. Accordingly, when the magnitude of the amount of motion Mx is substantially zero, it may be judged that, relative to the datum image, the amount of motion (M1) of the image Fc and the amount of motion of the image Fd are substantially equal so that the operation in case 2 is performed. Naturally, relative to the image Fd as the datum frame, the magnitude of the amount of motion of the image Fd is completely zero.

The threshold value $M_{TH1}$ is a positive threshold value, and is set at, for example, about one-eighth of the adjacent pixel interval $\Delta S$ of the actual low-resolution images. The threshold values $M_{TH2}$ and $M_{TH3}$ are threshold values for distinguishing whether or not two amounts of motion whose magnitude relationship is checked are substantially equal, and are set at, for example, about one-eighth of the adjacent pixel interval $\Delta S$ of the actual low-resolution images. The threshold values $M_{TH1}$ to $M_{TH3}$ may be determined according to the accuracy of the detection of amounts of motion.

In the following description, for the sake of simplicity, amounts of motion that are "substantially zero" are in principle mentioned simply as being "zero". As described above, "zero" in such passages may be read as "substantially zero". Likewise, in the following description, for the sake of simplicity, amounts of motion that are "substantially equal" are in principle mentioned simply as being "equal". As described above, "equal" in such passages may be read as "substantially equal".

Operation of Super-Resolution Calculator

Next, the operation of the super-resolution calculator 548 in FIG. 31 will be described. As the super-resolution processing that the super-resolution calculator 548 performs to generate one high-resolution image from a plurality of low-resolution images, it is possible to adopt the super-resolution processing described in connection with the first embodiment. First, a description will be given of the operation performed when four images Fa to Fd are fed from the weighted adder 547 to the super-resolution calculator 548. As in the description of the first embodiment, let the number of pixels on a low-resolution image, for example an actual or estimated low-resolution image, be "u", and the number of pixels on a high-resolution images, for example the initial high-resolution image, be "v". Here, "v" is any number greater than "u". Moreover, as in the description of the first embodiment, the pixel value group of the actual low-resolution image Fa composed of "u" pixels is represented by Ya=[$ya_1$, $ya_2$, . . . $ya_u$], the pixel value group of the actual low-resolution image Fb composed of "u" pixels is represented by Yb=[$yb_1$, $yb_2$, . . . $yb_u$], and the pixel value group of the actual low-resolution image Fc composed of "u" pixels is represented by Yc=[$yc_1$, $yc_2$, . . . $yc_u$]. Furthermore, the pixel value group of the actual low-resolution image Fd composed of "u" pixels is represented by Yd=[$yd_1$, $yd_2$, . . . $yd_u$].

Processing Related to Initial High-Resolution Image: The images Fa to Fd (i.e. Fa, Fb, Fc, and Fd) from the weighted adder 547 are fed to the estimator 561. As in the processing in Step 31 corresponding to FIG. 5A (see FIG. 3), based on the amounts of motion read out from the motion amount memory 546, the estimator 561 detects the displacements among the actual low-resolution images Fa to Fd, subjects the pixel value groups Ya, Yb, Yc, and Yd to interpolation processing using the detected displacements, and thereby generates an initial high-resolution image Fx1 composed of "v" pixels. As the method by which the estimator 561 generates the image Fx1, it is possible to use the method described in connection with the first embodiment by which the estimator 61 (see FIG. 15) generates the image Fx1.

As in the description of the first embodiment, a pixel value group of the high-resolution image Fx1 composed of "v" pixels is represented by X=[$x_1$, $x_2$, . . . $x_v$]. Through processing at a later stage, the high-resolution image Fx1 is renewed and thereby a high-resolution image Fx2 is generated; through processing at further later stages, high-resolution images Fx3, Fx4, . . . , Fxn are generated one after another. The pixel value groups of these high-resolution images Fx2 to Fxn are each also represented by X=[$x_1$, x2, . . . $x_v$].

In the process of generating the image Fx1, it is possible to use, as part of the filter for generating a high-resolution image, a filter (such as a median filter) that is expected to reduce noise. Here, to enhance the signal-to-noise ratio (S/N ratio) of the image Fx1 generated, it is preferable to give a relatively great tap number to the filter for generating a high-resolution image. Moreover, in a case where four images Fa to Fd are fed from the weighted adder 547 to the super-resolution calculator 548, typically, the image Fd, relative to which the amounts of motion Mx, My, and Mz are calculated, is handled as the datum frame for super-resolution processing, and the other images Fa, Fb, and Fc are handled as consulted frames. The estimator 561 may generate the image Fx1 based solely on the image Fd as the datum frame. In this case, the image Fx1 can be generated by enhancing the resolution of the image Fd by linear interpolation or the like.

When the estimator 561 outputs the image Fx1, the selector 562 selects the image Fx1 and feeds it to the renewal amount calculator 563. The renewal amount calculator 563 also receives the amounts of motion read out from the motion amount memory 546. Based on the amounts of motion from the motion amount memory 546, the renewal amount calculator 563 calculates the displacements of the actual low-resolution images Fa to Fd relative to the high-resolution image fed from the selector 562. Thereafter, to degrade the high-resolution image from the selector 562 and thereby estimate the original low-resolution images (i.e. the actual low-resolution images Fa to Fd), camera parameter matrices Wa to Wd (i.e. Wa, Wb, Wc, and Wd) are found that include as parameters the displacements calculated, the image blur attributable to resolution reduction, and the amount of down sampling from a high-resolution image of "v" pixels to a low-resolution image of "u" pixels.

Then, as in Step 32 in FIG. 3 (see also FIG. 5B), the renewal amount calculator 563 multiplies the pixel value group X of the high-resolution image Fx1 by each of the camera parameter matrices Wa to Wd to generate estimated low-resolution images Fa1 (=Wa·X), Fb1 (=Wb·X), Fc1 (=Wc·X), and Fd1 (=Wd·X), which correspond to an estimated version of the actual low-resolution images Fa, Fb, Fc, and Fd.

The errors between the estimated low-resolution images and the actual low-resolution images are represented by |Wa·X−Ya|, |Wb·X−Yb|, |Wc·X−Yc|, and |Wd·X−Yd|. The renewal amount calculator 563 defines, as an evaluation function for estimating those errors, an evaluation function $I_A$ given by formula (C1) below. Specifically, the renewal amount calculator 563 finds, based on the actual low-resolution images Fa to Fd equivalent to four frames from the weighted adder 547, the squared errors $|Wa·X−Ya|^2$, $|Wb·X−Yb|^2$, $|Wc·X−Yc|^2$, and $|Wd·X−Yc|^2$ between the estimated images Fa1 to Fd1 and the actual images Fa to Fd, and, by adding to them a constraining term, finds the evaluation function $I_A$. Then, the renewal amount calculator 563 finds the amount of renewal for the high-resolution image such as to minimize the evaluation function $I_A$. The fifth term of the right side of formula (C1) is the constraining term based on the high-resolution image from the selector 562. The matrix C in this constraining term $\gamma|C·X|^2$ is one based on an "a priori" probability model. The matrix C is set based on the "a priori" knowledge that "a high-resolution image contains only a small proportion of high-band components", and is formed with a high-pass filter such as, for example, a Laplacian filter. The coefficient γ is a parameter representing the weight of the constraining term for the evaluation function $I_A$.

$$I_A = |Wa \cdot X - Ya|^2 + |Wb \cdot X - Yb|^2 + \\ |Wc \cdot X - Yc|^2 + |Wd \cdot X - Yd|^2 + \gamma |C \cdot X|^2 \tag{C1}$$

Any method may be adopted to minimize the evaluation function $I_A$. Suppose now that the gradient method is used. In this case, the renewal amount calculator 563 finds the gradient $\partial I_A/\partial X$ for the evaluation function $I_A$. The gradient $\partial I_A/\partial X$ is given by formula (C2) below. Here, a matrix followed by the superscript T is the transposed matrix of an original matrix. Accordingly, for example $Wa^T$ represents the transposed matrix of a matrix Wa. The gradient $\partial I_A/\partial X$ found based on the high-resolution image Fx1 is calculated as the amount of renewal for the high-resolution image Fx1. The gradient $\partial I_A/\partial X$ corresponds to the differential image ΔFx1 (see FIG. 5C), and the calculation processing here corresponds to the processing in Step 33 in FIG. 3, which corresponds to FIG. 5C.

$$\partial I_A / \partial X = 2 \times [Wa^T \cdot (Wa \cdot X - Ya) + Wb^T \cdot (Wb \cdot X - Yb) + \qquad (C2)$$
$$Wc^T \cdot (Wc \cdot X - Yc) + Wd^T \cdot (Wd \cdot X - Yd) + \gamma C^T \cdot C \cdot X]$$

The subtracter 564 receives from the renewal amount calculator 563 the amount of renewal represented by the gradient $\partial I_A/\partial X$, and receives via the selector 562 the high-resolution image Fx1 from the estimator 561. As in the processing performed in Step 34 in FIG. 3 (see also FIG. 5D), the subtracter 564 subtracts the amount of renewal $\partial I_A/\partial X$ for the high-resolution image Fx1 from the high-resolution image Fx1 (i.e. the pixel value group X of the high-resolution image Fx1), and thereby calculates a high-resolution image Fx2 having as its pixel values the elements of the matrix X' given by formula (C3) below. The obtained high-resolution image Fx2 is fed from the subtracter 564 to the frame memory 565 for temporary storage.

$$X' = X - \partial I_A / \partial X \qquad (C3)$$

High-Resolution Image Renewal Processing: After a new high-resolution image, i.e. the high-resolution image Fx2, is obtained, the selector 562 selects the high-resolution image stored in the frame memory 565 and feeds it to the renewal amount calculator 563 and the subtracter 564. Thereafter, within the super-resolution calculator 548, the loop processing consisting of the processing from Steps 32 through 34 in FIG. 3 is executed repeatedly. As in the first embodiment, this loop processing is called "super-resolution calculation processing".

Specifically, when generalized by use of n, which is an integer of 2 or more, super-resolution calculation processing, at its n-th execution, proceeds as follows. At the n-th execution of super-resolution calculation processing, the selector 562 feeds the high-resolution image Fxn stored in the frame memory 565 to the renewal amount calculator 563 and the subtracter 564. Based on the high-resolution image Fxn, the renewal amount calculator 563 generates estimated low-resolution images Fan (=Wa·X), Fbn (=Wb·X), Fcn (=Wc·X), and Fdn (=Wd·X), which correspond to an estimated version of the actual low-resolution images Fa, Fb, Fc, and Fd. Then, based on the generated estimated low-resolution images Fan to Fdn, the actual low-resolution images Fa to Fd, and the high-resolution image Fxn, the renewal amount calculator 563 calculates, according to formula (C2) above, the amount of renewal $\partial I_A/\partial X$ (in other words, the differential image ΔFxn) for the high-resolution image Fxn. According to formula (C3), the subtracter 564 subtracts the amount of renewal $\partial I_A/\partial X$ (in other words, the differential image ΔFxn) from the high-resolution image Fxn, and thereby generates a new high-resolution image Fx(n+1).

In a case where the upper limit of the number of repetition of super-resolution calculation processing is set at n, the latest high-resolution image x(n+1) obtained by the subtracter 564 is output from the subtracter 564 to the signal processor 550. In a case where the just-mentioned upper limit of the number of repetition is set at (N+1) or more, the high-resolution image Fx(n+1) is fed to the frame memory 565 for temporary storage, and is then fed via the frame memory 565 to the selector 562 so that super-resolution calculation processing is performed for the (n+1)-th time.

In a case where the exposure period for one frame is relatively short, as when a moving image is shot or when still images are shot continuously, the upper limit of the number of repetition of super-resolution calculation processing is set at a relatively small number. The upper limit of the number of repetition of super-resolution calculation processing when still images are shot in an ordinary manner different from when they are shot continuously may be set greater than that when a moving image is shot or when still images are shot continuously. Regardless of the number of repetition of super-resolution calculation processing, if it is judged that the amount of renewal $\partial I_A/\partial X$ for the high-resolution image Fxn has converged, the latest high-resolution image Fx(n+1) obtained by the subtracter 564 may be output from the subtracter 564 to the signal processor 550.

Described above is the operation of the super-resolution calculator 548 in a case where the weighted adder 547 does not perform image merging by weighted addition and the four images Fa to Fd are fed to the super-resolution calculator 548. In a case where image merging is performed by weighted addition, super-resolution processing is performed by similar calculations. The operation of the super-resolution calculator 548 corresponding to cases 2 to 4 described above will now be described in brief.

Super-Resolution Processing Corresponding to Case 2: First, the super-resolution processing corresponding to case 2 will be described (see FIG. 33B). In a case where, as in case 2, the magnitude of the amount of motion Mx is zero, three image Fa, Fb, and Fe$_A$ are fed to the super-resolution calculator 548. Here, for example, the image Fe$_A$ based on the image Fd is handled as the datum frame in super-resolution processing, and the images Fa and Fb are handled as consulted frames in super-resolution processing. The super-resolution calculator 548 handles the image Fe$_A$ as an image Fe. The pixel value group of the actual low-resolution image Fe composed of "u" pixels is represented by Ye=[ye$_1$, ye$_2$, ..., ye$_u$]. The estimator 561 estimates an initial high-resolution image Fx1 from the images Fa, Fb, and Fe. The renewal amount calculator 563 defines an evaluation function I$_A$ not according to formula (C1) above but according to formula (C4) below, and finds its gradient $\partial I_A/\partial X$ as the amount of renewal. The gradient $\partial I_A/\partial X$ of the evaluation function I$_A$ according to formula (C4) below is given by formula (C5) below. Then the subtracter 564 subtracts the amount of renewal calculated by the renewal amount calculator 563 from the high-resolution image Fxn selected by the selector 562 to renew the high-resolution image. These operations are repeated, so that a high-resolution image based on super-resolution processing using the images Fa, Fb, and Fe is output to the signal processor 550.

$$I_A = |Wa \cdot X - Ya|^2 + |Wb \cdot X - Yb|^2 |We \cdot X - Ye|^2 + \gamma |C \cdot X|^2 \qquad (C4)$$

$$\partial I_A / \partial X = 2 \times [Wa^T \cdot (Wa \cdot X - Ya) + \qquad (C5)$$
$$Wb^T \cdot (Wb \cdot X - Yb) + We^T \cdot (We \cdot X - Ye) + \gamma C^T \cdot C \cdot X]$$

The matrix We to the image Fe is similar to the matrixes Wa to Wd to the images Fa to Fd. That is, the matrix We is a camera parameter matrix that includes as parameters the displacement of the low-resolution image Fe relative to the high-resolution image based on the amount of motion fed from the motion amount memory 546, the image blur attributable to resolution reduction, and the amount of down sampling from a high-resolution image of "v" pixels to a low-resolution image of "u" pixels. Multiplying the pixel value group X of the high-resolution image Fxn by the matrix We yields a product (We·X−Ye), which represents the pixel value group of an estimated version Fen of the low-resolution image Fe.

Super-Resolution Processing Corresponding to Case 3: Next, the super-resolution processing corresponding to case 3 will be described (see FIG. 33C). In a case where, as in case 3, it is judged that the amounts of motion Mx and My are equal, three images Fa, Fd, and $Fe_B$ are fed to the super-resolution calculator 548. Here, for example, the image Fd is handled as the datum frame in super-resolution processing, and the images Fa and $Fe_B$ are handled as consulted frames in super-resolution processing. The super-resolution calculator 548 handles the image $Fe_B$ as an image Fe. The estimator 561 estimates an initial high-resolution image Fx1 from the images Fa, Fd, and Fe. The renewal amount calculator 563 finds as the amount of renewal the gradient $\partial I_A/\partial X$ according to the formula "$\partial I_A/\partial X=\{2\times[Wa^T\cdot(Wa\cdot X-Ya)+Wd^T\cdot(Wd\cdot X-Yd)+We^T\cdot(We\cdot X-Ye)+\gamma C^T\cdot C\cdot X]\}$". Then the subtracter 564 subtracts the amount of renewal calculated by the renewal amount calculator 563 from the high-resolution image Fxn selected by the selector 562 to renew the high-resolution image. These operations are repeated, so that a high-resolution image based on super-resolution processing using the images Fa, Fd, and Fe is output to the signal processor 550.

Super-Resolution Processing Corresponding to Case 4: Next, the super-resolution processing corresponding to case 4 will be described (see FIG. 33D). In a case where, as in case 4, it is judged that the amounts of motion My and Mz are equal, three images Fc, Fd, and $Fe_C$ are fed to the super-resolution calculator 548. Here, for example, the image Fd is handled as the datum frame in super-resolution processing, and the images Fc and $Fe_C$ are handled as consulted frames in super-resolution processing. The super-resolution calculator 548 handles the image $Fe_C$ as an image Fe. The estimator 561 estimates an initial high-resolution image Fx1 from the images Fa, Fc, and Fe. The renewal amount calculator 563 finds as the amount of renewal the gradient $\partial I_A/\partial X$ according to the formula "$\partial I_A/\partial X=\{2\times[Wc^T\cdot(Wc\cdot X-Yc)+Wd^T\cdot(Wd\cdot X-Yd)+We^T\cdot(We\cdot X-Ye)+\gamma C^T\cdot C\cdot X]\}$". Then the subtracter 564 subtracts the amount of renewal calculated by the renewal amount calculator 563 from the high-resolution image Fxn selected by the selector 562 to renew the high-resolution image. These operations are repeated, so that a high-resolution image based on super-resolution processing using the images Fc, Fd, and Fe is output to the signal processor 550.

Figure 34:
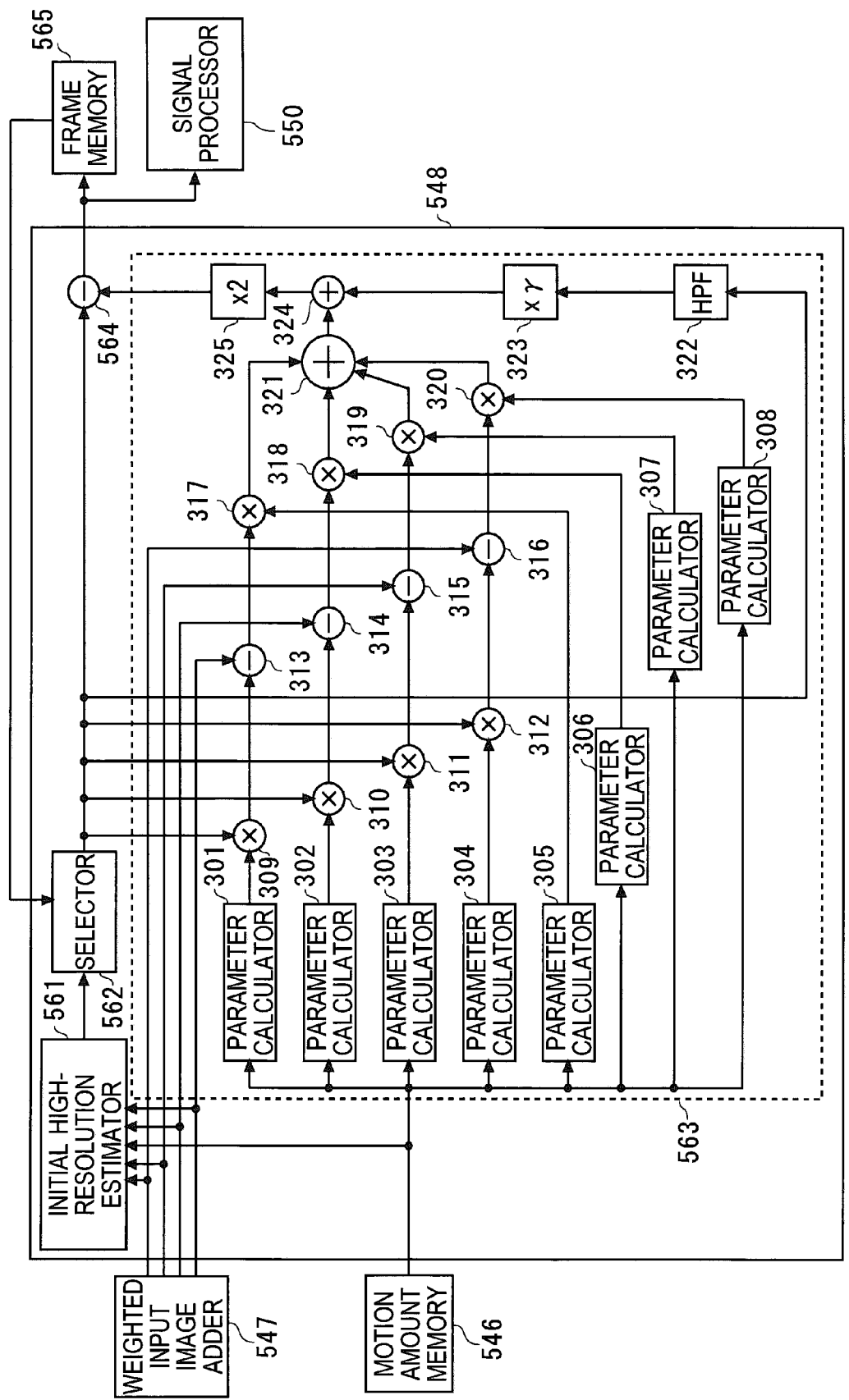
FIG. 34 is a block diagram of part of an image sensing apparatus, including an example of a detailed internal block diagram of the high-resolution renewal amount calculator in FIG. 34, according to the second embodiment of the invention.

In this way, through super-resolution processing performed by the super-resolution calculator 548, a high-resolution image is obtained from actual low-resolution images equivalent to three or four frames fed from the weighted adder 547. FIG. 34 shows an example of the details of the configuration of the super-resolution calculator 548. FIG. 34 is a block diagram of part of an image sensing apparatus, including an internal block diagram of the super-resolution calculator 548, and FIG. 34 includes a detailed internal block diagram of the renewal amount calculator 563.

The renewal amount calculator 563 shown in FIG. 34 includes parts identified by the reference signs 301 to 325. Now, assuming mainly that actual low-resolution images Fa to Fd equivalent to four frames are fed to the super-resolution calculator 548, the functions of the individual parts in FIG. 34 will be described. Parameter calculators 301 to 308 find camera parameter matrices Wa to Wd and $Wa^T$ to $Wd^T$ based on the amounts of motion obtained by the motion amount memory 546. Multipliers 309 to 312 multiplies the high-resolution image Fxn selected by the selector 562 by the camera parameter matrices Wa to Wd from the parameter calculators 301 to 304 respectively. Subtracters 313 to 316 subtract the pixel values of the actual low-resolution images from the weighted adder 547 from the pixel values of the estimated low-resolution images obtained by the multipliers 309 to 312 respectively. Multipliers 317 to 320 multiply the output values of the subtracters 313 to 316, i.e. the values resulting from their subtraction, by the camera parameter matrices $Wa^T$ to $Wd^T$ from the parameter calculators 305 to 308 respectively. An adder 321 calculates the sum of the values resulting from the multiplication by the multipliers 317 to 320 (that is, adds up the squared errors between a plurality of estimated low-resolution images and a plurality of actual low-resolution images). A HPF (high-pass filter) 322 extracts and normalizes the high-frequency components of the high-resolution image selected by the selector 562. A multiplier 323 multiplies the constraining term (normalized term) resulting from the extraction by the HPF 322 by a weight coefficient γ. An adder 324 adds the value resulting from the multiplication by the multiplier 323 (i.e. the constraining term multiplied by the weight coefficient γ) to the above-mentioned sum calculated by the adder 321. A multiplier 325 multiplies the value resulting from the addition by the adder 324 by 2, and thereby finds the amount of renewal for the high-resolution image selected by the selector 562.

The operation of the super-resolution calculator 548 configured as shown in FIG. 34 will now be further described. When, as in case 1 corresponding to FIG. 33A, four images Fa to Fd are fed from the weighted adder 547 to the super-resolution calculator 548, the parameter calculators 301 to 308 find the camera parameter matrices Wa to Wd and $Wa^T$ to $Wd^T$, and in addition the multipliers 309 to 312 and 317 to 320 and the subtracters 313 to 316 all operate, so that the gradient $\partial I_A/\partial X$ is calculated that is given by "$\partial I_A/\partial X=2\times[Wa^T\cdot(Wa\cdot X-Ya)+Wb^T\cdot(Wb\cdot X-Yb)+Wc^T\cdot(Wc\cdot X-Yc)+Wd^T\cdot(Wd\cdot X-Yd)+\gamma C^T\cdot C\cdot X]$".

By contrast, when, as in case 2 corresponding to FIG. 33B, three images Fa, Fb, and $Fe_A$ are fed from the weighted adder 547 to the super-resolution calculator 548, the operation of the parameter calculators 304 and 308, the multipliers 312 and 320, and the subtracter 316 is stopped. On the other hand, the parameter calculators 301, 302, 305, and 306 calculate the camera parameter matrices Wa, Wb, $Wa^T$, and $Wb^T$, and the parameter calculators 303 and 307 calculate the camera parameter matrices We and $We^T$. Based on the thus calculated values, the multipliers 309 to 311 and 317 to 319 and the subtracters 313 to 315 operate, so that the gradient $\partial I_A/\partial X$ is calculated that is given by "$\partial I_A/\partial X=2\times[Wa^T\cdot(Wa^T\cdot X-Ya)+Wb^T\cdot(Wb\cdot X-Yb)+We^T\cdot(We\cdot X-Ye)+\gamma C^T\cdot C\cdot X]$".

Likewise, when, as in case 3 corresponding to FIG. 33C, three images Fa, Fd, and $Fe_B$ are fed from the weighted adder 547 to the super-resolution calculator 548, the operation of the parameter calculators 303 and 307, the multipliers 311 and 319, and the subtracter 315 is stopped. On the other hand, the parameter calculators 301, 304, 305, and 308 calculate the camera parameter matrices Wa, Wd, $Wa^T$, and $Wd^T$, and the parameter calculators 302 and 306 calculate the camera parameter matrices We and $We^T$. Based on the thus calculated values, the gradient $\partial I_A/\partial X$ is calculated that is given by "$\partial I_A/\partial X=2\times[Wa^T\cdot(Wa\cdot X-Ya)+Wd^T\cdot(Wd\cdot X-Yd)+We^T\cdot(We\cdot X-Ye)+\gamma C^T\cdot C\cdot X]$".

Likewise, when, as in case 4 corresponding to FIG. 33D, three images Fc, Fd, and $Fe_C$ are fed from the weighted adder 547 to the super-resolution calculator 548, the operation of the parameter calculators 302 and 306, the multipliers 310 and 318, and the subtracter 314 is stopped. On the other hand, the parameter calculators 303, 304, 307, and 308 calculate the camera parameter matrices Wc, Wd, $Wc^T$, and $Wd^T$, and the parameter calculators 301 and 305 calculate the camera parameter matrices We and $We^T$. Based on the thus calculated values, the gradient $\partial I_A/\partial X$ is calculated that is given by "$\partial I_A/\partial X = 2\times[Wc^T\cdot(Wc\cdot X-Yc)+Wd^T\cdot(Wd\cdot X-Yd)+We^T\cdot(We\cdot X-Ye)+\gamma C^T\cdot C\cdot X]$".

As described above, in the first example of configuration/processing, when two actual low-resolution images are acquired whose amounts of motion relative to a given datum image are equal, those two images are merged together by weighted addition to generate one low-resolution image, and the thus generated low-resolution image is fed to the super-resolution calculator 548. The merging using weighted addition enhances the S/N ratio of the low-resolution image fed to the super-resolution calculator 548, and thus eventually enhances the S/N ratio of the high-resolution image obtained by super-resolution processing. Moreover, the merging using weighted addition reduces, as compared with when no such merging is performed, the number of low-resolution images fed to the super-resolution calculator. This reduces the calculation load of super-resolution processing, and increases the acquisition speed of the high-resolution image.

In the above description, when two actual low-resolution images are acquired whose amounts of motion relative to a given datum image are equal, one low-resolution image obtained by merging them together is fed to the super-resolution calculator 548. Instead, with no merging performed, simply one of the two images may be fed intact to the super-resolution calculator 548. In that case, whereas no enhancement of the S/N ratio due to merging is obtained, it is possible to reduce the calculation load of super-resolution processing and increase the acquisition speed of the high-resolution image.

Specifically, for example, when, as in case 2 corresponding to FIG. 33B, it is judged that the magnitude of the amount of motion Mx is zero (in other words, when it is judged that, relative to the datum image, the amounts of motion of the images Fc and Fd are equal), three actual low-resolution images Fa, Fb, and Fc, or Fa, Fb, and Fd, may be fed from the weighted adder 547 to the super-resolution calculator 548 so that, from those three actual low-resolution images fed to the super-resolution calculator 548, one high-resolution image is generated.

Likewise, for example, when, as in case 3 corresponding to FIG. 33C, it is judged that the amounts of motion Mx and My are equal, three actual low-resolution images Fa, Fb, and Fd, or Fa, Fc, and Fd, may be fed from the weighted adder 547 to the super-resolution calculator 548 so that, from those three actual low-resolution images fed to the super-resolution calculator 548, one high-resolution image is generated.

Likewise, for example, when, as in case 4 corresponding to FIG. 33D, it is judged that the amounts of motion My and Mz are equal, three actual low-resolution images Fa, Fc, and Fd, or Fb, Fc, and Fd, may be fed from the weighted adder 547 to the super-resolution calculator 548 so that, from those three actual low-resolution images fed to the super-resolution calculator 548, one high-resolution image is generated.

Although the above description deals with an example in which four actual low-resolution images Fa to Fd are fed to the weighted adder 547 and three or four actual low-resolution images are fed to the super-resolution calculator 548, these specific values may be modified. Although the above description deals with the operation performed when two actual low-resolution images are acquired whose amounts of motion relative to a given datum image are equal, a similar operation can be performed in cases where three or more such actual low-resolution images are acquired. Specifically, it is also possible to feed $L_A$ chronologically ordered actual low-resolution images to the weighted adder 547, feed $L_B$ actual low-resolution images from the weighted adder 547 to the super-resolution calculator 548, and generate one high-resolution image based on the $L_B$ actual low-resolution images. Here, $L_A$ represents an integer of 3 or more, and $L_B$ represents an integer of 2 or more but $L_A$ or less.

For example, when five actual low-resolution images f1 to f5 are fed to the weighted adder 547, one of the actual low-resolution images f1 to f5 is taken as a datum image. Suppose now that the datum image is f1. The image f1 is suitable as the datum frame for super-resolution processing. Then, if, based on the amount of motion of each of the images f2 to f5 from the datum image f1, it is judged that the amounts of motion of the images f3, f4, and f5 relative to the datum image f1 are equal, the images f3, f4, and f5 are merged together by weighted addition to generate one image F6, and the three low-resolution images f1, f2, and f6 are fed to the super-resolution calculator 548. Alternatively, three low-resolution images consisting of the images f1 and f2 and one of the images f3 to f5 are fed to the super-resolution calculator 548. In this case, the super-resolution calculator 548 can generate from the three low-resolution images fed to it one high-resolution image.

Second Example of Configuration/Processing

A second example of configuration/processing according to the second embodiment will now be described. The internal block diagram of the image processor 4 used in the second example of configuration/processing is the same as that shown in FIG. 31 or 34 described in connection with the first example of configuration/processing. Moreover, in the second example of configuration/processing, the configuration and operation of the frame memories 541 to 544 and 565, the motion amount calculator 545, the motion amount memory 546, the super-resolution calculator 548, and the signal processor 550 are similar to those described in connection with the first example of configuration/processing. Accordingly, the following description is focused on the operation of the weighted adder 547.

In an image sensing apparatus adopting the first example of configuration/processing, three or more actual low-resolution images may have equal amounts of motion relative to the image Fd as the datum image. When this happens, generating one low-resolution image from three or more low-resolution images may make too few the low-resolution images available for the super-resolution processing by the super-resolution calculator 548, resulting in poor reproducibility of the high-resolution image obtained.

To avoid this, in the second example of configuration/processing, the processing for the selection of actual low-resolution images to be merged together by weighted addition is performed with consideration given also to the amounts of motion between adjacent frames. Now the method for this selection processing will be described specifically.

As described in connection with the first example of configuration/processing, it is based on the amount of motion M1 between the images Fd and Fc, the amount of motion M2 between the images Fc and Fb, and the amount of motion M3 between images Fb and Fa, that the amount of motion Mx between the image Fd and Fc, the amount of motion My between the image Fd and Fb, and the amount of motion Mz between the image Fd and Fa are found (see FIGS. 32A and 32B).

First, in a case where the amounts of motion Mx and My are different and in addition the amounts of motion My and Mz are different, in principle, the operation in case 1 described in connection with the first example of configuration/processing is performed. Specifically, in this case, the weighted adder 547 does not perform merging by weighted addition but feeds four actual low-resolution images to the super-resolution calculator 548.

Second, in a case where, of the magnitudes of the amounts of motion Mx, My, and Mz, only the magnitude of the amount of motion Mz is zero, the operation in case 2 described in connection with the first example of configuration/processing is performed. Specifically, in this case, the images Fc and Fd are merged together, and three actual low-resolution images are fed to the super-resolution calculator 548.

Third, in a case where the amounts of motion Mx and Mz are not equal and in addition the amounts of motion My and Mz are not equal, if the amounts of motion Mx and My are equal, the operation in case 3 described in connection with the first example of configuration/processing is performed. Specifically, in this case, the images Fb and Fc are merged together, and three actual low-resolution images are fed to the super-resolution calculator 548.

Fourth, in a case where the amounts of motion Mx and My are not equal and in addition the amounts of motion Mx and Mz are not equal, if the amounts of motion My and Mz are equal, the operation in case 4 described in connection with the first example of configuration/processing is performed. Specifically, in this case, the images Fa and Fb are merged together, and three actual low-resolution images are fed to the super-resolution calculator 548.

In the second example of configuration/processing, however, even in a case where the amounts of motion Mx and My are different and in addition the amounts of motion My and Mz are different, if the amounts of motion Mx and Mz are equal and in addition the amounts of motion M1 and M3 are equal, merging by weighted addition is performed. This case is called "case 5". Moreover, the operation performed in a case where the amounts of motion Mx, My, and Mz are equal (corresponding to case 6), and the operation performed in a case where the magnitude of the amounts of motion Mx and My are zero (corresponding to case 7), are as described below.

Figure 35C:
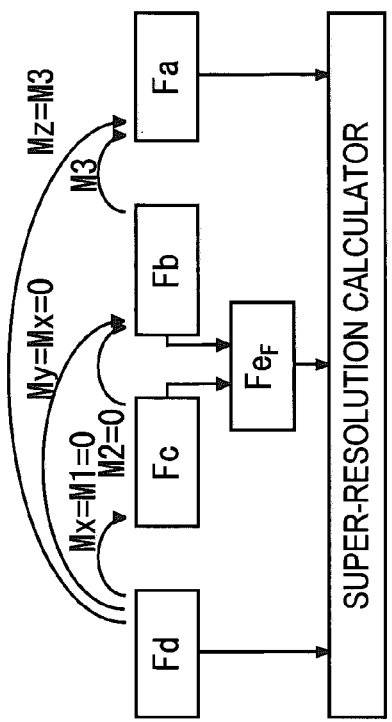
FIGS. 35A to 35C are diagrams showing other processing performed by the weighted input image adder in FIG. 31.
Figure 35A:
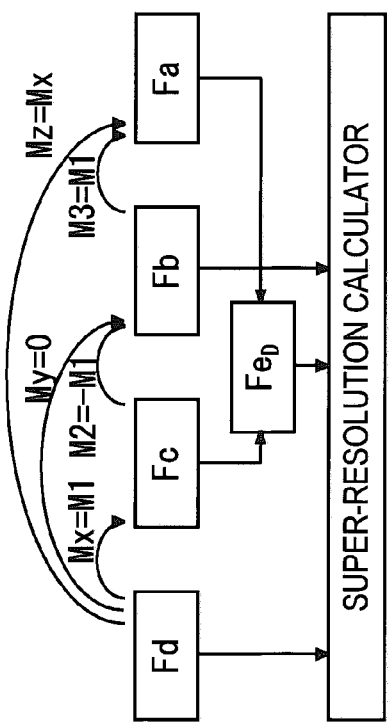

Case 5—When the amounts of motion Mx and Mz are equal and in addition the amounts of motion M1 and M3 are equal: The operation in case 5 will now be described. In case 5, as shown in FIG. 35A, the amounts of motion Mx and My are different and in addition the amounts of motion My and Mz are different, but the amounts of motion Mx and Mz are equal and in addition the amounts of motion M1 and M3 are equal. Then, since Mx=M1 and in addition Mz=M1+M2+M3, necessarily M2=−M1 and simultaneously My=0. That is, in case 5, the motion vector as the amount of motion M2 and the motion vector as the amount of motion M1 are opposite in direction and equal in magnitude; in addition, the amount of motion My is zero in magnitude. Here, not only are the amounts of motion (Mz and Mx) of the images Fa and Fc relative to the image Fd as the datum image equal, the amount of motion (M3) of the image Fa relative to the image Fb, which corresponds to the frame preceding the image Fa, and the amount of motion (M1) of the image Fc relative to the image Fd, which corresponds to the frame preceding the image Fc, are equal.

Then, between the images Fa and Fc, not only does the subject appear at the same position on the images (there is no displacement between the two images), but the direction of shake during shooting is identical. Thus, between the images Fa and Fc, the pixel value at the same pixel position can be regarded as equal. Accordingly, the weighted adder 547, by the method described in connection with the first example of configuration/processing, merges together the images Fa and Fc by weighted addition and generates a low-resolution image $Fe_D$ equivalent to one frame which corresponds to the resulting merged image. Thereafter the weighted adder 547 feeds the images Fa, Fd, and $Fe_D$ to the super-resolution calculator 548, and the super-resolution calculator 548, handling the image $Fe_D$ as an image Fe, performs super-resolution processing using the three images Fa, Fd, and Fe. Here, "shake" denotes a vibration of the image sensing apparatus itself or of an image resulting from hand shake or the like acting on the image sensing apparatus during shooting.

Figure 35B:
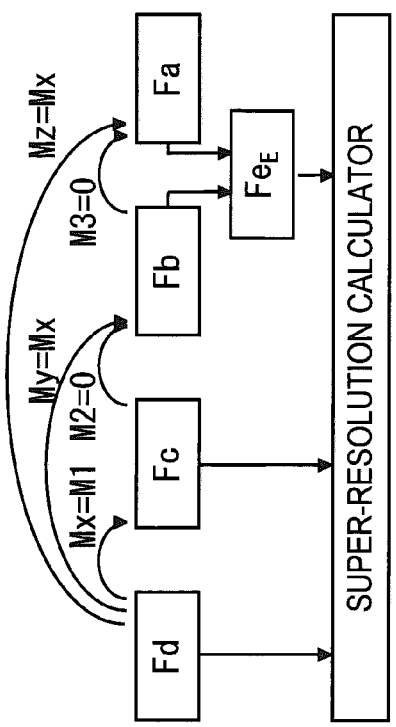

Case 6—When the amounts of motion Mx, My, and Mz are equal: The operation in case 6 will now be described. In case 6, as shown in FIG. 35B, the amounts of motion Mx, My, and Mz are equal. It is however assumed that the magnitude of the amounts of motion Mx, My, and Mz is not zero. Accordingly, while the amount of motion Mx(=M1) is not zero in magnitude, the amounts of motion My and Mz are both zero in magnitude. Here, not only are the amounts of motion (Mz and My) of the images Fa and Fb relative to the image Fd as the datum image equal, the amount of motion (M3) of the image Fa relative to the image Fb, which corresponds to the frame preceding the image Fa, and the amount of motion (M2) of the image Fb relative to the image Fc, which corresponds to the frame preceding the image Fb, are equal.

Then, between the images Fa and Fb, not only does the subject appear at the same position on the images (there is no displacement between the two images), but the direction of shake during shooting is identical. Thus, between the images Fa and Fb, the pixel value at the same pixel position can be regarded as equal. Accordingly, the weighted adder 547, by the method described in connection with the first example of configuration/processing, merges together the images Fa and Fb by weighted addition and generates a low-resolution image $Fe_E$ equivalent to one frame which corresponds to the resulting merged image. Thereafter the weighted adder 547 feeds the images Fc, Fd, and $Fe_E$ to the super-resolution calculator 548, and the super-resolution calculator 548, handling the image $Fe_E$ as an image Fe, performs super-resolution processing using the three images Fc, Fd, and Fe.

Case 7—When the amounts of motion Mx and My are both zero: The operation in case 7 will now be described. In case 7, as shown in FIG. 35C, the amounts of motion Mx and My are both zero in magnitude. Accordingly, while the amount of motion Mz is equal to the amount of motion M3, the amounts of motion M1 and M2 are both zero. Here, not only are the amounts of motion (My and Mx) of the images Fb and Fc relative to the image Fd as the datum image equal, the amount of motion (M2) of the image Fb relative to the image Fc, which corresponds to the frame preceding the image Fb, and the amount of motion (M1) of the image Fc relative to the image Fd, which corresponds to the frame preceding the image Fc, are equal.

Then, between the images Fb and Fc, not only does the subject appear at the same position on the images (there is no displacement between the two images), but the direction of shake during shooting is identical. Thus, between the images Fb and Fc, the pixel value at the same pixel position can be regarded as equal. Accordingly, the weighted adder 547, by the method described in connection with the first example of configuration/processing, merges together the images Fb and Fc by weighted addition and generates a low-resolution image $Fe_F$ equivalent to one frame which corresponds to the resulting merged image. Thereafter the weighted adder 547 feeds the images Fa, Fd, and $Fe_F$ to the super-resolution calculator 548, and the super-resolution calculator 548, handling the image $Fe_F$ as an image Fe, performs super-resolution processing using the three images Fa, Fd, and Fe.

As described above, in the second example of configuration/processing, the low-resolution images (in the example under discussion, Fa to Fd) fed to the weighted adder 547 are taken as evaluated images so that a plurality of evaluated images are taken as of interest, and it is checked whether or not the evaluated images fed to the weighted adder 547 include a plurality of evaluated images that fulfill both the first and second conditions below.

The first condition is that "the amounts of motion relative to the datum image are equal among the plurality of evaluated images of interest". In the example under discussion, the datum image is the image Fd.

The second condition is that "the amounts of motion of the plurality of evaluated images of interest relative to their respective preceding frames are equal".

When the plurality of evaluated images of interest fulfill both the first and second conditions, those evaluated images of interest are merged together by weighted addition. By feeding the resulting low-resolution image to the super-resolution calculator 548, it is possible to obtain the effect described in connection with the first example of configuration/processing. Moreover, the use of not only the first but the second condition, it is possible to identify a plurality of actual low-resolution images sharing the same characteristic (such as the direction of shake during shooting). If a plurality of actual low-resolution images containing shake in different direction during shooting are merged together, the merged image may have a blurred edge. This can be suppressed by the above processing, which thus makes it possible to generate a sharp low-resolution image from a plurality of actual low-resolution images. This enhances the resolution as perceived in the high-resolution image obtained by the super-resolution processing.

The second condition may be modified to that "the amounts of motion of the plurality of evaluated images of interest relative to their respective succeeding frames are equal". For example, in a case where the plurality of evaluated images of interest consist of the images Fb and Fc, the frame succeeding the image Fb is the image Fc, and the frame succeeding the image Fc is the image Fa; thus, if the amount of motion M2 between the images Fc and Fb and the amount of motion M3 between the images Fb and Fa are equal, it may be judged that the second condition is fulfilled. Also by use of this modified second condition, it is possible to identify a plurality of actual low-resolution images sharing the same characteristic (such as the direction of shake during shooting).

In the above description, when the first and second conditions are fulfilled, one low-resolution image obtained by merging together two actual low-resolution images is fed to the super-resolution calculator 548. Instead, one of them may be fed intact, without merging performed, to the super-resolution calculator 548. In this case, whereas no enhancement of the S/N ratio due to merging is obtained, it is possible to reduce the calculation load of super-resolution processing and increase the acquisition speed of the high-resolution image.

Specifically, for example, in case 5 corresponding to FIG. 35A, three actual low-resolution images Fa, Fb, and Fd, or three actual low-resolution images Fb, Fc, and Fd, may be fed from the weighted adder 547 to the super-resolution calculator 548 so that, from the three actual low-resolution images fed to the super-resolution calculator 548, one high-resolution image is generated.

Likewise, for example, in case 6 corresponding to FIG. 35B, three actual low-resolution images Fa, Fc, and Fd, or three actual low-resolution images Fb, Fc, and Fd, may be fed from the weighted adder 547 to the super-resolution calculator 548 so that, from the three actual low-resolution images fed to the super-resolution calculator 548, one high-resolution image is generated.

Likewise, for example, in case 7 corresponding to FIG. 35C, three actual low-resolution images Fa, Fb, and Fd, or three actual low-resolution images Fa, Fc, and Fd, may be fed from the weighted adder 547 to the super-resolution calculator 548 so that, from the three actual low-resolution images fed to the super-resolution calculator 548, one high-resolution image is generated.

Although the above description deals with an example in which four actual low-resolution images Fa to Fd are fed to the weighted adder 547 and three or four actual low-resolution images are fed to the super-resolution calculator 548, these specific values may be modified. Although the above description deals with the operation performed when two actual low-resolution images that fulfill the first and second conditions mentioned above are acquired, a similar operation can be performed in a case where three or more actual low-resolution images that fulfill the first and second conditions are acquired. That is, it is also possible to feed $L_A$ chronologically ordered actual low-resolution images to the weighted adder 547, feed $L_B$ actual low-resolution images from the weighted adder 547 to the super-resolution calculator 548, and generate one high-resolution image based on the $L_B$ actual low-resolution images. Here, $L_A$ represents an integer of 3 or more, and $L_B$ represents an integer of 2 or more but $L_A$ or less.

Third Example of Configuration/Processing

Figure 36:
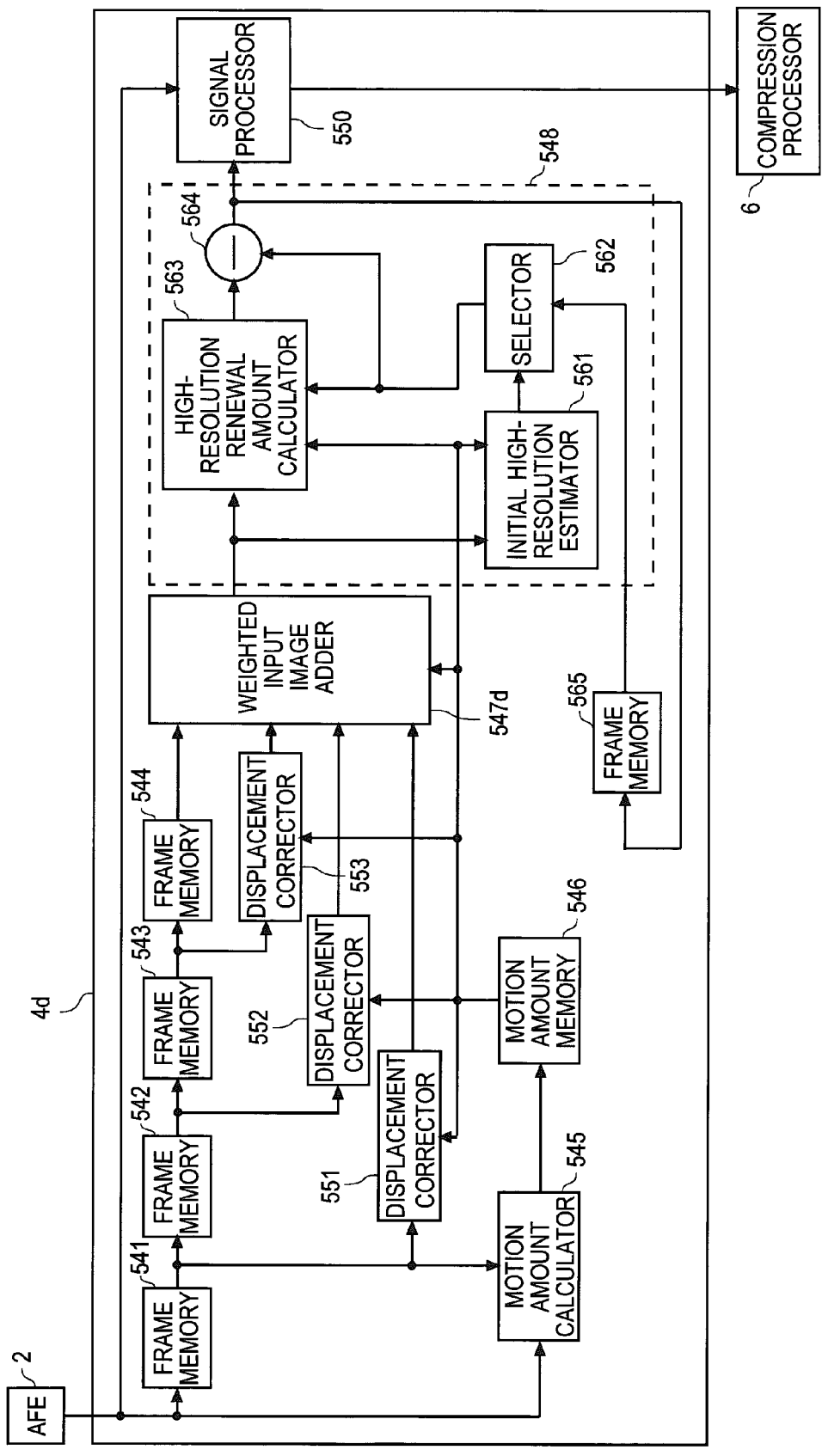
FIG. 36 is a block diagram of part of an image sensing apparatus, including another internal block diagram of the image processor in FIG. 1, according to the second embodiment of the invention.

A third example of configuration/processing according to the second embodiment will now be described. FIG. 36 is a block diagram of part of the image sensing apparatus of FIG. 1, including an internal block diagram of an image processor 4*d* used as the image processor 4 in FIG. 1. The image processor 4*d* includes parts identified by the reference signs 541 to 546, 547*d*, 548, 550 to 553, and 565. In the image processor 4*d*, such parts as appear also in FIG. 31 are identified by common reference signs, and no overlapping description will be repeated.

The image processor 4*d*, as compared with the image processor 4*c* configured as shown in FIG. 31, further includes displacement correctors 551 to 553. The displacement correctors 551 to 553 subjects the actual low-resolution images from the frame memories 541 to 543, respectively, to displacement correction based on amounts of motion in units of pixels. The operation of the frame memories 541 to 544 and 565, the motion amount calculator 545, the motion amount memory 546, the super-resolution calculator 548, and the signal processor 550 is the same as that of those described in connection with the first example of configuration/processing. Accordingly, the following description of the operation of the image processor 4*d* places emphasis on the operation of the displacement correctors 551 to 553 and of a weighted input image adder 547*d* (hereinafter abbreviated to "weighted adder 547*d*").

The motion amount memory 546 stores the amount of motion M1 between the images Fd and Fc, the amount of motion M2 between the images Fc and Fb, and the amount of motion M3 between the images Fb and Fa (see FIG. 32A). The amounts of motion stored in the motion amount memory 546 are fed to the displacement correctors 551 to 553 and to the weighted adder 547*d*. When the displacement corrector 551, to which the image Fa stored in the frame memory 541 is fed, is fed with the amounts of motion stored in the motion amount memory 546, the displacement corrector 551 detects the amount of motion Mz between the images Fd and Fa. As described in connection with the first example of configuration/processing, the amount of motion Mz is the sum of the amounts of motion M1 to M3 (see FIG. 32B).

The amount of motion Mz can be taken as being composed of a pixel-unit motion amount component and a subpixel-unit motion amount component. Of the amount of motion Mz, the pixel-unit amount of motion (amount of motion in units of pixels) is represented by Mzi, and subpixel-unit amount of motion (the amount of motion in units of subpixels) is represented by Mzr. The amount of motion Mz equals the amounts of motion Mzi and Mzr merged together. Likewise, of the amount of motion My between the images Fd and Fb, the pixel-unit amount of motion is represented by Myi, and the subpixel-unit amount of motion is represented by Myr. Likewise, of the amount of motion Mx between the images Fd and Fc, the pixel-unit amount of motion is represented by Mxi, and the subpixel-unit amount of motion is represented by Mxr. Likewise, of the amounts of motion M1 to M3, the subpixel-unit amounts of motion are represented by M1r to M3r respectively. Needless to say, like the amounts of motion Mx, My, Mz, M1, M2, and M3, the amounts of motion Mxi, Myi, Mzi, Mxr, Myr, Mzr, M1r, M2r, and M3r are each a two-dimensional quantity containing horizontal and vertical components.

The displacement corrector 551 extracts the pixel-unit amount of motion Mzi from the amount of motion Mz, and performs displacement correction on the image Fa by the amount of motion Mzi relative to the image Fd. The method by which the displacement correctors 551 to 553 perform displacement correction is the same as that described in connection with the first embodiment. Specifically, relative to the image Fd as a datum, the position of the image Fa is adjusted in such a way that, of the displacement of the image Fa relative to the image Fd as the datum image, a portion corresponding to the amount of motion Mzi is cancelled. Thereafter, the displacement corrector 551 outputs the displacement-corrected image Fa to the weighted adder 547d, and outputs, as the amount of motion between the images Fd and Fa after displacement correction, the amount of motion Mzr, which corresponds to the difference of the amount of motion Mzi from the amount of motion Mz, to the weighted adder 547d.

Likewise, when the displacement corrector 552, to which the image Fb stored in the frame memory 542 is fed, is fed with the amounts of motion stored in the motion amount memory 546, the displacement corrector 552 detects the amount of motion My between the images Fd and Fb. Like the displacement corrector 551, the displacement corrector 552 extracts the pixel-unit amount of motion Myi from the amount of motion My, and performs displacement correction on the image Fb by the amount of motion Myi relative to the image Fd. Thereafter, the displacement corrector 552 outputs the displacement-corrected image Fb to the weighted adder 547d, and outputs, as the amount of motion between the images Fd and Fb after displacement correction, the amount of motion Myr, which corresponds to the difference of the amount of motion Myi from the amount of motion My, to the weighted adder 547d.

Likewise, when the displacement corrector 553, to which the image Fc stored in the frame memory 543 is fed, is fed with the amounts of motion stored in the motion amount memory 546, the displacement corrector 553 detects the amount of motion Mx between the images Fd and Fc. Like the displacement corrector 551, the displacement corrector 553 extracts the pixel-unit amount of motion Mxi from the amount of motion Mx, and performs displacement correction on the image Fc by the amount of motion Mxi relative to the image Fd. Thereafter, the displacement corrector 553 outputs the displacement-corrected image Fc to the weighted adder 547d, and outputs, as the amount of motion between the images Fd and Fc after displacement correction, the amount of motion Mxr, which corresponds to the difference of the amount of motion Mxi from the amount of motion Mx, to the weighted adder 547d.

In this way, the weighted adder 547d is fed with the images Fa to Fc having undergone displacement correction in units of pixels relative to the image Fd. There still remain displacements corresponding to the amounts of motion Mxr, Myr, and Mzr between the images Fd and Fc, between the images Fd and Fb, and between images Fd and Fa after pixel-unit displacement correction, and these remaining amounts of motion Mxr, Myr, and Mzr are also fed to the weighted adder 547d. Furthermore, the image Fd stored in the frame memory 544 is also fed to the weighted adder 547d. Based on the amounts of motion Mxr, Myr, and Mzr, the weighted adder 547d selects a plurality of low-resolution images to be merged together by weighted addition. In this selection, the amounts of motion M1r, M2r, and M3r are consulted as necessary. From the amounts of motion M1 to M3 stored in the motion amount memory 546, the weighted adder 547d extracts the subpixel-unit amounts of motion M1r, M2r, and M3r as necessary. As described in connection with the first or second example of configuration/processing, it is also possible, instead of performing weighted addition, to feed one of a plurality of low-resolution images to the super-resolution calculator 548.

Based on the amounts of motion Mxr, Myr, and Mzr, the weighted adder 547d can operate in a similar manner as described in connection with the first or second example of configuration/processing. The difference is that the weighted adder 547d uses, instead of the amounts of motion Mx, My, and Mz in the first or second example of configuration/processing, the amounts of motion Mxr, Myr, and Mzr respectively.

(i) Specifically, for example, when the amounts of motion Mxr and Myr are different and in addition the amounts of motion Myr and Mzr are different, an operation similar to that in case 1 described in connection with the first example of configuration/processing is performed (see FIG. 33A). That is, no merging or the like by weighted addition is performed, and four images Fa to Fd are output to the super-resolution calculator 548.

(ii) For another example, in a case where, of the amounts of motion Mxr, Myr, and Mzr, the magnitude of the amount of motion Mzr alone is zero, an operation similar to that in case 2 described in connection with the first example of configuration/processing is performed (see FIG. 33B). That is, the images Fc and Fd are merged together, and three low-resolution images including the merged image are output to the super-resolution calculator 548; alternatively, three low-resolution images consisting of the images Fa and Fb and the image Fc or Fd are output to the super-resolution calculator 548.

(iii) For another example, in a case where the amounts of motion Mxr and Mzr are not equal and in addition the amounts of motion Myr and Mzr are not equal but the amounts of motion Mxr and Myr are equal, an operation similar to that in case 3 described in connection with the first example of configuration/processing is performed (see FIG. 33C). That is, the images Fb and Fc are merged together, and three low-resolution images including the merged image are output to the super-resolution calculator 548; alternatively, three low-resolution images consisting of the images Fa and Fd and the image Fb or Fc are output to the super-resolution calculator 548.

(iv) For another example, in a case where the amounts of motion Mxr and Myr are not equal and in addition the amounts of motion Mxr and Mzr are not equal but the amounts of motion Myr and Mzr are equal, an operation similar to that in case 4 described in connection with the first example of configuration/processing is performed (see FIG. 33D). That is, the images Fa and Fb are merged together, and three low-resolution images including the merged image are output to the super-resolution calculator 548; alternatively, three low-resolution images consisting of the images Fc and Fd and the image Fa or Fb are output to the super-resolution calculator 548.

(v) For another example, in a case where the amounts of motion Mxr and Myr are different and in addition the amounts of motion Myr and Mzr are different but the amounts of motion Mxr and Mzr are equal and in addition the amount of motion M$1r$ (=Mxr) and the amount of motion M$3r$ (=Mzr−Myr) are equal, an operation similar to that in case 5 described in connection with the second example of configuration/processing is performed (see FIG. 35A). That is, the images Fa and Fc are merged together, and three low-resolution images including the merged image are output to the super-resolution calculator 548; alternatively, three low-resolution images consisting of the images Fb and Fd and the image Fa or Fc are output to the super-resolution calculator 548.

(vi) For another example, in a case where the amounts of motion Mxr, Myr, and Mzr are equal (provided that the magnitude of the amounts of motion Mxr, Myr, and Mzr are not zero), an operation similar to that in case 6 described in connection with the second example of configuration/processing is performed (see FIG. 35B). That is, the images Fa and Fb are merged together, and three low-resolution images including the merged image are output to the super-resolution calculator 548; alternatively, three low-resolution images consisting of the images Fc and Fd and the image Fa or Fb are output to the super-resolution calculator 548.

(vii) For another example, in a case where the magnitudes of the amounts of motion Mxr and Myr are both zero, an operation similar to that in case 7 described in connection with the second example of configuration/processing is performed (see FIG. 35C). That is, the images Fb and Fc are merged together, and three low-resolution images including the merged image are output to the super-resolution calculator 548; alternatively, three low-resolution images consisting of the images Fa and Fd and the image Fb or Fc are output to the super-resolution calculator 548.

In the image processor 4$d$, by use of the displacement correctors 551 to 553, the image Fd from the frame memory 544 and the images Fa and Fc having undergone displacement correction in units of pixels are fed to the weighted adder 547$d$. Alternatively, it is also possible to feed the images Fa to Fd intact from the frame memories 541 to 544 to the weighted adder 547$d$ and subject them to displacement correction in units of pixels in the weighted adder 547$d$.

In this case, based on the amounts of motion stored in the motion amount memory 546, in the weighted adder 547$d$, the subpixel-unit amounts of motion Mxr, Myr, and Mzr are calculated and then, based on the calculated amounts of motion Mxr, Myr, and Mzr, a plurality of actual low-resolution images to be merged together by weighted addition are selected. Then displacement correction in units of pixels is performed among the selected actual low-resolution images, and these selected actual low-resolution images after displacement correction are merged together by weighted addition. For example, in a case where the selected plurality of actual low-resolution images consist of a first and a second image and the acquisition time of the first image is closer than that of the second image to that of the image Fd as the datum image, the second image is subjected to pixel-unit displacement correction relative to the first image, and the first and second images after displacement correction are merged together by weighted addition. Alternatively, it is also possible to simply output one of the first and second images to the super-resolution calculator 548.

Fourth Example of Configuration/Processing

A fourth example of configuration/processing according to the second embodiment will now be described. The internal block diagram of the image processor 4 used in the fourth example of configuration/processing is the same as that shown in FIG. 36 described in connection with the third example of configuration/processing. Moreover, in the fourth example of configuration/processing, the configuration and operation of the frame memories 541 to 544 and 565, the motion amount calculator 545, the motion amount memory 546, the super-resolution calculator 548, the signal processor 550, and the displacement correctors 551 to 553 are similar to those described in connection with the third example of configuration/processing. Accordingly, the following description is focused on the operation of the weighted input image adder. The weighted input image adder used in the fourth example of configuration/processing is identified by the reference sign 547$e$.

Figure 37:
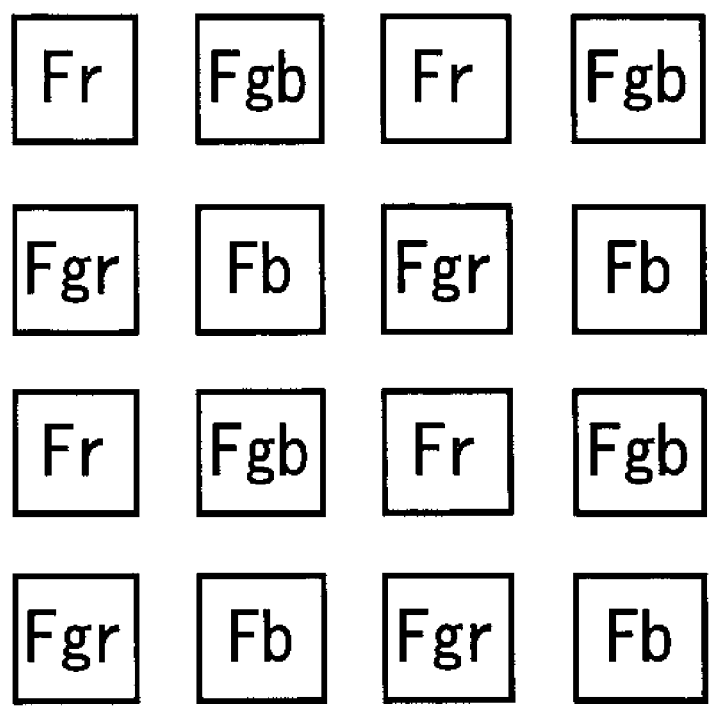
FIG. 37 is a diagram showing an arrangement of the color filter array provided for the light-receiving pixel array forming the image sensor in FIG. 1, according to the second embodiment of the invention.

The fourth example of configuration/processing assumes that the image sensor 1 is a single-panel solid-state image sensing device having color filters arrayed in front of its individual light-receiving pixels. The color filters include red color filters that transmit only the red component of light, green color filters that transmit only the green component of light, and blue color filters that transmit only the blue component of light. It is assumed that the color filters are in a Bayer array as shown in FIG. 37.

Thus the image sensor 1 has two types of column, one in which red color filters Fr and green color filters Fgr are arranged alternately in the vertical direction and the other in which blue color filters Fb and green color filters Fgb are arranged alternately in the vertical direction, the two types of columns being arranged alternately in the horizontal direction. Moreover, between two adjacent columns, the green color filters Fgr arranged in one column and the green color filters Fgb arranged in the other column are arranged along a diagonal line of the image sensor 1. Here, a "diagonal line" means a line that intersects at 45 degrees a line perpendicular to the vertical or horizontal direction of the image sensor 1. Thus there are two types of diagonal line, one running from the lower left to the upper right of the image sensor 1 and the other running from the lower right to the upper left of the image sensor 1. When a group of color filters arranged in a 2×2-pixel region (i.e. a rectangular region 2-pixel wide in both the horizontal and vertical directions) are taken as of interest, this group of color filters contains one each of color filters Fr, Fb, Fgr, and Fgb, with the color filters Fr and Fb arranged along a diagonal line of one type and the color filters Fgr and Fgb arranged along a diagonal line of the other type.

Each light-receiving pixel on the image sensor 1 outputs a signal commensurate with the intensity of the light it receives through the color filter. In a case where a image sensor 1 with color filters in a Bayer array is used, the AFE 2 outputs to the image processor 4$d$ an image signal represented by RGB (R, G, and B) color signals. The RGB color signals are composed of R signals, which are the output signals of the light-receiving pixels at which red color filters Fr are arranged, G signals, which are the output signals of the light-receiving pixels at which green color filters Fgb or Fgr are arranged, and B signals, which are the output signals of the light-receiving pixels at which blue color filters Fb are arranged.

When the image signal represented by RGB color signals is fed to the image processor 4d, according to the method described in connection with the third example of configuration/processing, actual low-resolution images having undergone displacement correction in units of pixels are fed to the weighted input image adder 547e (hereinafter abbreviated to "weighted adder 547e"). Thereafter, in the third example of configuration/processing, based on subpixel-unit amounts of motion, a plurality of actual low-resolution images to be merged together by weighted addition are selected. Depending on the pixel-unit displacements, however, color signals of different colors may coincide at some pixel positions. To cope with this, the operation in the fourth example of configuration/processing proceeds with consideration given to it. Before a description of the operation performed according to pixel-unit displacements, first, with reference to FIG. 38, the configuration and other features of the weighted adder 547e will be described.

Figure 38:
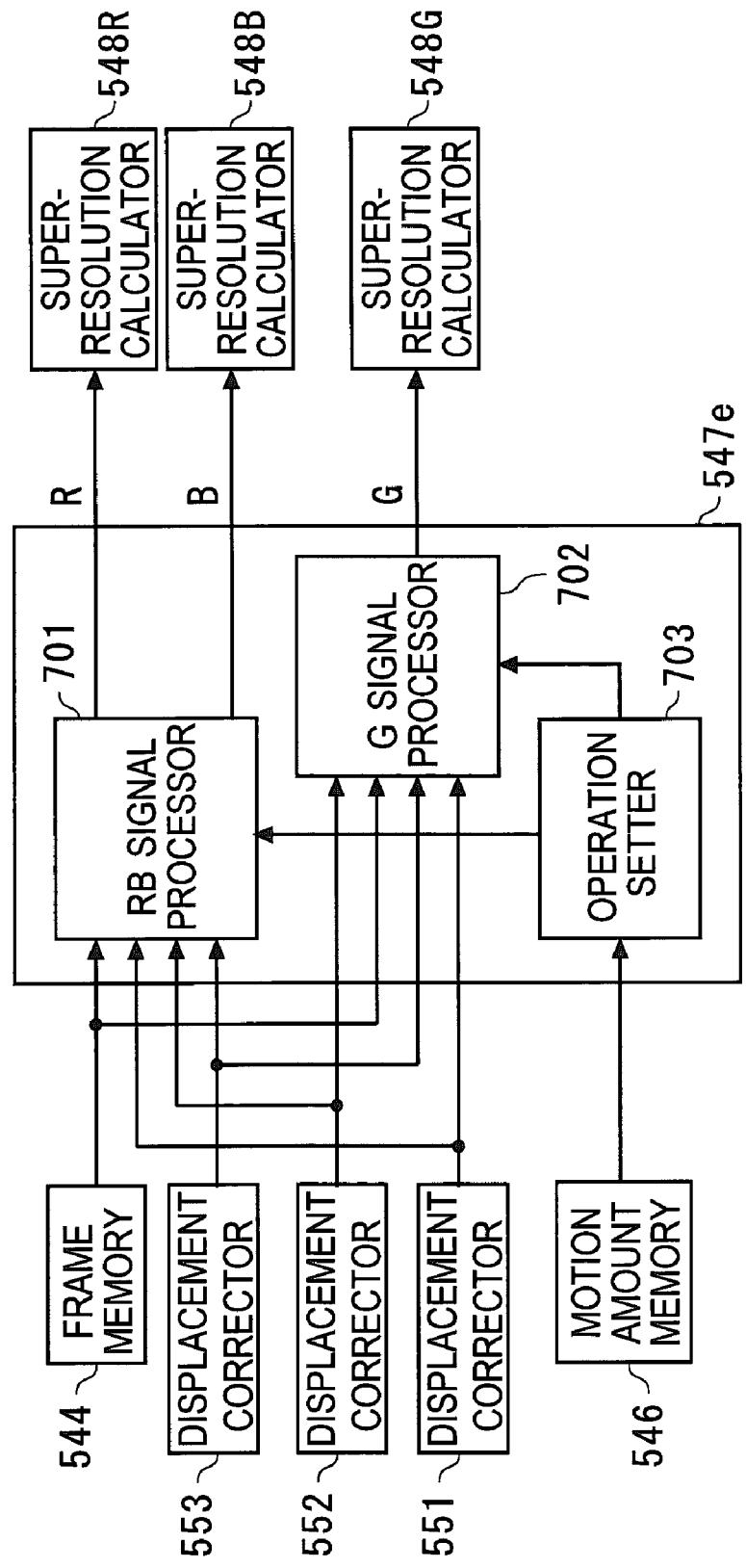
FIG. 38 is a peripheral block diagram of the weighted input image adder, including an example of an internal block diagram of the weighted input image adder, according to the second embodiment of the invention.

FIG. 38 is a peripheral block diagram of the weighted adder 547e, including an internal block diagram of the weighted adder 547e. The weighted adder 547e includes an RB signal processor 701, a G signal processor 702, and an operation setter 703. The RB signal processor 701 receives from the displacement correctors 551, 552, and 553 the R and B signals contained in the image signal representing the displacement-corrected images Fa, Fb, and Fc, and receives from the frame memory 544 the R and B signals contained in the image signal representing the image Fd. The G signal processor 702 receives from the displacement correctors 551, 552, and 553 the G signals contained in the image signal representing the displacement-corrected images Fa, Fb, and Fc, and receives from the frame memory 544 the G signals contained in the image signal representing the image Fd. The operation setter 703 sets based on the amounts of motion stored in the motion amount memory 546 the mode of the operation to be performed by the RB signal processor 701 and the G signal processor 702.

Moreover, in the fourth example of configuration/processing, to perform super-resolution processing separately for different color signals, the super-resolution calculator 548 is formed by three super-resolution calculators 548R, 548G, and 548B. The R signal contained in the image signal of each of a plurality of low-resolution images is output from the RB signal processor 701 to the super-resolution calculator 548R; the B signal contained in the image signal of each of the plurality of low-resolution images is output from the RB signal processor 701 to the super-resolution calculator 548B; and the G signal contained in the image signal of each of the plurality of low-resolution images is output from the G signal processor 702 to the super-resolution calculator 548G. The super-resolution calculators 548R, 548G, and 548B perform super-resolution processing based on the thus fed R, G, and B signals of the plurality of low-resolution images, and generate the R, G, and B signals composing the image signal representing a high-resolution image. By merging together the output signals of the super-resolution calculators 548R, 548G, and 548B, an ultimate high-resolution image is obtained that is to be output to the signal processor 550 in FIG. 36. The operation (super-resolution processing operation) of each of the super-resolution calculators 548R, 548G, and 548B is similar to that of the super-resolution calculator 548 described in connection with the first example of configuration/processing. For example, the internal configuration of each of the super-resolution calculators 548R, 548G, and 548B may be the same as that of the super-resolution calculator 548 shown in FIG. 34.

The operation setter 703 first extracts, from the amounts of motion Mx, My, and Mz calculated from what is stored in the motion amount memory 546, the pixel-unit amounts of motion Mxi, Myi, and Mzi and the subpixel-unit amounts of motion Mxr, Myr, and Mzr, and selects based on the amounts of motion Mxr, Myr, and Mzr a plurality of actual low-resolution images to be subjected to weighted addition (though weighted addition is not always performed). Next, the operation setter 703 checks based on the amounts of motion Mxi, Myi, and Mzi the pixel-unit amounts of motion among the selected plurality of actual low-resolution images to decide whether or not to actually perform weighted addition in the RB signal processor 701 and the G signal processor 702, and controls according to the decision the RB signal processor 701 and the G signal processor 702.

Specifically, first, according to the method described in connection with the third example of configuration/processing, based on the subpixel-unit amounts of motion Mxr, Myr, and Mzr, a plurality of actual low-resolution images to be subjected to weighted addition are selected (though weighted addition is not always performed). Suppose now that the plurality of actual low-resolution images selected consist of actual low-resolution images Fp and Fq. The amount of motion between the images Fp and Fq is represented by Mp, and, of the amount of motion Mp, the pixel-unit amount of motion is represented by Mpi and the subpixel-unit amount of motion is represented by Mpr. The amount of motion Mp equals the amounts of motion Mpi and Mpr merged together. The images Fp and Fq are different two of the images Fa, Fb, Fc, and Fd. Based on the pixel-unit amount of motion Mpi, the operation setter 703 classifies the state of the amount of motion into one of a first, a second, and a third motion amount state, and controls the RB signal processor 701 and the G signal processor 702 according to the state.

(I) First Motion Amount State: First, the first motion amount state will be described. In the first motion amount state, of the horizontal and vertical components of the amount of motion Mpi, one is, in magnitude, equivalent to an odd number of pixels and the other is, in magnitude, equivalent to an even number of pixels (including zero pixels). For example, the state in which the magnitude of the horizontal component of the amount of motion Mpi is equivalent to three pixels of an actual low-resolution image and the magnitude of the vertical component of the amount of motion Mpi is equivalent to two pixels of an actual low-resolution image is classified into the first motion amount state. In the first motion amount state, the pixel positions where the image Fp has R and B signals coincide with the pixel positions where the image Fq has G signals. Thus, between the images Fp and Fq, none of the pixel positions of the R, G, and B signals coincides with one of the same color signals. That is, the pixel positions at which the image Fp has R signals do not coincide with the pixel positions at which the image Fq has R signals, nor do the pixel positions at which the image Fp has G signals coincide with the pixel positions at which the image Fq has G signals, nor do the pixel positions at which the image Fp has B signals coincide with the pixel positions at which the image Fq has B signals.

Accordingly, on finding the amount of motion Mpi to be classifiable into the first motion amount state, the operation setter 703 controls the RB signal processor 701 and the G signal processor 702 so that neither performs weighted addition on the images Fp and Fq. Thus, in this case, the RB signal processor 701 outputs, as the R signals of low-resolution images equivalent to two frames, the R signals of the images Fp and Fq to the super-resolution calculator 548R, and outputs, as the B signals of low-resolution images equivalent to two frames, the B signals of the images Fp and Fq to the super-resolution calculator 548B, and the G signal processor 702 outputs, as the G signals of low-resolution images equivalent to two frames, the G signals of the images Fp and Fq to the super-resolution calculator 548G.

(II) Second Motion Amount State: Next, the second motion amount state will be described. In the second motion amount state, of the horizontal and vertical components of the amount of motion Mpi, both are, in magnitude, equivalent to an even number of pixels (including zero pixels). For example, the state in which the magnitude of the horizontal component of the amount of motion Mpi is equivalent to four pixels of an actual low-resolution image and the magnitude of the vertical component of the amount of motion Mpi is equivalent to two pixels of an actual low-resolution image is classified into the second motion amount state. In the second motion amount state, the pixel positions where the image Fp has R, G, and B signals coincide with the pixel positions where the image Fq has R, G, and B signals. That is, the pixel positions at which the image Fp has R signals coincide with the pixel positions at which the image Fq has R signals, the pixel positions at which the image Fp has G signals coincide with the pixel positions at which the image Fq has G signals, and in addition the pixel positions at which the image Fp has B signals coincide with the pixel positions at which the image Fq has B signals.

Accordingly, on finding the amount of motion Mpi to be classifiable into the second motion amount state, the operation setter 703 controls the RB signal processor 701 and the G signal processor 702 so that both perform weighted addition on the images Fp and Fq. Thus, in this case, the RB signal processor 701 merges together the R signals of the images Fp and Fq by weighted addition to output a low-resolution image corresponding to the resulting merged image—an image equivalent to one frame and composed solely of an R signal—to the super-resolution calculator 548R, and merges together the B signals of the images Fp and Fq by weighted addition to output a low-resolution image corresponding to the resulting merged image—an image equivalent to one frame and composed solely of an B signal—to the super-resolution calculator 548B. Likewise, the G signal processor 702 merges together the G signals of the images Fp and Fq by weighted addition to output a low-resolution image corresponding to the resulting merged image—an image equivalent to one frame and composed solely of an G signal—to the super-resolution calculator 548G.

(III) Third Motion Amount State: Next, the third motion amount state will be described. In the third motion amount state, of the horizontal and vertical components of the amount of motion Mpi, both are, in magnitude, equivalent to an odd number of pixels. For example, the state in which the magnitude of the horizontal component of the amount of motion Mpi is equivalent to three pixels of an actual low-resolution image and the magnitude of the vertical component of the amount of motion Mpi is equivalent to one pixel of an actual low-resolution image is classified into the third motion amount state. In the third motion amount state, the pixel positions where the image Fp has R and B signals coincide with the pixel positions where the image Fq has B and R signals, and in addition the pixel positions where the image Fp has G signals coincide with the pixel positions where the image Fq has G signals. That is, the pixel positions at which the image Fp has R signals coincide with the pixel positions at which the image Fq has B signals, the pixel positions at which the image Fp has B signals coincide with the pixel positions at which the image Fq has R signals, and in addition the pixel positions at which the image Fp has G signals coincide with the pixel positions at which the image Fq has G signals. In this way, in the third motion amount state, of the pixel positions of the R, G, and G signals, only the pixel positions of the G signals coincide with those of the same color signals between the images Fp and Fq.

Accordingly, on finding the amount of motion Mpi to be classifiable into the third motion amount state, the operation setter 703 controls the RB signal processor 701 so that it does not perform weighted addition on the images Fp and Fq, and controls the G signal processor 702 so that it performs weighted addition on the images Fp and Fq. Thus, in this case, the RB signal processor 701 outputs, as the R signals of low-resolution images equivalent to two frames, the R signals of the images Fp and Fq to the super-resolution calculator 548R, and outputs, as the B signals of low-resolution images equivalent to two frames, the B signals of the images Fp and Fq to the super-resolution calculator 548B. On the other hand, the G signal processor 702 merges together the G signals of the images Fp and Fq by weighted addition to output a low-resolution image corresponding to the resulting merged image—an image equivalent to one frame and composed solely of an G signal—to the super-resolution calculator 548G.

In this way, in the fourth example of configuration/processing, the selection of low-resolution images to be subjected to weighted addition is performed separately for different color signals. More specifically, first a plurality of actual low-resolution images judged to be suitable for weighted addition are selected and then whether to actually perform weighted addition on them is controlled separately for different color signals. Accordingly, as a super-resolution calculator, separate super-resolution calculators 548R, 548G, and 548B are provided for different color signals, each performing super-resolution processing according to the number of frames of low-resolution images fed to it from the weighted adder 547*e*.

As described previously in connection with the other examples of configuration/processing, it is also possible, instead of merging together the images Fp and Fq by weighted addition, to simply output one of the images Fp and Fq to the super-resolution calculators. In a case where, without merging, simply one of the images Fp and Fq is output to the super-resolution calculators, however, it does not matter whether the pixel positions of different color signals coincide with those of the same color signals between the images Fp and Fq. Accordingly, once, according to the method described in connection with the third example of configuration/processing, based on the subpixel-unit amounts of motion Mxr, Myr, and Mzr, the images Fp and Fq to be subjected to weighted addition are selected, then, irrespective of the pixel-unit amount of motion Mpi, one of the images Fp and Fq has simply to be output to the super-resolution calculators. That is, the R, G, and B signals of one of the images Fp and Fq have simply to be output from the weighted adder 547*e* to the super-resolution calculators 548R, 548G, and 548B respectively.

Fifth Example of Configuration/Processing

Figure 39:
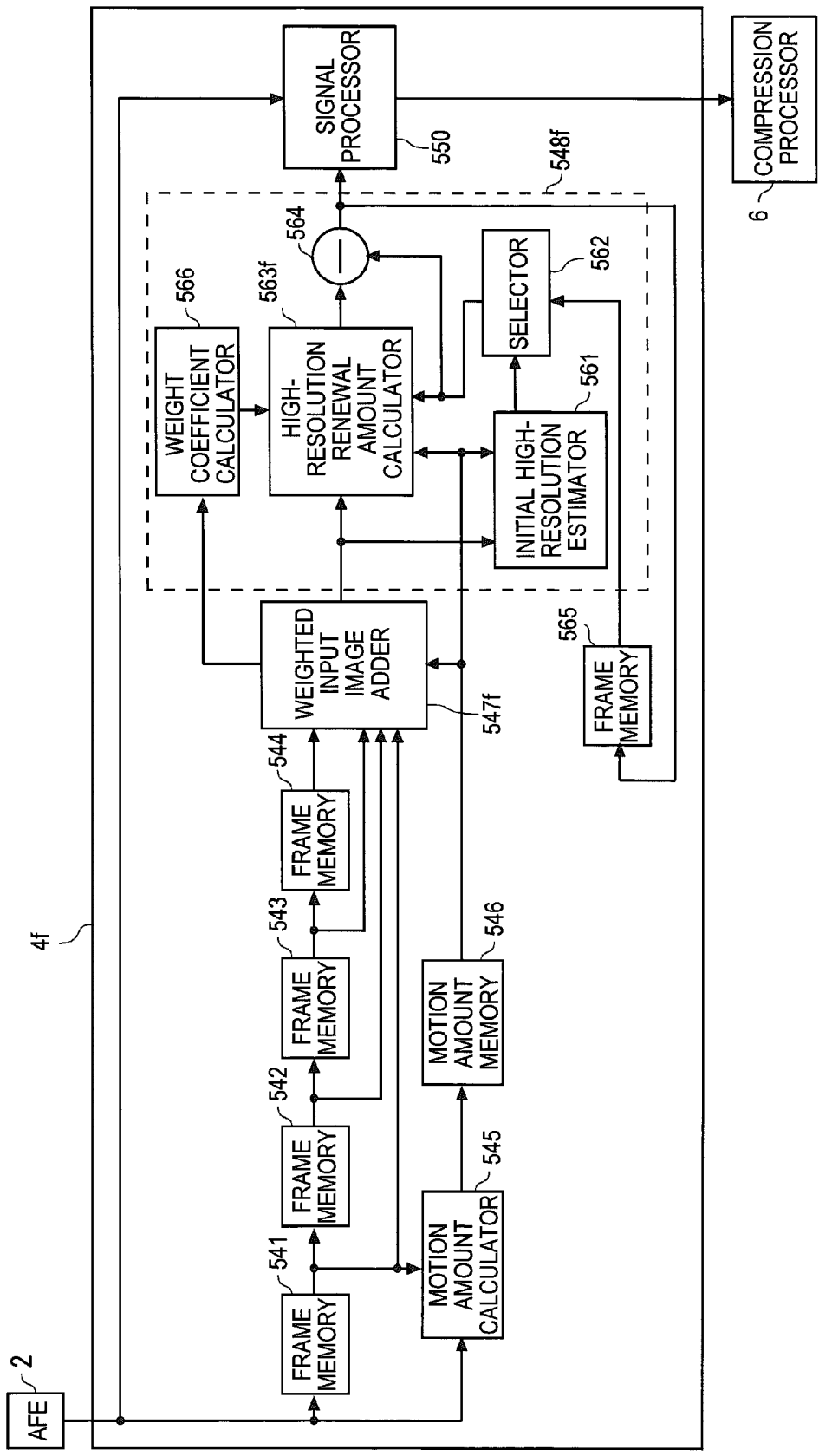
FIG. 39 is a block diagram of part of an image sensing apparatus, including yet another internal block diagram of the image processor in FIG. 1, according to the second embodiment of the invention.

A fifth example of configuration/processing according to the second embodiment will now be described. FIG. 39 is a block diagram of part of the image sensing apparatus of FIG. 1, including an internal block diagram of an image processor 4*f* used as the image processor 4 in FIG. 1. The image processor 4*f* includes parts identified by the reference signs 541 to 546, 547*f*, 548*f*, 550, and 565. In the image processor 4*f*, such parts as appear also in FIG. 31 are identified by common reference signs, and no overlapping description will be repeated.

In the image processor 4f, the operation of the frame memories 541 to 544 and 565, the motion amount calculator 545, the motion amount memory 546, and the signal processor 550 is the same as that of those described in connection with the first example of configuration/processing. Moreover, in the image processor 4f, a weighted input image adder 547f (hereinafter abbreviated to "weighted adder 547f") operates similarly to the weighted adder (547 or 547d) described in connection with the first to third example of configuration/processing; specifically, it performs weighted addition as necessary and feeds three or four actual low-resolution images to a super-resolution calculator 548f. The following description of the operation of the image processor 4f places emphasis on the super-resolution calculator 548f.

The super-resolution calculator 548f includes an estimator (initial high-resolution estimator) 561, a selector 562, a high-resolution renewal amount calculator 563f (hereinafter abbreviated to "renewal amount calculator 563f"), a subtracter 564, and a weight coefficient calculator 566. The operation of the estimator 561, the selector 562, and the subtracter 564 is the same as that of those in the super-resolution calculator 548 in FIG. 31. The weight coefficient calculator 566 calculates the weight coefficients for the low-resolution images fed from the weighted adder 547f to the super-resolution calculator 548f. The weight coefficients calculated by the weight coefficient calculator 566 are fed to the renewal amount calculator 563f, which then performs calculations according to the weight coefficients to achieve super-resolution processing.

The weight coefficients calculated by the weight coefficient calculator 566 are calculated one for each of the low-resolution images fed from the weighted adder 547f to the super-resolution calculator 548f, and, the greater a weight coefficient, the greater the contribution of the corresponding low-resolution image to the high-resolution image. Basically the weight coefficient calculator 566 sets the weight coefficient for each low-resolution image such that the weight coefficient for a low-resolution image obtained by merging using weighted addition is greater than that for another low-resolution image. The calculations according to the weight coefficients will be described in detail later, and, except for these calculations according to the weight coefficients, the renewal amount calculator 563f has functions similar to those of the renewal amount calculator 563 in FIG. 31.

Like the renewal amount calculator 563 in FIG. 31, the renewal amount calculator 563f finds the gradient for the renewal of the high-resolution image. This gradient is represented by $\partial J/\partial X$. The basic formula for calculating the gradient $\partial J/\partial X$ is formula (D1) below. Based on the processing operation by the weighted adder 547f, the weight coefficient calculator 566 calculates the weight coefficients to be used in the calculation of the gradient $\partial J/\partial X$. The symbols Ka, Kb, Kc, and Kd represent the weight coefficients for the images Fa, Fb, Fc, and Fd respectively.

$$\partial J/\partial X = 2 \times [Wa^T \cdot Ka \cdot (Wa \cdot X - Ya) + Wb^T \cdot Kb \cdot (Wb \cdot X - Yb) + \quad (D1)$$
$$Wc^T \cdot Kc \cdot (Wc \cdot X - Yc) + Wd^T \cdot Kd \cdot (Wd \cdot X - Yd) + \gamma C^T \cdot C \cdot X]$$

When the weighted adder 547f does not perform merging by weighted addition, and the four images Fa, Fb, Fc, and Fd are fed to the super-resolution calculator 548f, the weight coefficients calculated by the weight coefficient calculator 566 are all 1. Accordingly, in this case, the renewal amount calculator 563 calculates the gradient $\partial J/\partial X$ according to formula (D1) having Ka=Kb=Kc=Kd=1 substituted in it, and the subtracter 564 renews the high-resolution image Fx by using the gradient $\partial J/\partial X$. When Ka=Kb=Kc=Kd=1, the gradient $\partial J/\partial X$ calculated according to formula (D1) is equal to the gradient $\partial I_A/\partial X$ calculated according to formula (C2) in the first example of configuration/processing.

By contrast, when the weighted adder 547f performs merging by weighted addition, the weight coefficient calculator 566 sets the weight coefficients such that the weight coefficient for a low-resolution image obtained by merging by weighted addition is greater than the weight coefficient for a low-resolution image that has not undergone merging by weighted addition. For example, the former weight coefficient may be set at twice the latter weight coefficient.

For example, in a case where the weighted adder 547f merges together the images Fb and Fc to generate an image Fe and the three images Fa, Fd, and Fe are fed to the super-resolution calculator 548f, the weight coefficient calculator 566 calculates and sets three weight coefficients, namely the weight coefficients Ka, Kd, and Ke for the images Fa, Fd, and Fe respectively. Here, the weight coefficient Ke is set at a value greater than the weight coefficients Ka and Kd, and the sum of the weight coefficients Ka, Kd, and Ke equals 1. For example, if the weight coefficients Ka and Kd are set at an equal value and the weight coefficient Ke is set at twice as great as them, then Ka=Kd=¼ and Ke=½.

Then, when the three images Fa, Fd, and Fe are fed to the super-resolution calculator 548f, the renewal amount calculator 563f, for the calculation of the gradient, multiplies by the weight coefficients Ka, Kd, and Ke the terms (Wa·X−Ya), (Wd·X−Yd), and (We·X−Ye) corresponding to the errors between the actual low-resolution images and the estimated low-resolution images.

Specifically, when the three images Fa, Fd, and Fe are fed to the super-resolution calculator 548f, the gradient $\partial J/\partial X$ is calculated not according to formula (D1) but according to formula (D2) below. This gradient $\partial J/\partial X$ is handled as the amount of renewal for the high-resolution image Fx; the gradient $\partial J/\partial X$ according to formula (D2) is fed to the subtracter 564, which then by use of this gradient $\partial J/\partial X$ renews the high-resolution image Fx.

$$\partial J/\partial X = 2 \times [Wa^T \cdot Ka \cdot (Wa \cdot X - Ya) + \quad (D2)$$
$$Wd^T \cdot Kd \cdot (Wd \cdot X - Yd) + We^T \cdot Ke \cdot (We \cdot X - Ye) + \gamma C^T \cdot C \cdot X]$$

Figure 40:
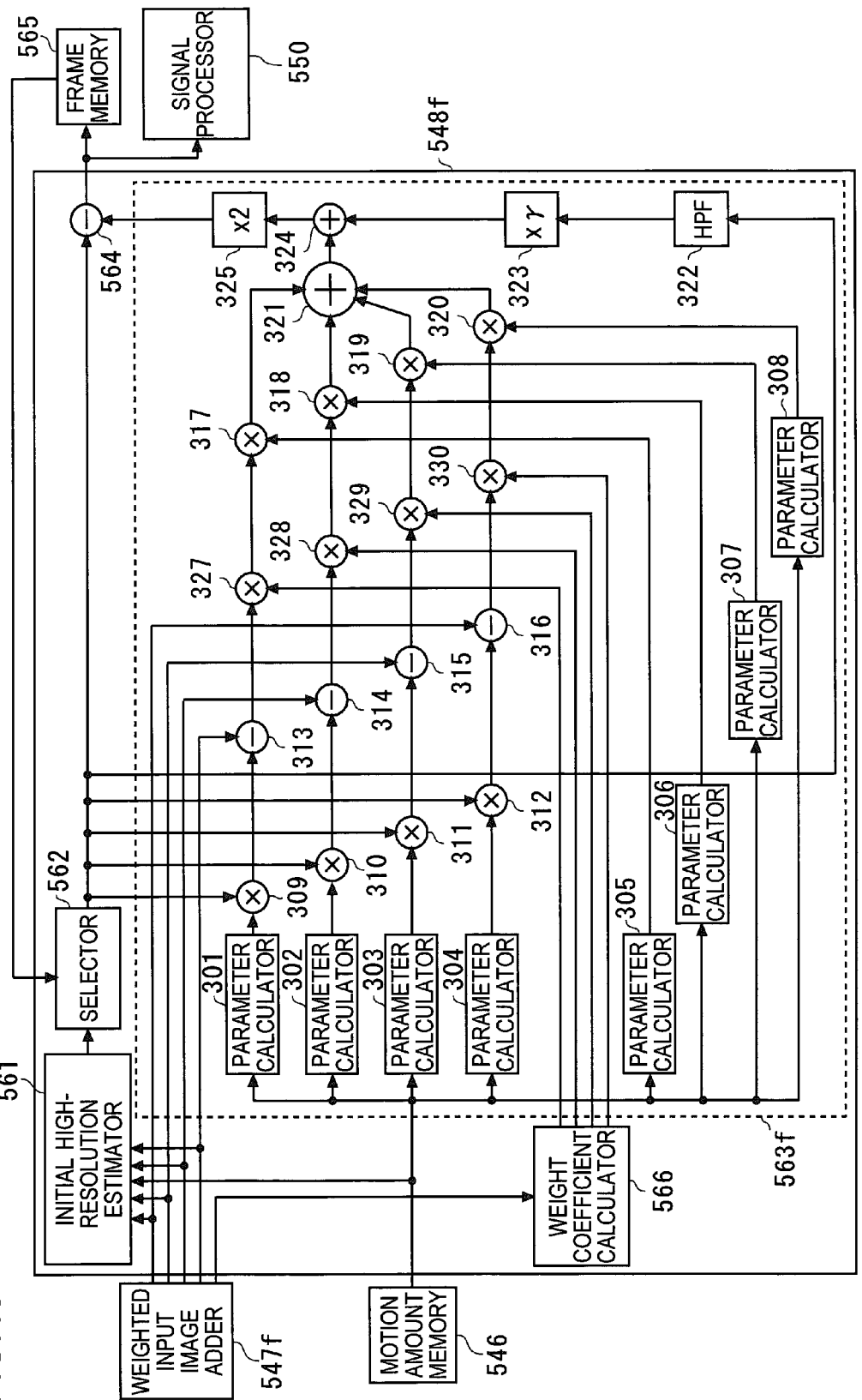
FIG. 40 is a block diagram of part of an image sensing apparatus, including an example of a detailed internal block diagram of the high-resolution renewal amount calculator in FIG. 39, according to the second embodiment of the invention.

FIG. 40 shows an example of the detailed configuration of the super-resolution calculator 548f. FIG. 40 is a block diagram of part of an image sensing apparatus, including an internal block diagram of the super-resolution calculator 548f, and FIG. 40 includes a detailed internal block diagram of the renewal amount calculator 563f. In the super-resolution calculator 548f in FIG. 40, such parts as appear also in FIG. 34 are identified by common reference signs, and no overlapping description will be repeated. Of the parts shown in FIG. 40, those which appear also in FIG. 34 operate similarly as described in connection with the first example of configuration/processing.

The super-resolution calculator 548f includes, in addition to the configuration of the super-resolution calculator 548 shown in FIG. 34, a weight coefficient calculator 566 and multipliers 327 to 330. The multipliers 327 to 330 multiply the output values of the subtracters 313 to 316, respectively, by the weight coefficients fed from the weight coefficient calculator 566, and outputs the results of the multiplication to the multipliers 317 to 320.

When the super-resolution calculator 548f configured as shown in FIG. 40 receives from the weighted adder 547f the four images Fa to Fd, the weight coefficient calculator 566 sets all the weight coefficients Ka to Kd at 1, and these weight coefficients Ka to Kd are fed to the multipliers 327 to 330 respectively. Then, as a result of the multipliers 309 to 312, 317 to 320, and 327 to 330 and the subtracters 313 to 316 all operating, the gradient ∂J/∂X is calculated according to formula (D1) having Ka=Kb=Kc=Kd=1 substituted in it.

By contrast, when the weighted adder 547f merges together the images Fc and Fd to generate an image Fe and the weighted adder 547f feeds the three images Fa, Fb, and Fe to the super-resolution calculator 548f, the operation of the parameter calculators 304 and 308, the multipliers 312, 320, and 330, and the subtracter 316 is stopped. In this case, the weight coefficients Ka, Kb, and Ke are calculated by the weight coefficient calculator 566, and are fed to the multipliers 327, 328, and 329 respectively. This causes the multipliers 309 to 311, 317 to 319, and 327 to 329 and the subtracters 313 to 315 to operate to calculate a gradient ∂J/∂X given by the formula "∂J/∂X=2×[$Wa^T$·Ka·(Wa·X−Ya)+$Wb^T$·Kb·(Wb·X−Yb)+$We^T$·Ke·(We·X−Ye)+$\gamma C^T$·C·X]".

Likewise, when the weighted adder 547f merges together the images Fb and Fc to generate an image Fe and the weighted adder 547f feeds the three images Fa, Fd, and Fe to the super-resolution calculator 548f, the operation of the parameter calculators 303 and 307, the multipliers 311, 319, and 329, and the subtracter 315 is stopped. In this case, the weight coefficients Ka, Kd, and Ke are calculated by the weight coefficient calculator 566, and are fed to the multipliers 327, 330, and 328 respectively. Thus a gradient ∂J/∂X is calculated that is given by the formula "∂J/∂X=2×[$Wa^T$·Ka·(Wa·X−Ya)+$Wd^T$·Kd·(Wd·X−Yd)+$We^T$·Ke·(We·X−Ye)+$\gamma C^T$·C·X]".

Likewise, when the weighted adder 547f merges together the images Fa and Fb to generate an image Fe and the weighted adder 547f feeds the three images Fc, Fd, and Fe to the super-resolution calculator 548f, the operation of the parameter calculators 302 and 306, the multipliers 310, 318, and 328, and the subtracter 314 is stopped. In this case, the weight coefficients Kc, Kd, and Ke are calculated by the weight coefficient calculator 566, and are fed to the multipliers 329, 330, and 327 respectively. Thus a gradient ∂J/∂X is calculated that is given by the formula "∂J/∂X=2×[$Wc^T$·Kc·(Wc·X−Yc)+$Wd^T$·Kd·(Wd·X−Yd)+$We^T$·Ke·(We·X−Ye)+$\gamma C^T$·C·X]".

Since the low-resolution image Fe is obtained by merging together two low-resolution images by weighted addition, its S/N ratio is higher than an unmerged low-resolution image. With this taken into consideration, the weight coefficient Ke for the image Fe is set at a relatively high value. This improves the S/N ratio of the high-resolution image obtained by super-resolution processing.

In the example described above, whether nor not an image of interest is one merged by weighted addition is used as a criterion for setting the weight coefficient, and according to that criterion the weight coefficient for the image of interest is set. This, however, is not meant to limit in any way the criterion for the setting of the weight coefficient.

For example, the weight coefficient for the low-resolution image (in this example, the image Fd) taken as the datum image (datum frame) may be set greater than that for another low-resolution image.

For another example, with attention paid to the amounts of motion (Mx, My, and Mz) relative to the low-resolution image taken as the datum image (datum frame), the weight coefficients may be set such that, the smaller an amount of motion, the greater the corresponding weight coefficient. In other words, the weight coefficient for the low-resolution image corresponding to, of the amounts of motion Mx, My, and Mz, a relatively small one may be set greater than that for the low-resolution image corresponding to a relatively great one of them. Specifically, for example, in a case where the magnitude of the amount of motion Mx is smaller than that of the amount of motion My, the weight coefficient Kc may be set at a value grater than the weight coefficient Kb (see FIG. 32B).

For another example, with respect to the acquisition time of the low-resolution image (in this example, the image Fd) taken as the datum image (datum frame), the closer the acquisition time of a low-resolution image, the greater the corresponding weight coefficient may be set. Specifically, in a case where, as described above, the image Fd is shot first and then the images Fc, Fb, and Fa are shot in this order, the weight coefficients for them may be set such that Kc>Kb>Ka.

Any two or more of these criteria for setting the weight coefficients may be combined in the actual setting of the weight coefficients.

In the fifth example of configuration/processing, it is also possible to perform pixel-unit displacement correction among low-resolution images as described in connection with the third example of configuration/processing and then, after such displacement correction, decide whether or not to perform weighted addition. In this case, if the image sensor 1 is a single-panel solid-state image sensor with a Bayer array as described in connection with the fourth example of configuration/processing, the selection of low-resolution images to be subjected to weighted addition is performed separately for different color signals, and separate super-resolution calculators are provided for different color signals. Specifically, the super-resolution calculators 548R, 548G, and 548B shown in FIG. 38 are each configured as a super-resolution calculator incorporating the weight coefficient calculator 566.

Although the description of the third to fifth examples of configuration/processing deals with examples in which four actual low-resolution images Fa to Fd are fed to the weighted adder and three or four actual low-resolution images are fed to the super-resolution calculator, these specific values may be modified as described in connection with the first and second examples of configuration/processing. So long as actual low-resolution images to be subjected to weighted addition can be selected according to any of the methods of selection described above in connection with the different examples of configuration/processing, the image processor (4c, 4d, or 4f) may be configured as one that handles $L_A$ actual low-resolution images. Specifically, it is possible to feed chronologically ordered $L_A$ actual low-resolution images to the weighted adder (547, 547d, 547e, or 547f), then feed $L_B$ actual low-resolution images from the weighted adder (547, 547d, 547e, or 547f) to the super-resolution calculator (548 or 548f), and generate one high-resolution image based on the $L_B$ actual low-resolution images (the super-resolution calculator may include the super-resolution calculators 548R, 548G, and 548B). Here, $L_A$ represents an integer of 3 or more, and $L_B$ represents an integer of 2 or more but $L_A$ or less.

As described in connection with the first embodiment, an image processing method according to the invention may be applied not only to image sensing apparatuses but also to display apparatuses, as exemplified by liquid crystal displays and plasma televisions, that perform digital processing of images. For example, as a display apparatus provided with an image processing apparatus (corresponding to an image processor) that performs an image processing method according to the invention, it is possible to form the display apparatus shown in FIG. 25.

The overall operation of the display apparatus of FIG. 25 is similar to that described in connection with the first embodiment, and therefore no overlapping description will be repeated. The image processor (4c, 4d, or 4f) described in connection with the second embodiment may be used as the image processor 4 in FIG. 25.

When an operation requesting image resolution enhancement is made on the operated portion 15, according to the method described above in connection with the second embodiment, the image processor 4 of the second embodiment shown in FIG. 25 generates from $L_A$ low-resolution images fed from the decompression processor 8 $L_B$ low-resolution images, and then executes super-resolution processing on the $L_B$ low-resolution images to generate one high-resolution image.

In the image sensing apparatus of FIG. 1 or in the display apparatus of FIG. 25, the images on which the image processor 4 performs super-resolution processing may be moving images or still images. The description above of examples of operation mainly discusses the operation performed when an image signal of a moving image is fed to the image processor 4.

Third Embodiment

The first and second embodiments described above may be practiced in combination. A combined practice of the first and second embodiments will be described below as a third embodiment of the invention. An overall block diagram showing the internal configuration of an image sensing apparatus according to the third embodiment is the same as that shown in FIG. 1, and the image sensing apparatus according to the third embodiment includes parts identified by the reference signs 1 to 17 and 20. In the third embodiment, the functions and configuration of the individual parts of the image sensing apparatus are, unless otherwise stated, the same as those described in connection with the first or second embodiment.

Figure 41:
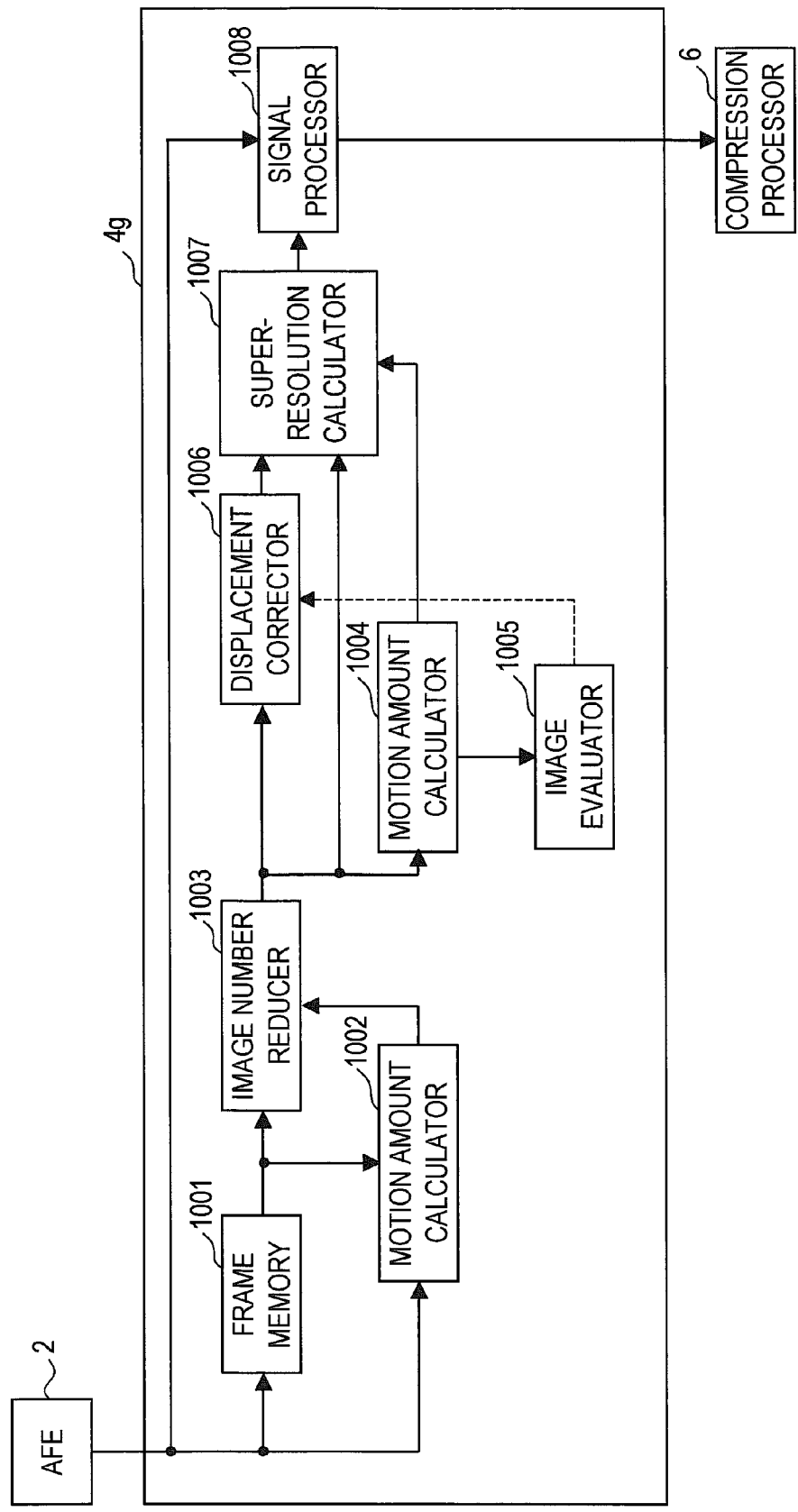
FIG. 41 is a block diagram of part of an image sensing apparatus, including an internal block diagram of the image processor in FIG. 1, according to a third embodiment of the invention.

FIG. 41 is a block diagram of part of the image sensing apparatus of FIG. 1, including an internal block diagram of the image processor 4g used as the image processor 4 in FIG. 1. The image processor 4g includes parts identified by the reference signs 1001 to 1008. In the image processor 4g, according to the method described in connection with the second embodiment, based on the amounts of motion among actual low-resolution images, the number of actual low-resolution images used in super-resolution processing is reduced. Thereafter, according to the method described in connection with the first embodiment (the selection optimization processing described previously), out of the thus reduced number of actual low-resolution images, those suitable for super-resolution processing are selected.

A frame memory 1001 has a function similar to that of the frame memories 541 to 544 in FIG. 31; specifically, the frame memory 1001 temporarily stores actual low-resolution images equivalent to a plurality of frames fed from the AFE 2. A motion amount calculator 1002 has a function similar to that of the motion amount calculator 545 in FIG. 31; specifically, while consulting what is stored in the frame memory 1001, the motion amount calculator 1002 calculates the amounts of motion among adjacent frames fed from the AFE 2.

An image number reducer 1003 has a function similar to that of the weighted adder 547, 547d, 547e, or 547f (see FIG. 31 etc.); specifically, based on the amounts of motion calculated by the motion amount calculator 1002, the image number reducer 1003 reduces the number of actual low-resolution images received, and outputs the thus reduced number of actual low-resolution images to the succeeding stage. The reduction here is performed according to the method described in connection with the second embodiment. Thus, the reduction is performed only when a particular condition is fulfilled.

The number of actual low-resolution images input to the image number reducer 1003 is represented by $N_A$, and the number of actual low-resolution images output from the image number reducer 1003 based on the $N_A$ actual low-resolution images is represented by $N_B$. Of the $N_B$ actual low-resolution images output from the image number reducer 1003, one is taken as the datum frame for super-resolution processing, and $N_C$ are taken as consulted frames for super-resolution processing. $N_A$ is an integer of 4 or more, and $N_B$ is an integer of 3 or more but $N_A$ or less. When the image number reducer 1003 reduces the number of images by one or more, then "$(N_A-1) \geq N_B$" and $N_C$ is an integer smaller than $(N_B-1)$.

It may be imagined that, between the output part of the image number reducer 1003 at one end and a motion amount calculator 1004, a displacement corrector 1006, and a super-resolution calculator 1007 at the other, there is provided an image input portion (unillustrated) that receives the $N_B$ actual low-resolution images. This image input portion may be thought of as being formed by an unillustrated frame memory that temporarily stores the $N_B$ actual low-resolution images, and this unillustrated frame memory may be included in the frame memory 1001.

A motion amount calculator 1004 has a function similar to that of the motion amount calculator 42 in FIG. 14; specifically, the motion amount calculator 1004 calculates the amount of motion between every different combination of two of the $N_B$ actual low-resolution images output from the image number reducer 1003. An image evaluator 1005 has a function similar to that of the image evaluator 43 in FIG. 14; specifically, based on the amounts of motion calculated by the motion amount calculator 1004, the image evaluator 1005 selects, out of the $N_B$ actual low-resolution images output from the image number reducer 1003, those to be taken as consulted frames. A displacement corrector 1006 has a function similar to that of the displacement corrector 44 in FIG. 14; specifically, according to the amounts of motion between the datum frame and the consulted frames based on the results of the calculation by the motion amount calculator 1004, the displacement corrector 1006 corrects the displacements between the datum frame and the consulted frames, and feeds the displacement-corrected datum frame and consulted frames to a super-resolution calculator 1007.

The super-resolution calculator 1007 has a function similar to that of the super-resolution calculator described in connection with the first or second embodiment. The super-resolution calculator 45, 45a, or 45b in FIG. 14, 15, or 16 may be used as the super-resolution calculator 1007. Alternatively, the super-resolution calculator 548 in FIG. 31, 34, or 36 may be used as the super-resolution calculator 1007. Alternatively, the super-resolution calculator 1007 may be formed with the super-resolution calculators 548R, 548G, and 548B in FIG. 38 (in this case, the image number reducer 1003 is preferably formed like the weighted adder 547e in FIG. 38). Alternatively, the super-resolution calculator 1007 may be formed with the super-resolution calculator 548f in FIG. 39 or 40.

A signal processor 1008 has a function similar to that of the signal processor 50 or 550 described in connection with the first or second embodiment; specifically, from the image signal representing the high-resolution image obtained by the super-resolution processing by the super-resolution calculator 1007, or from the image signal fed directly from the AFE 2, the signal processor 1008 generates luminance and color-difference signals.

For the sake of concreteness, it is here assumed that four actual low-resolution images Fa, Fb, Fc, and Fd are fed to the image number reducer 1003. It is also assumed that, as described in connection with the second embodiment, of those images, the image Fd is shot first, and after the shooting of the image Fd, the images Fc, Fb, and Fa are shot in this order. Moreover, the symbols used in the second embodiment are used also in the third embodiment. Furthermore, it is assumed that the image number reducer 1003 reduces the number of actual low-resolution images from four to three, and that super-resolution processing is performed based on one datum frame and one consulted frame selected out of those three actual low-resolution images.

On these assumptions, the frame memory 1001 temporarily stores the images Fa, Fb, Fc, and Fd, and, while consulting what is stored there, the motion amount calculator 1002 calculates the amounts of motion M1, M2, and M3 (see FIG. 32A). Moreover, the motion amount calculator 1002 or the image number reducer 1003 calculates, from the amounts of motion M1, M2, and M3, amounts of motion Mx, My, and Mz (see FIG. 32B). Based on the amounts of motion Mx, My, and Mz (and the amounts of motion M1, M2, and M3), the image number reducer 1003 selects, out of the actual low-resolution images Fa, Fb, Fc, and Fd, two to be merged together by weighted addition. The method of the selection here is the same as that described in connection with the second embodiment. If, as in case 1 described in connection with the second embodiment (see FIG. 33A), there is no two actual low-resolution images to be merged together by weighted addition, the four images Fa, Fb, Fc, and Fd are output from the image number reducer 1003.

For the sake of concreteness, suppose now that, as two actual low-resolution images to be merged together by weighted addition, the images Fb and Fc are selected, and that the images Fb and Fc are merged together by weighted addition to generate the image Fe. In this case, based on the images Fa to Fd, the image number reducer 1003 outputs the three images Fa, Fd, and Fe. As described in connection with the second embodiment, it is also possible, without performing weighted addition, to output the image Fb or Fc as the image Fe from the image number reducer 1003.

Since the reduction of the number of images has been performed with the image Fd taken as the datum image, the actual low-resolution image Fd is handled as the datum frame in the super-resolution processing to be performed by the super-resolution calculator 1007. When the image number reducer 1003 outputs the three images Fa, Fd, and Fe, the motion amount calculator 1004 calculates, relative to the image Fd as the datum frame, the amounts of motion of the other images; specifically it calculates the amount of motion $M_{DA}$ between the images Fd and Fa and the amount of motion $M_{DE}$ between the images Fd and Fe. For the sake of convenience, in FIG. 41, the motion amount calculator 1002 and the motion amount calculator 1004 are provided separately within the image processor 4g; instead, these two may be integrated into a single motion amount calculator, in which case, from the amounts of motion M1 to M3 calculated by the motion amount calculator 1002, the amounts of motion $M_{DA}$ and amount of motion $M_{DE}$ can be found. Since $M_{DA}$=M1+M2+M3, if the amounts of motion Mx and My are equal, then the amount of motion $M_{DE}$ is equal to amount of motion M1 (see FIG. 33C).

Based on the amounts of motion $M_{DA}$ and $M_{DE}$, the image evaluator 1005 executes the selection optimization processing described in connection with the first embodiment to select, as a consulted frame, one of the images Fa and Fe. As the selection optimization processing here, any of the first to fifth examples of selection optimization processing described in connection with the first embodiment may be used. The images F1, F2, and F3 mentioned in connection with the first to fifth examples of selection optimization processing correspond to the images Fd, Fe, and Fa respectively, and the amounts of motion $M_{12}$ and $M_{13}$ mentioned in connection with the first to fifth examples of selection optimization processing corresponds to the amounts of motion $M_{DE}$ and $M_{DA}$ respectively.

Based on the result of the selection of the consulted frame by the image evaluator 1005 and based on the amount of motion ($M_{DE}$ or $M_{DA}$) between the selected consulted frame and the datum frame, the displacement corrector 1006 corrects the displacement between the datum frame and the consulted frame, and feeds the displacement-corrected datum frame and consulted frame to the super-resolution calculator 1007. The super-resolution calculator 1007 executes super-resolution processing by use of the displacement-corrected datum frame and consulted frame, and thereby generates one high-resolution image.

In a case where the super-resolution calculator 548f in FIG. 39 or 40 is used as the super-resolution calculator 1007 in FIG. 41, the weight coefficient calculator 566 is provided within the super-resolution calculator 1007 (see FIG. 39 or 40). The weight coefficient calculator 566 within the super-resolution calculator 1007 sets a weight coefficient for each of the datum frame and any consulted frame according to the method described in connection with the fifth example of configuration/processing. Accordingly, the weight coefficient for a low-resolution image obtained by the merging by weighted addition by the image number reducer 1003 is made greater than the weight coefficient for an unmerged low-resolution image.

For example, in a case where, out of the images Fe and Fa, the image Fe is selected as a consulted frame, a weight coefficient Ke is set for the image Fe as the consulted frame, a weight coefficient Kd is set for the image Fd as the datum frame, and in addition Ke>Kd. In this case, in the renewal amount calculator 563f provided in the super-resolution calculator 1007 (see FIG. 39), a gradient $\partial J/\partial X$ is calculated that is given by the formula "$\partial J/\partial X=2\times[Wd^T\cdot Kd\cdot(Wd\cdot X-Yd)+We^T\cdot Ke\cdot(We\cdot X-Ye)+\gamma C^{T*}\cdot C\cdot X]$", and by use of this gradient $\partial J/\partial X$, the subtracter 564 provided in the super-resolution calculator 1007 renews the high-resolution image Fxn.

Or, for another example, in a case where, out of the images Fe and Fa, the image Fa is selected as a consulted frame, a weight coefficient Ka is set for the image Fa as the consulted frame, a weight coefficient Kd is set for the image Fd as the datum frame, and in addition Ka=Kd (which may instead be Ka<Kd). In this case, in the renewal amount calculator 563f provided in the super-resolution calculator 1007 (see FIG. 39), a gradient $\partial J/\partial X$ is calculated that is given by the formula "$\partial J/\partial X=2\times[Wa^T\cdot Ka\cdot(Wa\cdot X-Ya)+Wd^T\cdot Kd\cdot(Wd\cdot X-Yd)+\gamma C^T\cdot C\cdot X]$", and by use of this gradient $\partial J/\partial X$, the subtracter 564 provided in the super-resolution calculator 1007 renews the high-resolution image Fxn.

In a case where the super-resolution calculator 548f in FIG. 39 or 40 is used as the super-resolution calculator 1007 in FIG. 41, assume, differently from the assumptions made above, that the image number reducer 1003 reduces the number of actual low-resolution images from five to four by merging by weighted addition, and that super-resolution processing is performed based on one datum frame and two consulted frames selected out of those four actual low-resolution images. Moreover, consider a case where the low-resolution image as the one datum frame is an image $F_1$, the two low-resolution images as the consulted frames are images $F_2$ and $F_3$, and the image $F_2$ is obtained as a result of the image number reducer 1003 merging together two low-resolution images (neither of the images $F_1$ and $F_3$ results from the merging together of two low-resolution images). In this case, the weight coefficient calculator 566 within the super-resolution calculator 1007 sets a weight coefficient $K_{F1}$ for the image F1, a weight coefficient $K_{F2}$ for the image $F_2$, and a weight coefficient $K_{F3}$ for the image $F_3$. Here, the setting is performed such that at least the inequality "$K_{F2} > K_{F3}$" holds. The setting may be performed such that in addition the inequality "$K_{F2} > K_{F1}$" holds. By use of the weight coefficients $K_{F1}$ to $K_{F3}$, the renewal amount calculator 563f provided in the super-resolution calculator 1007 calculates a gradient as the amount of renewal for the high-resolution image.

It is possible to form a display apparatus to which the technology described in connection with the third embodiment is applied. The block diagram of a display apparatus according to the third embodiment is similar to that shown in FIG. 25. The overall operation of a display apparatus according to the third embodiment is similar to that described in connection with the first embodiment. The difference is that the image processor 4g in FIG. 41 is used as the image processor 4 in FIG. 25.

The present invention finds applications in electronic appliances (for example, image sensing apparatuses and display apparatuses) provided with an image processing apparatus that performs image resolution enhancement by super-resolution processing.

What is claimed is:

1. An image processing apparatus comprising:
   an image input portion receiving (N+1) low-resolution images (where N is an integer of 2 or more);
   a motion amount detector taking one of the (N+1) low-resolution images as a datum image and detecting a amount of motion between the low-resolution image taken as the datum image and each of the other N low-resolution images;
   an image evaluator selecting, based on the detected amounts of motion, M (where M is an integer of 1 or more fulfilling N>M) out of the N low-resolution images each as a consulted image; and
   a resolution enhancer producing, based on the detected amounts of motion, the datum image, and the M consulted images, a high-resolution image having higher resolution than the low-resolution images,
   wherein
   the image evaluator takes each of the N low-resolution images as an evaluated image, and
   when an image coordinate system common to the datum image and the evaluated images is called a common coordinate system and, based on the detected amounts of motion, the datum image and the evaluated images are arranged in the common coordinate system,
   the image evaluator
      sets, based on a pixel position on the datum image in the common coordinate system, a datum position in the common coordinate system,
      evaluates, for each evaluated image, a distance between the datum position and a pixel position on said each evaluated image, and
      selects, as the consulted image, an evaluated image corresponding to a relatively small distance while excluding, from the M consulted images, an evaluated image corresponding to a relatively great distance.

2. The image processing apparatus according to claim 1, wherein
   the image evaluator sets the datum position at a center position of four pixels on the datum image, and
   the four pixels are formed by two pairs of two pixels, the two pixels of each pair being adjacent to each other in a vertical direction on the datum image, the two pairs being adjacent to each other in a horizontal direction.

3. The image processing apparatus according to claim 1, wherein
   the high-resolution image is generated by adding an interpolated pixel to pixels of the datum image, and
   the image evaluator sets the datum position at a position of the interpolated pixel.

4. The image processing apparatus according to claim 3, wherein
   when a difference between the distances evaluated for a plurality of the evaluated images is less than or equal to a predetermined threshold value,
   the image evaluator
      sets a second datum position at a center position of four pixels on the datum image,
      finds, for each of the plurality of the evaluated images, a distance between the second datum position and a pixel position on said each evaluated image as a second distance, and
      performs selection operation such that, of the plurality of the evaluated images, any corresponding to a relatively small second distance is with higher preference selected as the consulted image than any corresponding to a relatively great second distance, and
   the four pixels are formed by two pairs of two pixels, the two pixels of each pair being adjacent to each other in a vertical direction on the datum image, the two pairs being adjacent to each other in a horizontal direction.

5. The image processing apparatus according to claim 1, wherein
   when a difference between the distances evaluated for a plurality of the evaluated images is less than or equal to a predetermined threshold value,
   the image evaluator
      finds, for each of the plurality of the evaluated images, a distance in the vertical direction between the datum position and a pixel position on said each evaluated image, and
      performs selection operation such that, of the plurality of the evaluated images, any corresponding to a relatively small distance in the vertical direction is with higher preference selected as the consulted image than any corresponding to a relatively great distance in the vertical direction.

6. The image processing apparatus according to claim 1, wherein
   the (N+1) low-resolution images are acquired at different times,
   the motion amount detector detects, as an adjacent frame motion amount, an amount of motion between every two temporally adjacent low-resolution images among the (N+1) low-resolution images, and
   when a difference between the distances evaluated for a plurality of the evaluated images is less than or equal to a predetermined threshold value, the image evaluator performs selection operation such that, of the plurality of the evaluated images, any corresponding to a relatively small adjacent frame motion amount is with higher preference selected as the consulted image than any corresponding to a relatively great adjacent frame motion amount.

7. The image processing apparatus according to claim 1, wherein
when a resolution enhancement factor by which the high-resolution image is generated from the low-resolution images is greater in a first direction than in a second direction perpendicular to the first direction, and in addition a difference between the distances evaluated for a plurality of the evaluated images is less than or equal to a predetermined threshold value,
the image evaluator
finds, for each of the plurality of the evaluated images, a distance in the first direction between the datum position and a pixel position on said each evaluated image, and
performs selection operation such that, of the plurality of the evaluated images, any corresponding to a relatively small distance in the first direction is with higher preference selected as the consulted image than any corresponding to a relatively great distance in the first direction.

8. The image processing apparatus according to claim 1, wherein
the distance evaluated for one evaluated image of interest is a distance, on said one evaluated image of interest, between a position of a pixel closest to the datum position and the datum position.

9. The image processing apparatus according to claim 1, wherein
the image processing apparatus receives L low-resolution images (where L is an integer greater than (N+1)), and
the image processing apparatus further comprises:
a second motion amount detector
taking one of the L low-resolution images as the datum image, and
detecting, as a second motion amount, an amount of motion between the low-resolution image as the datum image and each of the other (L−1) low-resolution images; and
an image number reducer
generating, based on the second motion amounts, the (N+1) low-resolution images from the L low-resolution images, and
feeding the thus generated (N+1) low-resolution images to the image input portion.

10. The image processing apparatus according to claim 9, wherein
when a plurality of the second motion amounts detected for a plurality of low-resolution images among the (L−1) low-resolution images are substantially equal,
the image number reducer
generates one low-resolution image by merging together, or selecting one out of, said plurality of low-resolution images, and
generates the (N+1) low-resolution images to be fed to the image input portion by selecting said one low-resolution image as one of the (N+1) low-resolution images while excluding said plurality of low-resolution images from the (N+1) low-resolution images.

11. The image processing apparatus according to claim 9, wherein the second motion amount detector detects, as an adjacent frame motion amount, an amount of motion between every two temporally adjacent low-resolution images among the L low-resolution images, and
when a plurality of the second motion amounts detected for a plurality of low-resolution images among the (L−1) low-resolution images are substantially equal, and in addition a plurality of the adjacent frame motion amounts detected for said plurality of low-resolution images are substantially equal,
the image number reducer
generates one low-resolution image by merging together, or selecting one out of, said plurality of low-resolution images, and
generates the (N+1) low-resolution images to be fed to the image input portion by selecting said one low-resolution image as one of the (N+1) low-resolution images while excluding said plurality of low-resolution images from the (N+1) low-resolution images.

12. The image processing apparatus according to claim 9, wherein
the second motion amounts have a higher resolution than a pixel interval of the low-resolution images, and are each composed of a pixel-unit motion amount component and a subpixel-unit motion amount component, and
the image number reducer generates the (N+1) low-resolution images from the L low-resolution images based on the subpixel-unit motion amount components.

13. The image processing apparatus according to claim 9, wherein
the low-resolution images are each an image composed of a plurality of types of color signal, and
the image number reducer and the resolution enhancer each perform operation thereof separately for each type of color signal.

14. The image processing apparatus according to claim 9, wherein
when a plurality of the second motion amounts detected for a plurality of low-resolution images among the (L−1) low-resolution images are substantially equal,
the image number reducer
generates one low-resolution image as a merged low-resolution image by merging together said plurality of low-resolution images, and
generates the (N+1) low-resolution images to be fed to the image input portion by selecting said merged low-resolution image as one of the (N+1) low-resolution images while excluding said plurality of low-resolution images from the (N+1) low-resolution images,
the resolution enhancer
comprises a weight coefficient setter setting a weight coefficient for each of the datum image and the M consulted images and
generates the high-resolution image according to the thus set weight coefficients, and
when the (M+1) weight coefficients set by the weight coefficient setter include a weight coefficient for the merged low-resolution image, the weight coefficient setter makes the weight coefficient for the merged low-resolution image different from the other weight coefficients.

15. An electronic appliance comprising an image processing apparatus, the electronic appliance acquiring (N+1) images by input from outside, or by shooting, and feeding an image signal of the (N+1) images to the image processing apparatus, wherein the image processing apparatus is the image processing apparatus according to claim 1, and the image input portion of the image processing apparatus receives the (N+1) images as the (N+1) low-resolution images.

16. An electronic appliance comprising an image processing apparatus, the electronic appliance acquiring L images by input from outside, or by shooting, and feeding an image signal of the L images to the image processing apparatus, wherein the image processing apparatus is the image processing apparatus according to claim 9, and the image processing apparatus receives the L images as the L low-resolution images.

17. An image processing method comprising:

an image input step of receiving (N+1) low-resolution images (where N is an integer of 2 or more);

a motion amount detection step of taking one of the (N+1) low-resolution images as a datum image and detecting a amount of motion between the low-resolution image taken as the datum image and each of the other N low-resolution images;

an image evaluation step of selecting, based on the detected amounts of motion, M (where M is an integer of 1 or more fulfilling N>M) out of the N low-resolution images each as a consulted image; and a resolution enhancement step of producing, based on the detected amounts of motion, the datum image, and the M consulted images, a high-resolution image having higher resolution than the low-resolution images, wherein in the image evaluation step, each of the N low-resolution images is taken as an evaluated image, and when an image coordinate system common to the datum image and the evaluated images is called a common coordinate system and, based on the detected amounts of motion, the datum image and the evaluated images are arranged in the common coordinate system, in the image evaluation step, based on a pixel position on the datum image in the common coordinate system, a datum position in the common coordinate system is set, for each evaluated image, a distance between the datum position and a pixel position on said each evaluated image is evaluated, and an evaluated image corresponding to a relatively small distance is selected as the consulted image, while an evaluated image corresponding to a relatively great distances is excluded from the M consulted images.

\* \* \* \* \*